(12) United States Patent
Kuniyoshi et al.

(10) Patent No.: US 12,731,306 B2
(45) Date of Patent: Sep. 8, 2026

(54) INFORMATION PROVIDING DEVICE, INFORMATION PROVIDING METHOD, AND RECORDING MEDIUM

(71) Applicant: Panasonic Holdings Corporation, Osaka (JP)

(72) Inventors: Fusataka Kuniyoshi, Tokyo (JP); Jun Ozawa, Nara (JP)

(73) Assignee: PANASONIC HOLDINGS CORPORATION, Osaka (JP)

( * ) Notice: Subject to any disclaimer, the term of this patent is extended or adjusted under 35 U.S.C. 154(b) by 265 days.

(21) Appl. No.: 18/490,827

(22) Filed: Oct. 20, 2023

(65) Prior Publication Data

US 2024/0046685 A1 Feb. 8, 2024

Related U.S. Application Data

(63) Continuation of application No. PCT/JP2022/018136, filed on Apr. 19, 2022.

(30) Foreign Application Priority Data

May 18, 2021 (JP) ................................ 2021-084156

(51) Int. Cl.
*G06V 30/418* (2022.01)
*G06T 7/90* (2017.01)
(Continued)

(52) U.S. Cl.
CPC ............. *G06V 30/416* (2022.01); *G06T 7/90* (2017.01); *G06T 11/10* (2026.01); *G06T 11/60* (2013.01);
(Continued)

(58) Field of Classification Search
CPC ............... G06V 30/416; G06V 30/413; G06V 30/19093; G06V 2201/10; G06T 7/90;
(Continued)

(56) References Cited

U.S. PATENT DOCUMENTS 6,456,738 B1 * 9/2002 Tsukasa ................ G06V 30/40 715/251
6,766,056 B1 * 7/2004 Huang .................. G06V 10/44 382/209
(Continued)

FOREIGN PATENT DOCUMENTS

JP 2008-152701 7/2008
JP 2020-080087 5/2020
(Continued)

OTHER PUBLICATIONS

International Search Report of PCT application No. PCT/JP2022/018136 dated Jul. 26, 2022.
(Continued)

*Primary Examiner* — Cheng Yuan Tseng
(74) *Attorney, Agent, or Firm* — Wenderoth, Lind & Ponack L.L.P.

(57) ABSTRACT

An information providing device includes: an extractor that extracts identification information for identifying each of multiple materials and property values of each material from at least one piece of document information; a deriver that derives a confidence level for the property values of each material on the basis of a similarity of the property values between the material and one or more other materials; and an image processor that generates a first image in which the property values of each of the materials are (i) illustrated in a display mode according to the confidence level derived for the property values of the material and (ii) illustrated in association with the identification information of the material, and outputs the first image to a display.

18 Claims, 30 Drawing Sheets

(51) Int. Cl.
*G06T 11/10* (2026.01)
*G06T 11/60* (2006.01)
*G06V 30/19* (2022.01)
*G06V 30/413* (2022.01)
*G06V 30/416* (2022.01)

(52) U.S. Cl.
CPC ...... *G06V 30/19093* (2022.01); *G06V 30/413* (2022.01); *G06T 2200/24* (2013.01); *G06T 2207/10024* (2013.01); *G06T 2207/30176* (2013.01); *G06V 2201/10* (2022.01)

(58) Field of Classification Search
CPC ... G06T 11/001; G06T 11/60; G06T 2200/24; G06T 2200/10024; G06T 2200/30176
See application file for complete search history.

(56) References Cited

U.S. PATENT DOCUMENTS 7,971,150 B2 * 6/2011 Raskutti ................ G06F 16/355 707/738
8,229,900 B2 * 7/2012 Houle ..................... G06F 16/93 707/692
8,583,648 B1 * 11/2013 Majkowska ............ G06F 16/93 707/737
8,856,888 B2 * 10/2014 Yamada ................ H04L 9/3226 600/595
9,014,462 B2 * 4/2015 Yamada .................... G06T 7/11 382/154
10,878,003 B2 * 12/2020 Mukhopadhyay ...... G06F 16/93
11,087,125 B2 * 8/2021 Cali ..................... G06V 30/147
11,200,410 B2 * 12/2021 Sasagawa ............ G06V 30/414
11,687,827 B2 * 6/2023 Pondicherry Murugappan ........... G06Q 10/10 706/11
2007/0150802 A1 * 6/2007 Wan ........................ G06F 16/35 707/999.1
2022/0043847 A1 * 2/2022 Kuniyoshi ......... G06V 30/1983
2024/0046685 A1 * 2/2024 Kuniyoshi ........... G06V 30/416

FOREIGN PATENT DOCUMENTS

JP 2020-190863 11/2020
WO 2021/039175 3/2021

OTHER PUBLICATIONS

Extended European Search Report issued Oct. 15, 2024 in European Patent Application No. 22804488.9.
Martin Krallinger et al: "Information Retrieval and Text Mining Technologies for Chemistry", Chemical Reviews, XP055392300, vol. 117, No. 12, May 5, 2017 (May 5, 2017), pp. 7673-7761.
Olivetti Elsa A et al: "Data-driven materials research enabled by natural language processing and information extraction", Applied Physics Reviews, American Institute of Physics, 2 Huntington Quadrangle, Melville, NY 11747, XP012252370, vol. 7, No. 4, Dec. 21, 2020 (Dec. 21, 2020).

* cited by examiner

| DOCUMENT ID | PUBLICATION DATE | JOURNAL | TITLE | NUMBER OF TIMES CITED | FINAL MATERIAL | CONDUCTIVITY | ACTIVATION |
|---|---|---|---|---|---|---|---|
| | | | | | | | |
| | | | | | | | |
| | | | | | | | |
| | | | | | | | |
| | | | | | | | |
| | | | | | | | |
| | | | | | | | |
| | | | | | | | |
| | | | | | | | |
| | | | | | | | |
| | | | | | | | |

21

0001 0002 0003
0004 0005 0006
0007 0008 0009
0010 0011 0012

START EXTRACTION

| DOCUMENT ID | PUBLICATION DATE | JOURNAL | TITLE | NUMBER OF TIMES CITED | FINAL MATERIAL | CONDUCTIVITY | ACTIVATION |
|---|---|---|---|---|---|---|---|
| 0001 | 05/10/2003 | AAA | A molecularly ... | 3 | | | |
| 0002 | 04/23/2010 | BBB | A novel electro... | 5 | | | |
| 0003 | 09/28/2013 | BBB | Gas chromate... | 26 | | | |
| 0004 | 10/09/2011 | CCC | A spot test for ... | 0 | | | |
| 0005 | 03/24/2020 | AAA | Designing signal... | 9 | | | |
| 0006 | 05/11/2019 | CCC | Templated synth... | 12 | | | |
| 0007 | 04/04/2004 | CCC | A decennary up... | 4 | | | |
| 0008 | 02/01/2002 | BBB | Applications of ... | 69 | | | |
| | | | | | | | |
| | | | | | | | |
| | | | | | | | |

START EXTRACTION 23a

START FILL 23b

```
@article{SAMY201228,
title = "The role of XYZ of nominal composition Li7La3",
journal = "ABC",
volume = "206",
pages = "28 - 32",
year = "2012",
issn = "0167-2738",
doi = "https://abc.org/10.1016/j.abc.2011.10.022",
url = "http://www.abc.com/science/article/abc/S0123",
author = {John Smith, David Brown, Thomas Jones},
Affiliation={PQR Research Laboratory}
keywords = "Phase formation, Garnet, Li, Al, Cubic, Ionic conductivity, Hot-pressing"
}
```

Synthesis of XYZ and ion conductivity

Abstract

1. Introduction 3. Experiment

2. Method

Table 1. Properties of selected compound.

| Compound | Structure | *Density* $(g\ cm^{-3})$ | *Conductivity* $(S\ cm^{-1})$ |
|---|---|---|---|
| TiN | Cubic | 5.40 | $3.70 \times 10^{-4}$ |
| VN | Cubic | 6.13 | $1.49 \times 10^{-4}$ |
| NbN | Hexagonal | 8.47 | $1.60 \times 10^{-4}$ |
| Nb4N5 | Tetragonal | 9.46 | $2.31 \times 10^{-4}$ |

EXTRACTION SOURCE TABLE

The conductivity and activation energy for Li6.25Al0.25La3Zr2O12 (LLZ) with an ion dose of 2.7 x 10-14 cm-2 are 4.6 x 10-3 S cm-1 and 0.11 eV, respectively.

EXTRACTION SOURCE SENTENCE

Conductivity (S/cm)
0.08
0.07
0.06
0.05
Bulk
Total
1000
1400
1800
Temperature (°C)

Fig1. Temperature dependent electrical conductivity of Li6.25Al0.25La3Zr2O12 samples.

EXTRACTION SOURCE FIGURE

FIG. 5

Li6.25Al0.25La3Zr2O12 (LALZ) and Li6.5La3Zr1.5Ta0.5O12 (LLZT) were used in the course of this study.

EXTRACTION SOURCE SENTENCE
(EXTRACTED FROM DOCUMENT ID 0001, LINE 1)

The conductivity for LALZ and LLZT are $4.6 \times 10^{-3}$ S $cm^{-1}$ and $5.4 \times 10^{-3}$ S $cm^{-1}$, respectively

EXTRACTION SOURCE SENTENCE
(EXTRACTED FROM DOCUMENT ID 0001, LINE 5)

The amorphous precursor Li6.25AlxLa(1-x)Zr2O12 (x=0.1, 0.2, 0.3) was prepared by ball-milling for 2, 4, 6 h using planetary ball-mill

EXTRACTION SOURCE SENTENCE
(EXTRACTED FROM DOCUMENT ID 0001, LINE 22)

Ionic glasses in the system Li2SO4-Li3BO3 were prepared by the melt quenching method.

EXTRACTION SOURCE SENTENCE
(EXTRACTED FROM DOCUMENT ID 0002, LINE 20)

The melt was quenched by an iron-press technique to prepare the 60Li2SO4*40Li3BO3 ionic glass.

EXTRACTION SOURCE SENTENCE
(EXTRACTED FROM DOCUMENT ID 0002, LINE 67)

31

| DOCUMENT ID | EXTRACTION LINE NO. | SPAN | MATERIAL NAME |
|---|---|---|---|
| 0001 | 1 | (1,29) | Li6.25Al0.25La3Zr2O12 (LALZ) |
| 0001 | 1 | (33,62) | Li6.5La3Zr1.5Ta0.5O12 (LLZT) |
| 0001 | 5 | (21,26) | LALZ |
| 0001 | 5 | (30,35) | LLZT |
| 0001 | 22 | (25,63) | Li6.25AlxLa(1-x)Zr2O12 (x=0.1, 0.2, 0.3) |
| 0002 | 20 | (29,43) | Li2SO4-Li3BO3 |
| 0002 | 67 | (65,83) | 60Li2SO4*40Li3BO3 |

32

| DOCUMENT ID | EXTRACTION LINE NO. | SPAN | PROPERTY VALUE |
|---|---|---|---|
| 0001 | 5 | (39,57) | $4.6 \times 10^{-3}$ S $cm^{-1}$ |
| 0001 | 5 | (61,79) | $5.4 \times 10^{-3}$ S $cm^{-1}$ |

FIG. 6A
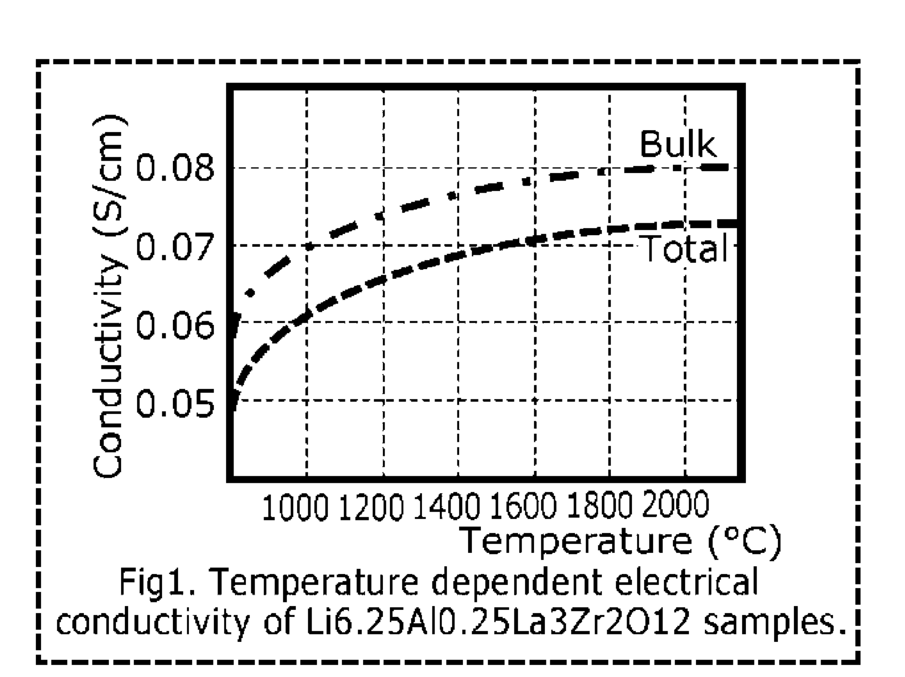
EXTRACTION SOURCE FIGURE (EXTRACTED FROM DOCUMENT ID 0001)
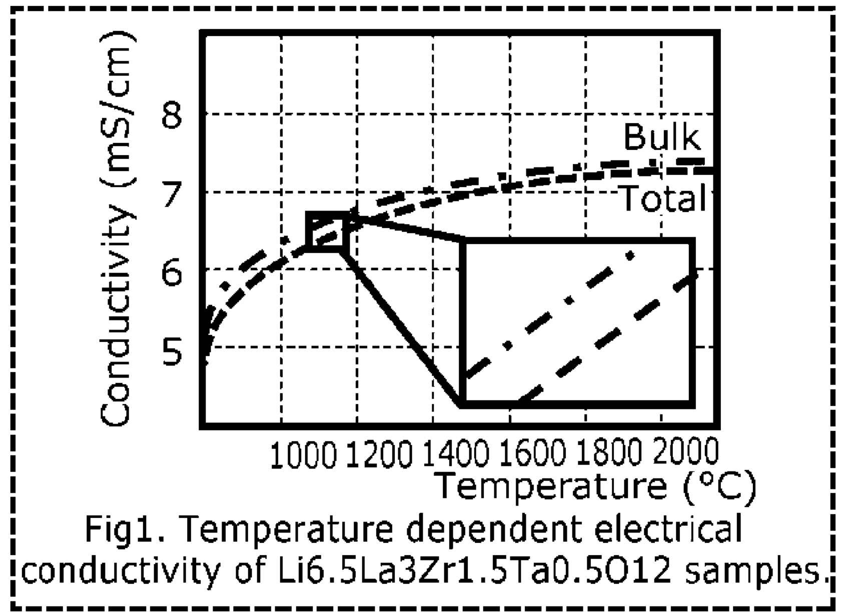
EXTRACTION SOURCE FIGURE (EXTRACTED FROM DOCUMENT ID 0002)

| DOCUMENT ID | FIGURE NO. | x VALUE | y VALUE | x LABEL | y LABEL | STATE | CAPTION |
|---|---|---|---|---|---|---|---|
| 0001 | 1 | 1000 | 0.070 | Temperature (°C) | Conductivity (S/cm) | Bulk | Fig1. Temper ... |
| 0001 | 1 | 1200 | 0.073 | Temperature (°C) | Conductivity (S/cm) | Bulk | Fig1. Temper ... |
| 0001 | 1 | 1400 | 0.076 | Temperature (°C) | Conductivity (S/cm) | Bulk | Fig1. Temper ... |
| 0001 | 1 | 1600 | 0.078 | Temperature (°C) | Conductivity (S/cm) | Bulk | Fig1. Temper ... |
| 0001 | 1 | 1800 | 0.079 | Temperature (°C) | Conductivity (S/cm) | Bulk | Fig1. Temper ... |
| 0001 | 1 | 2000 | 0.080 | Temperature (°C) | Conductivity (S/cm) | Bulk | Fig1. Temper ... |
| 0001 | 1 | 1000 | 0.060 | Temperature (°C) | Conductivity (S/cm) | Total | Fig1. Temper ... |
| 0001 | 1 | 1200 | 0.065 | Temperature (°C) | Conductivity (S/cm) | Total | Fig1. Temper ... |
| 0001 | 1 | 1400 | 0.068 | Temperature (°C) | Conductivity (S/cm) | Total | Fig1. Temper ... |
| 0001 | 1 | 1600 | 0.070 | Temperature (°C) | Conductivity (S/cm) | Total | Fig1. Temper ... |
| 0001 | 1 | 1800 | 0.071 | Temperature (°C) | Conductivity (S/cm) | Total | Fig1. Temper ... |
| 0001 | 1 | 2000 | 0.073 | Temperature (°C) | Conductivity (S/cm) | Total | Fig1. Temper ... |
| 0002 | 1 | 1000 | 6.0 | Temperature (°C) | Conductivity (mS/cm) | Bulk | Fig1. Temper ... |
| 0002 | 1 | 1200 | 6.0 | Temperature (°C) | Conductivity (mS/cm) | Bulk | Fig1. Temper ... |
| 0002 | 1 | 1400 | 4.6 | Temperature (°C) | Conductivity (mS/cm) | Bulk | Fig1. Temper ... |
| 0002 | 1 | 1600 | 0.1 | Temperature (°C) | Conductivity (mS/cm) | Bulk | Fig1. Temper ... |
| 0002 | 1 | 1800 | 0.1 | Temperature (°C) | Conductivity (mS/cm) | Bulk | Fig1. Temper ... |
| 0002 | 1 | 2000 | 0.1 | Temperature (°C) | Conductivity (mS/cm) | Bulk | Fig1. Temper ... |
| 0002 | 1 | 1000 | 6.5 | Temperature (°C) | Conductivity (mS/cm) | Total | Fig1. Temper ... |
| 0002 | 1 | 1200 | 6.0 | Temperature (°C) | Conductivity (mS/cm) | Total | Fig1. Temper ... |
| 0002 | 1 | 1400 | 6.5 | Temperature (°C) | Conductivity (mS/cm) | Total | Fig1. Temper ... |
| 0002 | 1 | 1600 | 6.5 | Temperature (°C) | Conductivity (mS/cm) | Total | Fig1. Temper ... |
| 0002 | 1 | 1800 | 6.5 | Temperature (°C) | Conductivity (mS/cm) | Total | Fig1. Temper ... |
| 0002 | 1 | 2000 | 6.5 | Temperature (°C) | Conductivity (mS/cm) | Total | Fig1. Temper ... |

FIG. 8A

Table 1. Properties of selected compound.

| Reference | Structure | *Density* ($g\ cm^{-3}$) | *Conductivity* ($S\ cm^{-1}$) |
|---|---|---|---|
| Cycle+ [1] | Cubic | 5.40 | $3.70 \times 10^{-4}$ |
| Mike+ [2] | Cubic | 6.13 | $1.49 \times 10^{-4}$ |
| Han+ [3] | Hexagonal | 8.47 | $1.60 \times 10^{-4}$ |
| Kim+ [4] | Tetragonal | 9.46 | $2.31 \times 10^{-4}$ |

Table 2. Properties of selected compound.

| | *Experimental* 1 | | *Experimental* 2 | |
|---|---|---|---|---|
| Samples | *Density* ($g\ cm^{-3}$) | *Conductivity* ($mS\ cm^{-1}$) | *Density* ($g\ cm^{-3}$) | *Conductivity* ($mS\ cm^{-1}$) |
| Li6.25Al0.25La3Zr2O12 (ours) | 4.12 | 2.45 | 3.12 | 2.34 |
| Li6.5La3Zr1.5Ta0.5O12 (ours) | 3.13 | 2.34 | 2.11 | 3.11 |
| Li0.5La0.5TiO3 [5] | 2.39 | 2.31 | 1.22 | 2.33 |

EXTRACTION SOURCE TABLES (EXTRACTED FROM DOCUMENT ID 0001)

| DOCUMENT ID | FIGURE NO. | ROW LABEL | COLUMN LABEL | PROPERTY VALUE |
| --- | --- | --- | --- | --- |
| 0001 | 1 | Cycle+ [1] | Conductivity(S cm-1) | $3.70 \times 10^{-4}$ |
| 0001 | 1 | Mike+ [2] | Conductivity(S cm-1) | $1.49 \times 10^{-4}$ |
| 0001 | 1 | Han+ [3] | Conductivity(S cm-1) | $1.60 \times 10^{-4}$ |
| 0001 | 1 | Kim+ [4] | Conductivity(S cm-1) | $2.31 \times 10^{-4}$ |
| 0001 | 2 | Li6.25Al0.25La3Zr2O12 (ours) | Experimental1 | 2.45 |
| 0001 | 2 | Li6.5La3Zr1.5Ta0.5O12 (ours) | Experimental1 | 2.34 |
| 0001 | 2 | Li0.5La0.5TiO3 [5] | Experimental1 | 2.31 |
| 0001 | 2 | Li6.25Al0.25La3Zr2O12 (ours) | Experimental2 | 2.34 |
| 0001 | 2 | Li6.5La3Zr1.5Ta0.5O12 (ours) | Experimental2 | 3.11 |
| 0001 | 2 | Li0.5La0.5TiO3 [5] | Experimental2 | 2.33 |

31
DOCUMENT ID
EXTRACTION LINE NO.
SPAN
MATERIAL NAME
0001 1 (1,29) Li6.25Al0.25La3Zr2O12 (LALZ)
0001 1 (33,62) Li6.5La3Zr1.5Ta0.5O12 (LLZT)
0001 5 (21,26) LALZ
0001 5 (30,35) LLZT
0001 22 (25,63) Li6.25AlxLa(1-x)Zr2O12 (x=0.1, 0.2, 0.3)
0002 20 (29,43) Li2SO4-Li3BO3
0002 67 (65,83) 60Li2SO4*40Li3BO3
Li6.25Al0.25La3Zr2O12
(LALZ)
LALZ
REGISTER
ABBREVIATION
EQUIVALENT
BREAK UP
COMPARE AND SELECT
31a
DOCUMENT ID
EXTRACTION LINE NO.
SPAN
MATERIAL NAME
0001 1 (1,22) Li6.25Al0.25La3Zr2O12
0001 1 (33,56) Li6.5La3Zr1.5Ta0.5O12
0001 22 (25,46) Li6.25Al0.1La0.9Zr2O12
0001 22 (25,46) Li6.25Al0.2La0.8Zr2O12
0001 22 (25,46) Li6.25Al0.3La0.7Zr2O12
0002 20 (29,43) Li2SO4-Li3BO3

FIG. 10

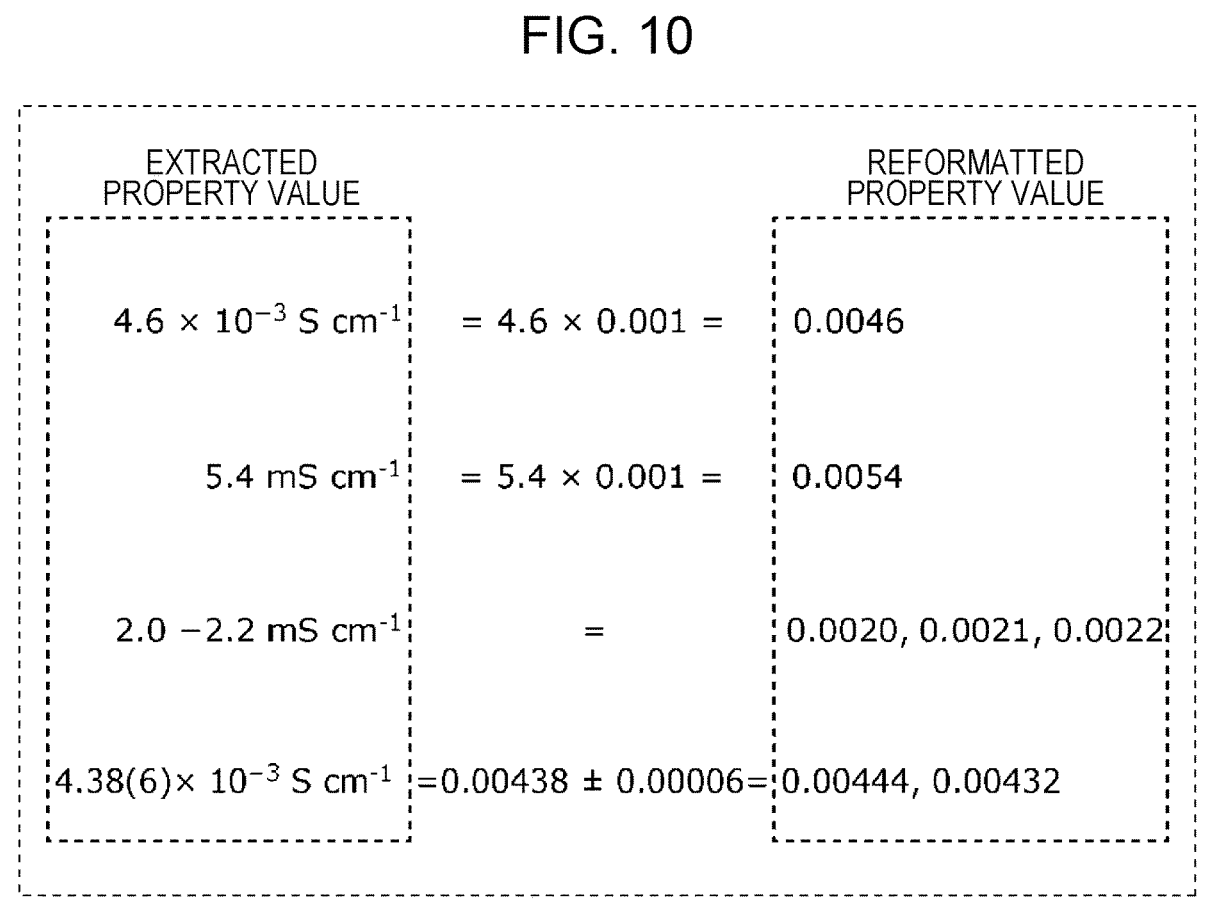

| EXTRACTED PROPERTY VALUE | | REFORMATTED PROPERTY VALUE |
|---|---|---|
| $4.6 \times 10^{-3}$ S $cm^{-1}$ | $= 4.6 \times 0.001 =$ | 0.0046 |
| 5.4 mS $cm^{-1}$ | $= 5.4 \times 0.001 =$ | 0.0054 |
| 2.0 −2.2 mS $cm^{-1}$ | = | 0.0020, 0.0021, 0.0022 |
| $4.38(6) \times 10^{-3}$ S $cm^{-1}$ | $= 0.00438 \pm 0.00006 =$ | 0.00444, 0.00432 |

| | THIRD INFORMATION (ATTRIBUTES) | | | | | | FIRST INFORMATION (MATERIAL NAME) | SECOND INFORMATION (PROPERTY VALUES) | |
|---|---|---|---|---|---|---|---|---|---|
| DOCUMENT ID | PUBLICATION DATE | JOURNAL | TITLE | NUMBER OF TIMES CITED | AUTHOR | RESEARCH INSTITUTION | FINAL MATERIAL | CONDUCTIVITY | ACTIVATION |
| 0001 | 05/10/2003 | AAA | A molecularly ... | 3 | AAA | AAA | LiSo... | 0.048 | 0.41 |
| 0002 | 04/23/2010 | BBB | A novel electro... | 5 | BBB | BBB | LiSo... | 0.052 | 0.52 |
| 0003 | 09/28/2013 | BBB | Gas chromate... | 26 | BBB | BBB | LiSo... | 0.057 | 0.48 |
| 0004 | 10/09/2011 | CCC | A spot test for ... | 0 | CCC | CCC | LiSo... | 0.053 | 0.38 |
| 0005 | 03/24/2020 | AAA | Designing signal... | 9 | AAA | AAA | LiSo... | 0.062 | 0.27 |
| 0006 | 05/11/2019 | CCC | Templated synth... | 12 | CCC | CCC | LiSo... | 0.079 | 0.80 |
| 0007 | 04/04/2004 | CCC | A decennary up... | 4 | CCC | CCC | LiSo... | 0.070 | 0.16 |
| 0008 | 02/01/2002 | BBB | Applications of ... | 69 | BBB | BBB | LiSo... | 0.077 | 0.15 |
| | | | | | | | | | |
| | | | | | | | | | |
| | | | | | | | | | |

COMBINED INFORMATION (AUTHOR through ACTIVATION)

| ID | PUBLICATION DATE | JOURNAL | TITLE | TIMES CITED | FINAL MATERIAL | CONDUCTIVITY | ACTIVATION |
|---|---|---|---|---|---|---|---|
| 0001 | 05/10/2003 | AAA | A molecularly ... | 3 | LiSo... | 0.048 | 0.41 |
| 0002 | 04/23/2010 | BBB | A novel electro... | 5 | LiSo... | 0.052 | 0.52 |
| 0003 | 09/28/2013 | BBB | Gas chromate... | 26 | LiSo... | 0.057 | 0.48 |
| 0004 | 10/09/2011 | CCC | A spot test for ... | 0 | LiSo... | 0.053 | 0.38 |
| 0005 | 03/24/2020 | AAA | Designing signal... | 9 | LiSo... | 0.062 | 0.27 |
| 0006 | 05/11/2019 | CCC | Templated synth... | 12 | LiSo... | 0.079 | 0.80 |
| 0007 | 04/04/2004 | CCC | A decennary up... | 4 | LiSo... | 0.070 | 0.16 |
| 0008 | 02/01/2002 | BBB | Applications of ... | 69 | LiSo... | 0.077 | 0.15 |
| | | | | | | | |
| | | | | | | | |
| | | | | | | | |

START GRAPH DISPLAY

23c

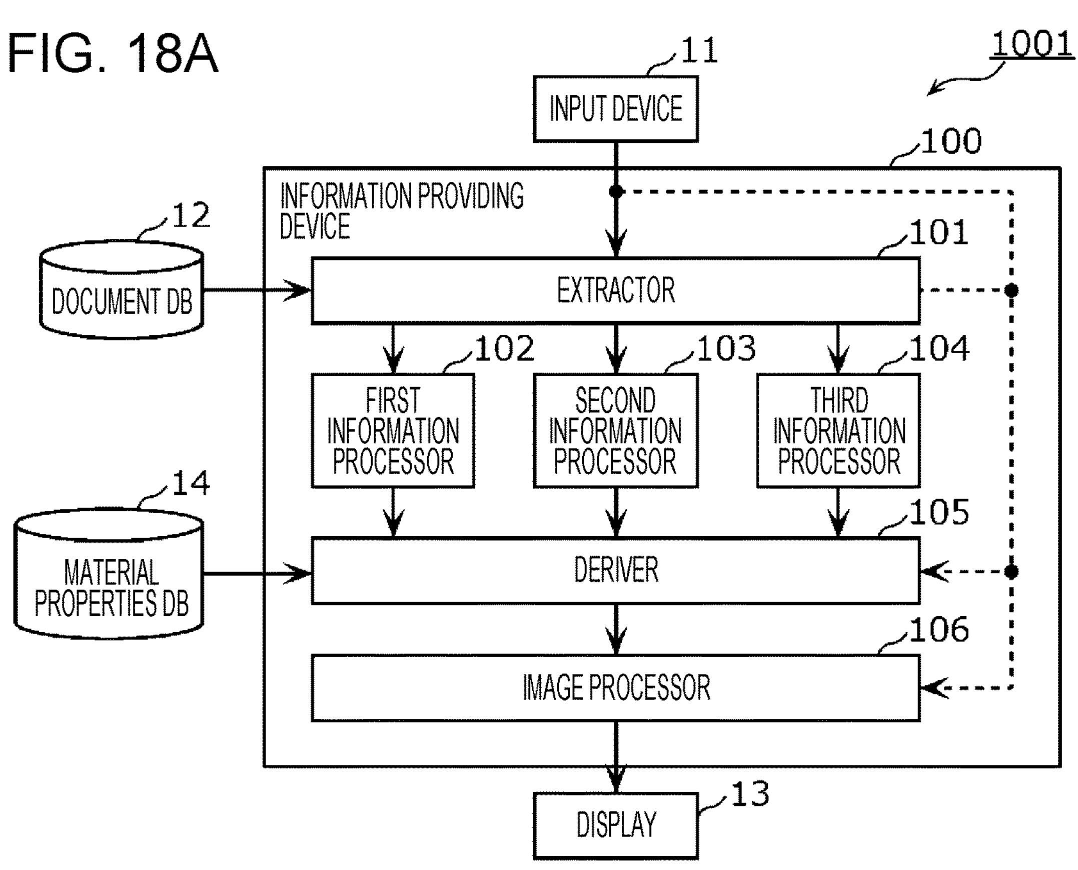
FIG. 18A
1001
11
INPUT DEVICE
100
INFORMATION PROVIDING DEVICE
12
DOCUMENT DB
101
EXTRACTOR
102
103
104
FIRST INFORMATION PROCESSOR
SECOND INFORMATION PROCESSOR
THIRD INFORMATION PROCESSOR
14
MATERIAL PROPERTIES DB
105
DERIVER
106
IMAGE PROCESSOR
13
DISPLAY

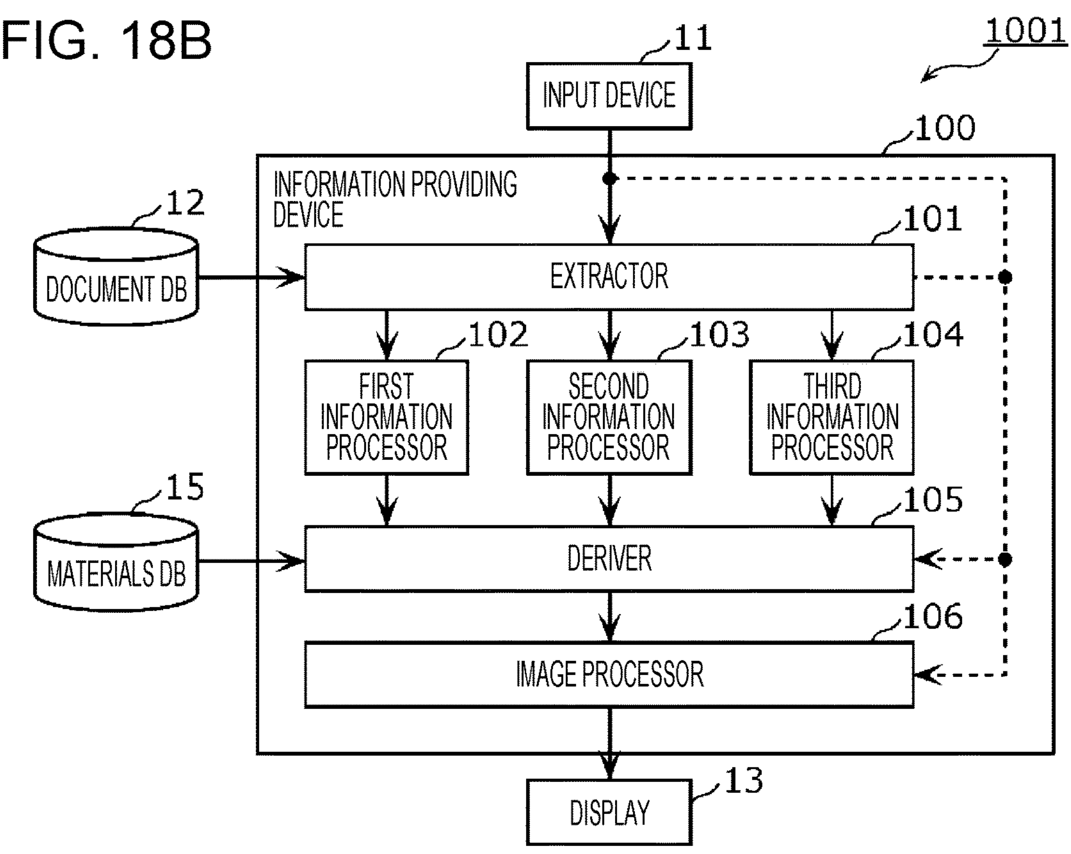
FIG. 18B
1001
11
INPUT DEVICE
100
INFORMATION PROVIDING DEVICE
12
DOCUMENT DB
101
EXTRACTOR
102
103
104
FIRST INFORMATION PROCESSOR
SECOND INFORMATION PROCESSOR
THIRD INFORMATION PROCESSOR
15
MATERIALS DB
105
DERIVER
106
IMAGE PROCESSOR
13
DISPLAY

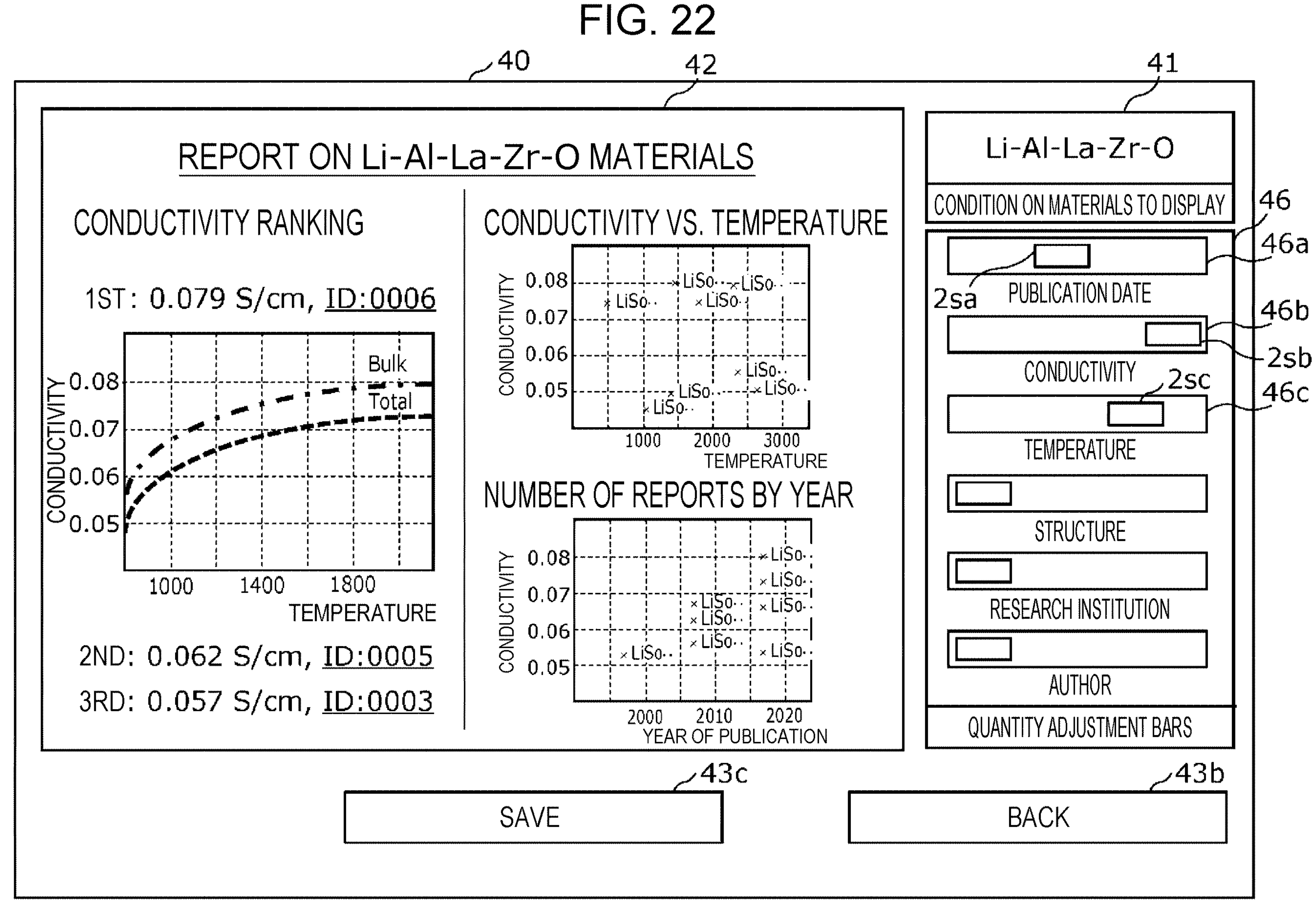
FIG. 22
40
42
41
REPORT ON Li-Al-La-Zr-O MATERIALS
CONDUCTIVITY RANKING
1ST: 0.079 S/cm, ID:0006
CONDUCTIVITY
0.08
0.07
0.06
0.05
Bulk
Total
1000
1400
1800
TEMPERATURE
2ND: 0.062 S/cm, ID:0005
3RD: 0.057 S/cm, ID:0003
CONDUCTIVITY VS. TEMPERATURE
LiSo
1000
2000
3000
TEMPERATURE
NUMBER OF REPORTS BY YEAR
2000
2010
2020
YEAR OF PUBLICATION
Li-Al-La-Zr-O
CONDITION ON MATERIALS TO DISPLAY
46
46a
2sa
PUBLICATION DATE
46b
2sb
CONDUCTIVITY
2sc
46c
TEMPERATURE
STRUCTURE
RESEARCH INSTITUTION
AUTHOR
QUANTITY ADJUSTMENT BARS
43c
SAVE
43b
BACK

INFORMATION PROVIDING DEVICE, INFORMATION PROVIDING METHOD, AND RECORDING MEDIUM

BACKGROUND

1. Technical Field

The present disclosure relates to, among other things, an information providing device that provides information pertaining to materials.

2. Description of the Related Art

In the related art, information providing devices that provide information pertaining to materials or experiments described in research papers and other documents have been proposed (for example, see Japanese Unexamined Patent Application Publication No. 2020-80087, International Publication No. 2021/039175, and Japanese Unexamined Patent Application Publication No. 2008-152701). The numerical value retrieval device proposed as an information providing device in Japanese Unexamined Patent Application Publication No. 2020-80087 extracts numerical data on materials described in each of multiple documents and calculates the similarity of the numerical data. The assistance device proposed as an information providing device in International Publication No. 2021/039175 extracts information pertaining to a synthesis process described in a research paper and provides information indicating the synthesis process from a starting material to a target material. The credibility assessment system proposed as an information providing device in Japanese Unexamined Patent Application Publication No. 2008-152701 assesses the credibility of documents pertaining to an experiment. That is, the credibility assessment system retrieves a document in response to the input of keywords, such as experimental methods, and calculates a confidence level for the document on the basis of a journal usefulness list, which stores the usefulness of the journal to which the retrieved document was submitted, and the frequency of occurrence of the inputted keywords.

SUMMARY

However, the information providing devices in the above literature need further improvement to provide information pertaining to materials appropriately.

One non-limiting and exemplary embodiment provides an information providing device with which further improvement can be attained to provide information pertaining to materials appropriately.

In one general aspect, the techniques disclosed here feature an information providing device including: an extractor that extracts identification information for identifying each of multiple materials and property values of each material from at least one piece of document information; a deriver that derives a confidence level for the property values of each material on the basis of a similarity of the property values between the material and one or more other materials; and an image processor that generates a first image in which the property values of each of the materials are (i) illustrated in a display mode according to the confidence level derived for the property values of the material and (ii) illustrated in association with the identification information of the material, and outputs the first image to a display.

It should be noted that general or specific aspects may be implemented as a system, a method, an integrated circuit, a computer program, a computer-readable recording medium, or any selective combination thereof. The recording medium includes a non-volatile recording medium such as Compact Disc Read-Only Memory (CD-ROM), for example.

With the information providing device according to the present disclosure, further improvement can be attained to provide information pertaining to materials appropriately.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 2A is a diagram illustrating an example of a display screen displayed on a display by an image processor in Embodiment 1;

FIG. 2B is a diagram illustrating another example of a display screen displayed on the display by the image processor in Embodiment 1;

FIG. 3 is a diagram illustrating an example of metadata in Embodiment 1;

FIG. 4 is a diagram illustrating an example of body data in Embodiment 1;

FIG. 5 is a diagram illustrating an example of material names and property values extracted from sentences of body data in Embodiment 1;

FIG. 6A is a diagram illustrating an example of figures treated as extraction sources within body data in Embodiment 1;

FIG. 6B is a diagram illustrating an example of property values extracted from extraction source figures in Embodiment 1;

FIG. 8A is a diagram illustrating an example of tables treated as extraction sources within body data in Embodiment 1;

FIG. 8B is a diagram illustrating an example of property values extracted from extraction source tables in Embodiment 1;

FIG. 10 is an example of a material property value conversion process in Embodiment 1;

FIG. 11 is a diagram illustrating an example of an updated extracted-information table in Embodiment 1;

FIG. 12 is a diagram illustrating an example of a display screen including an updated extracted-information table in Embodiment 1;

FIG. 18A is a block diagram illustrating an example of the configuration of an information providing system according to a modification of Embodiment 1;

FIG. 18B is a block diagram illustrating another example of the configuration of an information providing system according to a modification of Embodiment 1;

FIG. 22 is a diagram illustrating another example of a source display screen on which an edited source is displayed in Embodiment 2;

Figure 1:
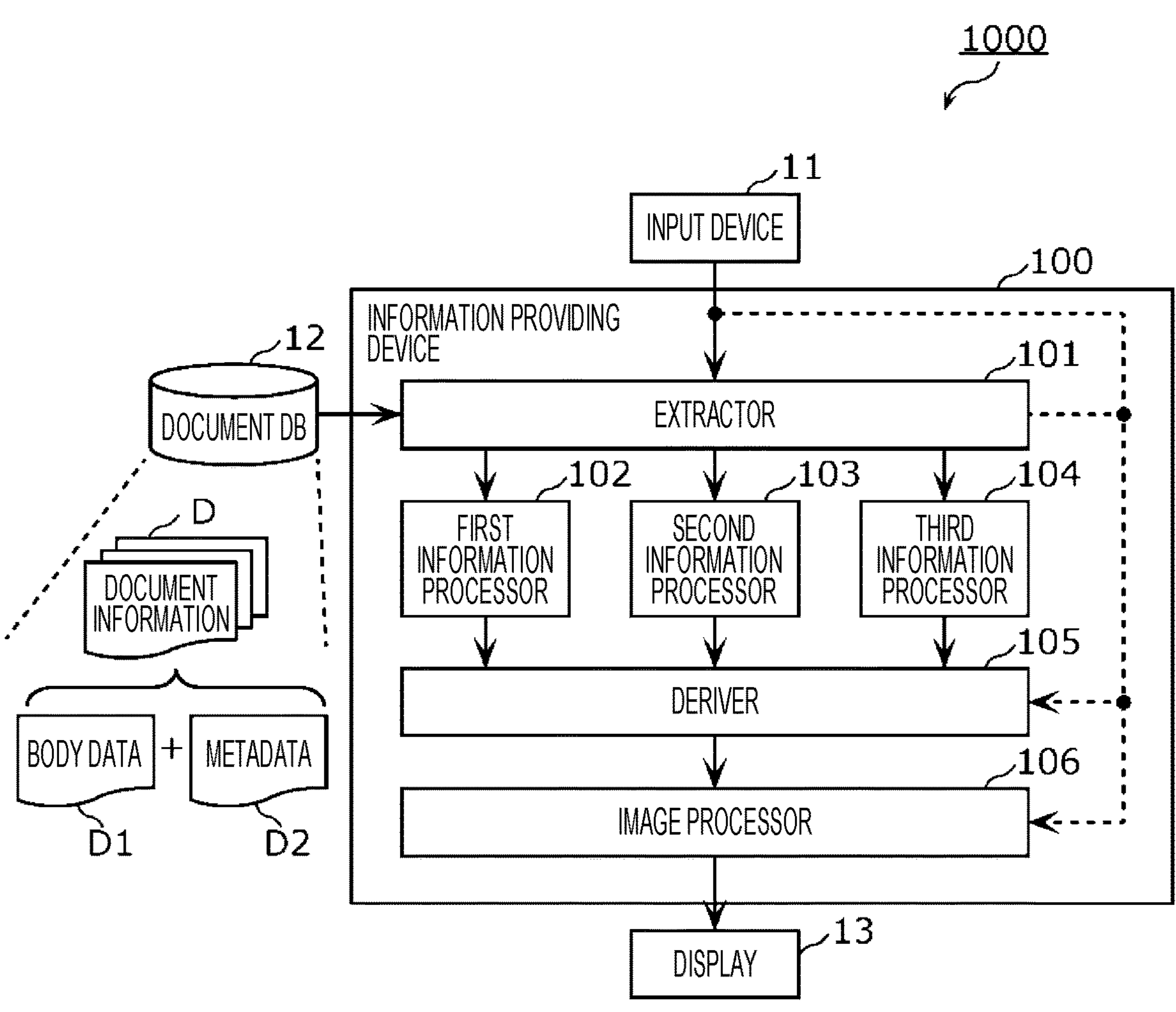
FIG. 1 is a block diagram illustrating an example of the configuration of an information providing system in Embodiment 1.

DETAILED DESCRIPTIONS (Underlying Knowledge Forming Basis of the Present Disclosure)

To synthesize new materials, it is necessary to find materials with appropriate properties from an enormous amount of material data. However, finding the most suitable materials from an enormous amount of material data is time-consuming and costly, and discovering new materials is not easy, even for an experienced researcher. For this reason, computational material exploration is underway. In other words, vast amounts of information pertaining to material synthesis is extracted from documents such as research papers or patents, the extracted information is accumulated in a database, and insights regarding material development are gained from the accumulated information. For example, as in Japanese Unexamined Patent Application Publication No. 2020-80087, International Publication No. 2021/039175, and Japanese Unexamined Patent Application Publication No. 2008-152701 above, similarity is calculated, information indicating a synthesis process is provided, the credibility of literature is assessed, and so on.

However, although various information is provided by the information providing devices according to Japanese Unexamined Patent Application Publication No. 2020-80087, International Publication No. 2021/039175, and Japanese Unexamined Patent Application Publication No. 2008-152701 above, there is a problem in that it is difficult to know whether the property values of materials described in documents are trustworthy. For example, champion data is of low credibility (that is to say, reproducibility) in many cases, even if the data indicates the highest values as the property values of a material.

Accordingly, the inventors conceived of extracting property values of each of multiple materials from documents, deriving confidence levels for the property values on the basis of the similarity of the extracted property values, and displaying the property values in a display mode according to the confidence levels, and thereby arrived at the present disclosure.

That is, an information providing device according to an aspect of the present disclosure includes: an extractor that extracts identification information for identifying each of multiple materials and property values of each material from at least one piece of document information; a deriver that derives a confidence level for the property values of each material on the basis of a similarity of the property values between the material and one or more other materials; and an image processor that generates a first image in which the property values of each of the materials are (i) illustrated in a display mode according to the confidence level derived for the property values of the material and (ii) illustrated in association with the identification information of the material, and outputs the first image to a display. For example, the identification information may be the name of the material, that is, the material name, and the material name may be a composition formula. The materials may be the same or different materials, and may have common uses, elemental species, or the like. In a specific example, the materials are used for the positive or negative electrode of a battery. For example, the lower the similarity, the lower the confidence level that is derived, and the higher the similarity, the higher the confidence level that is derived.

Thus, in the first image to be displayed, the property values of each of the materials are displayed in a display mode according to the confidence level of the property values, and material identification information is associated with the property values. Consequently, by looking at the first image, a materials researcher or other user can easily grasp from the first image the credibility of the property values of materials described in an enormous amount of document information stored in a database, for example. For example, if the property values of a material are similar to those of many other materials, the user can easily know that the property values of the material are credible.

The extractor may also extract multiple classes of property values as the property values. For example, the multiple classes of property values are the electrical conductivity and activation energy value of the material.

Thus, the credibility of multiple classes of property values of a material can be grasped easily.

The multiple classes of property values may include a property value of a first class and a property value of a second class, the image processor may also set in the first image a property map having a first coordinate axis for representing the property value of the first class and a second coordinate axis for representing the property value of the second class and superimpose a mark corresponding to each of the materials onto a position corresponding to the property value of the first class and the property value of the second class of the material on the property map, in a display mode according to the confidence level derived for the property values of the material. For example, the property map is a property value graph indicating electrical conductivity and activation energy value on first and second coordinate axes, respectively. Additionally, a mark corresponding to each material is placed at the position on the property value graph that corresponds to the electrical conductivity and activation energy value of the material, in a display mode according to the confidence level for the classes of property values.

Thus, confidence levels for multiple classes of property values of each material can be grasped easily as a whole.

The deriver may also identify the similarity of the property values of each material on the basis of a distance between the mark corresponding to the material and the mark corresponding to each of one or more other materials. For example, the shorter the average value of the distances, the higher the value that is specified as the similarity. That is, the higher the degree of clustering of the marks, the higher the similarity that is specified for the property values indicated by the marks, and conversely, the lower the degree of clustering of the marks, the lower the similarity that is specified for the property values indicated by the marks.

Thus, a single similarity can be specified appropriately for multiple classes of property values of a material, and as a result, a confidence level based on similarity can be derived appropriately.

The image processor may also determine, as the display mode of the property values of each material, a color intensity that is more intense the higher the confidence level that is derived for the property values and generate the first image in which the property values are illustrated with the determined color intensity.

Thus, the user can grasp the confidence levels for property values easily in a visual manner. Note that in the first image indicating a property value with the determined color intensity, the numerical value itself of the property value may be displayed with the determined color intensity, or a mark indicating the property value may be displayed with the determined color intensity.

The extractor may further extract, for each of the materials, attribute information indicating an attribute of the material from the at least one piece of document information, and the deriver may calculate the confidence level for the property values of each material on the basis of the similarity of the property values of the material and the attribute information extracted in relation to the material. For example, the deriver may calculate the confidence level for the property values of each material according to a weighted sum of the similarity of the property values of the material and an attribute value based on the attribute information extracted in relation to the material.

Thus, the confidence level for the property values is derived on the basis of the similarity of the property values and the attributes of the material, and therefore the confidence level can be derived from various perspectives and the certainty of the confidence level can be improved. By adjusting the weights for each of the similarity and the attributes as biases, a confidence level suited to the objective of the user can be derived.

The attribute information may also indicate, as the attribute, a time of publication of a piece of document information in which the identification information and property values of the material corresponding to the attribute information are described from among the at least one piece of document information, and the deriver may use the attribute value indicating recency of the time of publication to derive the confidence level for the property values. The more recent is the time of publication, the larger may be the value indicated by the attribute value, and the higher the similarity of the property values of the material and the larger the attribute value corresponding to the material are, the greater the value that may be derived by the deriver as the confidence level for the property values of the material. For example, the time of publication is the publication date.

Thus, a relatively higher confidence level can be derived for property values described in more recent document information. Consequently, an appropriate confidence level can be derived for a user who places importance on the time of publication.

The attribute information may also indicate, as the attribute, a number of times cited of a piece of document information in which the identification information and property values of the material corresponding to the attribute information are described from among the at least one piece of document information, and the deriver may use the attribute value according to the number of times cited to derive the confidence level for the property values. For example, the higher is the number of times cited, the larger may be the value indicated by the attribute value, and the higher the similarity of the property values of the material and the larger the attribute value corresponding to the material are, the greater the value that may be derived by the deriver as the confidence level for the property values of the material.

Thus, a relatively higher confidence level can be derived for property values described in a highly cited piece of document information. Consequently, an appropriate confidence level can be derived for a user who places importance on the number of times cited.

The attribute information may also indicate, as the attribute, an author of a piece of document information in which the identification information and property values of the material corresponding to the attribute information are described from among the at least one piece of document information, and the deriver may derive the confidence level for the property values using the attribute value according to whether the author of the piece of document information is the same as the author of each of one or more other pieces of document information. For example, the higher is the number of authors of the one or more other pieces of document information who are different from the author of the piece of document information, the larger may be the value indicated by the attribute value, and the higher the similarity of the property values of the material and the larger the attribute value corresponding to the material are, the greater the value that may be derived by the deriver as the confidence level for the property values of the material.

Thus, a relatively higher confidence level can be derived for the property values described in a piece of document information written by an author different from many other pieces of document information. That is, if similar property values are described in many pieces of document information written by different authors, a high confidence level is derived for the property values. On the other hand, if similar property values are described in many pieces of document information, but the pieces of document information are written by the same author, a low confidence level is derived for the property values. Consequently, an appropriate confidence level can be derived for a user who places importance on the identity of the author of a piece of document information.

The attribute information may also indicate, as the attribute, a synthesis method of the material corresponding to the attribute information, and the deriver may use the attribute value according to a degree of similarity between the synthesis method of the material and each synthesis method of one or more other materials to derive the confidence level for the property values. For example, the greater is the degree of similarity between the synthesis method of the material and each synthesis method of one or more other materials, the larger may be the value indicated by the attribute value, and the higher the similarity of the property values of the material and the larger the attribute value corresponding to the material are, the greater the value that may be derived by the deriver as the confidence level for the property values of the material. For example, the synthesis method of the material may include at least one from among a temperature condition, a time condition, and a type of device used in the synthesis of the material.

Thus, if a piece of document information describes that a material with certain property values is synthesized by a synthesis method similar to another piece of document information, a relatively high confidence level can be derived for the property values. Consequently, an appropriate confidence level can be derived for a user who places importance on the synthesis method.

The extractor may further acquire a material condition, and for each of one or more materials satisfying the material condition, extracts information pertaining to the material from the at least one piece of document information as a display information candidate, and the image processor may further acquire a weight on each of multiple types of attributes of materials, select, from the display information candidates extracted by the extractor, one or more display information candidates corresponding to a material with property values having a derived confidence level equal to or greater than a threshold value as one or more pieces of display information, and generate a second image in which the display information corresponding to each of the multiple types of attributes from among the one or more pieces of display information is indicated in a quantity according to the weight on each of the multiple types of attributes, and outputs the second image to the display.

Thus, by adjusting the biases, that is, the weights for each of several types of attributes, it is possible to change the amount of display information corresponding to each of multiple types of attributes that is illustrated in the second image. Consequently, the user can freely adjust the amount of display information for each attribute so that more display information is displayed in relation to attributes the user is interested in and less display information is displayed in relation to attributes the user is not interested in. Furthermore, since the display information to be displayed is information pertaining to materials with a confidence level equal to or greater than a threshold value, the user can feel confident in using the display information for materials research and other work. Display information about a material satisfying a material condition is displayed, the material condition being, for example, a condition regarding the elemental species contained in the material or the composition of the material. Thus, the one or more pieces of display information to be displayed can be limited to a material the user is interested in.

Hereinafter, exemplary embodiments of the present disclosure will be described with reference to the drawings. The embodiments described hereinafter all illustrate specific examples of the present disclosure. Consequently, features such as numerical values, shapes, materials, structural elements, and the layout positions and connection configurations of the structural elements indicated in the following embodiments are merely examples, and are not intended to limit the present disclosure. Thus, among the structural elements in the following embodiments, structural elements that are not described in the independent claim indicating the broadest concept are described as arbitrary or optional structural elements.

Note that each diagram is a schematic diagram, and does not necessarily illustrate a strict representation. In the drawings, structural elements that are substantially the same are denoted with the same signs, and duplicate description of such structural elements will be omitted or simplified.

Embodiment 1

[Device Configuration]

FIG. 1 is a block diagram illustrating an example of the configuration of an information providing system in Embodiment 1. An information providing system 1000 according to the present embodiment is a system that provides information pertaining to materials, and as illustrated in FIG. 1, includes an information providing device 100, an input device 11, a document database (DB) 12, and a display 13.

The input device 11 accepts an input operation from the user and outputs to the information providing device 100 an input signal according to the input operation. Note that the input device 11 may be configured as a keyboard, a touch sensor, a touchpad, or a mouse, for example. Through the use of the input device 11, more intuitive input operations can be achieved.

The display 13 obtains an image signal from the information providing device 100 and displays an image according to the image signal. The display 13 may be, but is not limited to, a liquid crystal display, a plasma display, or an organic light-emitting diode (OLED) display, for example.

The document database 12 is a recording medium such as a hard disk, for example, and stores document information D. Each piece of document information D is electronic data of a document. Documents are, among other things, research papers related to materials, material synthesis, and experiments on material synthesis, for example. The document information D includes body data D1 and metadata D2. The body data D1 is, for example, an electronic research paper in PDF or XML format published in an online journal (also referred to as an e-journal). The metadata D2 is data pertaining to figures, tables, images, the author, research institution, publication date, title, and the like indicated in the body data D1. Such metadata D2 is attached to the body data D1. Note that although the metadata D2 is attached to the body data D1 in the present embodiment, the metadata D2 may also not be attached to the body data D1 When the metadata D2 is not attached to the body data D1, the information providing device 100 may download metadata D2 provided by the publisher of the document corresponding to the body data D1 from a server or the like and attach the downloaded metadata D2 to the body data D1.

Such a document database 12 may be connected to the information providing device 100 through a communication network such as the Internet, but may also be connected to the information providing device 100 directly, without going through a communication network. Note that the document database 12 may also be a recording medium other than a hard disk, such as random access memory (RAM), read-only memory (ROM), or semiconductor memory, for example. The document database 12 may be volatile or non-volatile.

The information providing device 100 provides, on the basis of an input signal outputted from the input device 11, information pertaining to materials based on the document information D stored in the document database 12. That is, the information providing device 100 displays the information pertaining to materials on the display 13. Specifically, the information providing device 100 obtains an input signal from the input device 11 and searches the document database 12 for at least one piece of document information D that corresponds to the input signal. The information providing device 100 extracts information from the one or more pieces of document information D returned by the search, generates an image based on the information, and outputs an image signal expressing the image to the display 13. Note that the information providing device 100 may also formed from a central processing unit (CPU) or other processor and a memory, for example. In this case, the processor functions as the information providing device 100 by executing a computer program stored in the memory, for example.

Specifically, as illustrated in FIG. 1, the information providing device 100 is provided with an extractor 101, a first information processor 102, a second information processor 103, a third information processor 104, a deriver 105, and an image processor 106.

The extractor 101 obtains an input signal outputted from the input device 11 and searches the document database 12 for at least one piece of document information D that corresponds to the input signal. Furthermore, the extractor 101 extracts first information indicating the names of materials, second information indicating property values of materials, and third information indicating attributes of materials from the document information D. Note that the name of a material is hereinafter also referred to as a material name, and is identification information for identifying a material. If material synthesis is described in the document information D, a material corresponding to first, second, and third information is the material that is ultimately produced by the material synthesis and is also referred to as the final material or the target material. The extractor 101 outputs the first information to the first information processor 102, the second information to the second information processor 103, and the third information to the third information processor 104.

The first information processor 102 performs a process for correcting material names indicated by the first information according to a predetermined method and outputs the processed first information to the deriver 105.

The second information processor 103 performs a process for correcting property values of materials indicated by the second information according to a predetermined method and outputs the processed second information to the deriver 105.

The third information processor 104 performs a process for correcting attributes of materials indicated by the third information according to a predetermined method and outputs the processed third information to the deriver 105.

The deriver 105 obtains the processed first, second, and third information from the first information processor 102, second information processor 103, and third information processor 104. The deriver 105 combines the processed first, second, and third information, and further derives confidence levels for the property values of each extracted material on the basis of this information. The deriver 105 outputs an output signal containing the derived confidence levels to the image processor 106.

The image processor 106 obtains the output signal from the deriver 105 and generates a first image by performing image processing according to the output signal. The image processor 106 outputs an image signal expressing the first image to the display 13.

Note that the first information processor 102, second information processor 103, and third information processor 104 in the present embodiment does not have to correct all of the first information, all of the second information, and all of the third information extracted from the document database 12. That is, the first information processor 102, second information processor 103, and third information processor 104 may correct portions of the information as necessary. In the present embodiment, the information providing device 100 is provided with the first information processor 102, second information processor 103, and third information processor 104, but at least one of the above may also not be provided.

Hereinafter, details of each of the structural elements illustrated in FIG. 1 will be described.

[Extracting Information from Metadata]

FIGS. 2A and 2B are diagrams illustrating examples of a display screen displayed on the display 13 by the image processor 106.

As illustrated in FIG. 2A, the image processor 106 displays a display screen 20 on the display 13. The display screen 20 includes a document list window 21, an extracted-information table 22, and a start extraction button 23*a*.

In the document list window 21, a list of document information D stored in the document database 12 is displayed. Namely, an icon and a document ID are displayed for each piece of document information D stored in the document database 12. The document ID is identification information for identifying a piece of document information D.

The extracted-information table 22 is a table for indicating information extracted from the document information D. The information is the document ID, the publication date, the journal name, the title, the number of times cited, the final material name, the electrical conductivity, and the activation energy value, for example. The publication date is the date on which the research paper corresponding to the document information D was published, and the journal name is the name of the journal in which the research paper was published. The title of the title of the research paper, and the number of times cited is the number of times the research paper has been cited by other research papers. The final material name is the name of the final material that is ultimately produced by material synthesis described in the research paper. The electrical conductivity is the electrical conductivity or electrical conductance expressing how easily electric current is conducted in the final material, and hereinafter is simply referred to as the "conductivity". The activation energy value is a value indicating the magnitude of the activation energy of the final material.

At this point, the information extracted from the document information D is not indicated in the initial extracted-information table 22, but the class names of the information are indicated. Note that in the examples in FIGS. 2A and 2B, "Journal", "Final Material", and "Activation" are indicated as class names of the information, with "Journal" meaning the journal name, "Final Material" means the final material name", and "Activation" meaning the activation energy value.

The start extraction button 23*a* is a button for starting extraction of each piece of information described above from the document information D stored in the document database 12.

The user performs an input operation on the input device 11 to select the icon of one or more desired pieces of document information D from among all of the document information D displayed in the document list window 21 and to select the start extraction button 23*a*. The input device 11 outputs to the extractor 101 an input signal according to such an input operation. That is, the user selects one or more desired pieces of document information D and instructs the information providing device 100 to extract various information from the document information D.

The extractor 101 obtains the above input signal from the input device 11 and extracts four pieces of bibliographic information indicating the publication date, the journal name, the title, and the number of times cited, for example, from the metadata D2 of the selected one or pieces of document information D. For each selected piece of document information D, the extractor 101 outputs to the image processor 106 the document ID of the document information D and the four pieces of bibliographic information extracted from the metadata D2 of the document information D. Note that each of the publication date, journal name, title, and number of times cited may be thought of as an attribute of a material. That is, each of the four pieces of bibliographic information may be thought of as the third information.

The image processor 106 obtains the document ID and the four pieces of bibliographic information described above from the extractor 101 and updates the display screen 20 displayed on the display 13, as illustrated in FIG. 2B. That is, the image processor 106 writes the document ID and the publication date, journal name, title, and number of times cited which are indicated by the four pieces of bibliographic information in association with each other into the extracted-information table 22.

The extracted-information table 22 included on the display screen 20 after being updated in this way indicates the publication date, journal name, title, and the like of each piece of document information D. Consequently, the user can carry out analysis narrowed down to a specific materials field or in individual eras pertaining to materials.

As illustrated in FIG. 2B, the image processor 106 includes a start fill button 23*b* on the display screen 20. The start fill button 23*b* is a button for starting extraction of three pieces of information indicating the final material name, the conductivity, and the activation energy value from the body data D1 of the document information D stored in the document database 12.

FIG. 3 is a diagram illustrating an example of metadata.

The metadata D2 is structured data and is a file in bib format, for example. That is, the metadata D2 is a file with a "bib" extension, also referred to as a BIB file. As illustrated in FIG. 3, for example, such metadata D2 describes the title of a research paper, the name of the author of the research paper, the name of an organization to which the author belongs (Affiliation), the publication date of the research paper, and the like. The number of times cited is not indicated in the metadata D2. The extractor 101 extracts the four pieces of bibliographic information described above from such metadata D2. Note that the name of the author is also referred to as the author name, and the organization to which the author belongs is also referred to as the research institution.

[Extracting Information from Body Data]

If the start fill button 23*b* is selected by an input operation performed on the input device 11 by the user, the extractor 101 obtains an input signal according to the input operation from the input device 11 and starts extraction of information from the body data D1 of one or more pieces of document information D already selected.

FIG. 4 is a diagram illustrating an example of the body data D1.

As illustrated in FIG. 4, the body data D1 includes sentences described in natural language, tables, and figures such as graphs. The extractor 101 handles these sentences, tables, and figures as extraction sources and extracts the first, second, and third information described above from the extraction sources. In other words, the extractor 101 obtains the first, second, and third information described above that is extracted from the extraction sources. Note that if text data is included in the body data D1, the extractor 101 extracts the first, second, and third information from the text data. In other words, the extractor 101 obtains the first, second, and third information that is extracted from the text data. If text data is not included in the body data D1, the extractor 101 may convert sentences expressed as images in the body data D1 into text data, and extract the first, second, and third information from the text data. In other words, the extractor 101 may obtain the first, second, and third information that is extracted from the converted text data.

In the case of extracting the first, second, and third information from text data, the extractor 101 may perform the extraction using a natural language processing tool or a deep learning tool. The natural language processing tool may be CoreNLP or MeCab, for example. The deep learning tool may be word2vec, BERT, TensorFlow, or PyTorch, for example. Thus, it is possible to extract each piece of information with high accuracy. Note that a variety of tools may also be used in combination to extract a single piece of information. Thus, each piece of information can be extracted with even higher accuracy.

Words indicating a material name are often described using a combination of chemical symbols and numerals. Consequently, the extractor 101 may use a dictionary containing registered patterns of combinations of chemical symbols and numerals to extract words matching the patterns as material names by matching the text data to the patterns. The extractor 101 expresses combinations of chemical symbols and numerals included in the text data as regular expressions, and match the regular expressions to the patterns. The extractor 101 may then extract combinations of chemical symbols and numerals corresponding to regular expressions matching the patterns as material names. Regular expressions are expressions obeying predetermined rules. For example, if the text data indicates "The conductivity and activation energy for Li6.25Al0.25La3Zr2O12 with an ion dose of 2.7×10-14 cm-2 are 4.6×10-3 S cm-1 and 0.11 eV, respectively.", the extractor 101 describes the combination of chemical symbols and numerals as a regular expression and matches the regular expression to a pattern to extract the material name "Li6.25Al0.25La3Zr2O12". With this procedure, the information that the user wants to extract can be extracted appropriately. Note that in the present disclosure, a numeral to the right of a chemical symbol denotes the composition ratio or number of atoms of the chemical element, even if the numeral is not a subscript.

The extractor 101 extracts, from an extraction source sentence, for example, "Li6.25Al0.25La3Zr2O12" as the material name, "$4.6\times10^{-3}$ $Scm^{-1}$" as a property value, namely the conductivity, of the material, and "0.11 eV" as a property value, namely the activation energy value, of the material. Note that in the present disclosure, a numeral to the right of "10" or a unit denotes an exponent, even if the numeral is not a superscript.

The extractor 101 extracts, from an extraction source table, for example, "$3.70\times10^{-4}$ $Scm^{-1}$", "$1.49\times10^{-4}$ $Scm^{-1}$", and the like as property values, namely the conductivity, of materials. At this time, the extractor 101 extracts the conductivity from the table because the table contains a conductivity-related keyword such as "conductivity" or "$Scm^{-1}$".

The extractor 101 extracts, from an extraction source graph, for example, the conductivity which is a property value of a material. At this time, the extractor 101 extracts the conductivity from the graph because the graph contains a conductivity-related keyword such as "conductivity" or "$Scm^{-1}$" in an axis label or the caption of the graph.

FIG. 5 is a diagram illustrating an example of material names and property values extracted from sentences of the body data D1.

The extractor 101 extracts a material name from each sentence of the body data D1. At this time, as illustrated in FIG. 5, for example, the extractor 101 records the document ID, an extraction line number, and a span in association with the extracted material name in an extraction list 31. The document ID is identification information for the document information D containing the body data D1 which is the extraction source of the extracted material name. The extraction line number is the number of the line on which the material name is described in the body data D1. The span indicates a start point where the description of the material name starts and an end point where the description ends on the line of the extraction line number. The start point is indicated by the number of characters from the first character of the line to the first character of the material name, and the end point is indicated by the number of characters from the first character of the line to the last character of the material name.

Note that if a material name extends across more than one line, the numbers of the lines may be recorded as extraction line numbers. The extraction line number may also be the number of the sentence in which the material name is described in the body data D1. The number of a sentence is a number for identifying the sentence, and is assigned to all sentences in the body data D1, for example. The extractor 101 may also record, in the extraction list 31, the extraction line number and the number of the page on which the material name is described in the body data D1.

When extracting a material name, the extractor 101 may extract a combination of chemical symbols and numerals as the material name, for example, and if there are parentheses beside the chemical symbols and numerals, the extractor 101 may also extract the parentheses and a character string inside the parentheses as a part of the material name. For example, the extractor 101 extracts "Li6.25Al0.25La3Zr2O12 (LALZ)" as the material name. The extractor 101 may also recognize the character string inside the parentheses as an abbreviation of the material name. For example, the extractor 101 recognizes "Li6.25Al0.25La3Zr2O12" in "Li6.25Al0.25La3Zr2O12 (LALZ)" as a standard representation of the material name and recognize "LALZ" as an abbreviation of the material name "Li6.25Al0.25La3Zr2O12". As a result, the extractor 101 also extracts "LALZ" as the material name from the body data D1.

Note that if it is determined that the character string inside the parentheses contains a variable, the extractor 101 does not recognize the character string inside the parentheses as an abbreviation of the material name. For example, if the character string inside the parentheses contains the variable x, such as in "x=0.1, 0.2, 0.3", the extractor 101 does not recognize the character string inside the parentheses as an abbreviation of the material name. In some cases, a material name extracted by the extractor 101 may include the mixing ratio of components. For example, in the case of the material name "60Li2So4*40Li3BO3", the material name contains the mixing ratio "60:40" of the component "Li2SO4" and the component "Li3BO3". Such variables and mixing ratios may also be corrected through processing, described later, by the first information processor 102.

A material name extracted by the extractor 101 is the name of a target material or a final material as described above. For example, if the body data D1 contains more than one material name, the extractor 101 may extract the name of the final material from the material names using a natural language processing tool, a deep learning tool, or the like. For example, if the sentence "XXX was synthesized using . . . " is described in the body data D1, the extractor 101 retrieves "synthesized" in the sentence as a keyword. The extractor 101 then determines that "XXX" given as the object of the keyword is the name of the final material (that is, the final material name), and extracts the final material name "XXX".

The extractor 101 extracts a material name and a property value from each sentence of the body data D1. For example, the property value is conductivity. At this time, as illustrated in FIG. 5, for example, the extractor 101 records the document ID, the extraction line number, and the span in association with the extracted property value in an extraction list 32. The document ID is identification information for the document information D containing the body data D1 which is the extraction source of the extracted property value. The extraction line number is the number of the line on which the property value is described in the body data D1. Note that the extraction line number may also be the number of the sentence as described above. The span indicates a start point where the description of the material name starts and an end point where the description ends on the line of the extraction line number. The start point is indicated by the number of characters from the first character of the line to the first character of the property value, and the end point is indicated by the number of characters from the first character of the line to the last character of the property value.

In a specific example, a sentence of the body data D1 is "The conductivity and activation energy for Li6.25Al0.25La3Zr2O12 with an ion dose of 2.7×10-14 cm-2 are 4.6×10-3 S cm-1 and 0.11 eV, respectively." In this case, by describing the combination of a numeral and a unit as a regular expression and matching the regular expression to a pattern, the extractor 101 recognizes and extracts "4.6×10-3 Scm-1" from the sentence as the property value.

The body data D1 of a research paper contains a great variety of sentences that do not contain material names and property values. For example, there are sentences containing references, acknowledgments, or the like. In other words, if all sentences in the body data D1 are extraction sources, there is a possibility that much noise other than material names and property values may be extracted. That is, extraction errors occur easily. For this reason, the extractor 101 in the present embodiment may handle sentences containing material-related words or the like as extraction sources.

For example, a sentence containing a material name, property value, or the like may contain a keyword related thereto in some cases. That is, if a sentence contains a keyboard, there is a strong possibility that the sentence contains a material name or a property value. For example, in the sentences "XXX was synthesized using . . . " and "The conductivity and activation energy for XXX are YYY S $cm^{-1}$ and ZZZ eV, respectively.", words such as "synthesized", "conductivity", "activation energy", and "$Scm^{-1}$" are keywords. The extractor 101 may handle a sentence containing such keywords as an extraction source and use pattern matching with regular expressions or the like to extract a material name or a property value from the extraction source sentence. With this procedure, a material name or property value desired by the user can be extracted reliably.

When extracting a material name and a property value, if one of either the material name or the property value is extracted from a unit of processing, such as a sentence or clause, for example, the extractor 101 attempts to also extract the other from that unit of processing. If one of either the material name or the property value is extracted from a unit of processing but the other is not extracted successfully, the extractor 101 may store the unit of processing in a database. Such a unit of processing may be used as training data for machine learning. The extractor 101 may also prompt the user for extraction of the material name, extraction of the property value, or extraction of the material name and the property value from the unit of processing. That is, the extractor 101 may display an error message on the display 13 via the image processor 106 and prompt for extraction of the material name, extraction of the property value, or extraction of the material name and the property value by the user.

FIG. 6A illustrates an example of figures treated as extraction sources in the body data D1, and FIG. 6B is a diagram illustrating an example of property values extracted from extraction source figures.

The extractor 101 extracts material names and property values from figures such as line graphs and scatter plots in the body data D1. For example, as illustrated in FIG. 6A, the extractor 101 extracts the conductivity and temperature of materials from graphs included in the body data D1 for each of the document ID "0001" and the document ID "0002". For example, the conductivity is the property value. The temperature is a condition used in the synthesis method for synthesizing a material, and is an attribute of the material. To extract the above, the extractor 101 uses tools such as image processing, image recognition, and deep learning, for example.

In the graphs illustrated in FIG. 6A, the vertical axis represents conductivity and the horizontal axis represents temperature. Note that the horizontal axis is also referred to as the x axis and the vertical axis is also referred to as the y axis. Additionally, the graphs depict a line plot for the case of the material in a Bulk state and a line plot for the case of the material in a Total state. Bulk is the state of the material alone, for example, while Total is the state of the material incorporated into a product, for example. The x axis has scale marks at 1000° C., 1200° C., 1400° C., 1600° C., 1800° C., and 2000° C.

For example, as in FIG. 6A, the extractor 101 reads the conductivity corresponding to the temperature indicated by each of the scale marks on the x axis of the graph from each of the Bulk line plot and the Total line plot in the graph. Thus, the conductivity corresponding each of the temperatures 1000° C., 1200° C., 1400° C., 1600° C., 1800° C., and 2000° C. is extracted for each of the Bulk material and the Total material.

For example, in the graph of the body data D1 with the document ID "0001", the extractor 101 reads "0.0070 S/cm" as the conductivity on the y axis indicated by the Bulk line plot when the temperature on the x axis is 1000° C. Note that the temperature on the x axis is also referred to as the x value and the conductivity on the y axis is also referred to as the y value.

Next, as illustrated in FIG. 6B, the extractor 101 records, in an extraction list 33, the document IDs described above, figure numbers of the graphs included in the body data D1 with the document IDs, the x values which are the temperatures at the scale marks on the x axis, and the y values which are the conductivities read out at the x values. Additionally, the extractor 101 records, in the extraction list 33, the x-axis label and y-axis label of the graphs, the material state (that is, Bulk or Total) corresponding to the read-out conductivity, and the caption of the graphs. Note that since the material name is described in the caption in many cases, the caption can be utilized as a clue for associating the x values and y values with the material name.

Note that even when a graph contains more than one line plot, like the example in FIG. 6A, the extractor 101 extracts conductivity and temperature while distinguishing between the line plots. In the example in FIG. 6A, the extractor 101 extracts the temperature at each scale mark marked on the x axis of the graph and the conductivity corresponding to the temperature, but the extractor 101 may also not extract the above information at each scale mark. For example, the extractor 101 may extract the temperature and the conductivity corresponding to the temperature at each temperature indicated by any user-designated temperature interval. Specifically, in the example illustrated in FIG. 6A, the temperature and the conductivity corresponding to the temperature are extracted at each of the temperatures 1000° C., 1200° C., 1400° C., 1600° C., 1800° C., and 2000° C. In this case, the temperature interval is 200° C. However, the extractor 101 may also set the temperature interval to 100° C. in response to an input operation on the input device 11 by the user. In this case, the extractor 101 extracts the temperature and the conductivity corresponding to the temperature at each temperature indicated by the 100° C. temperature interval in the range from 1000° C. to 2000° C. That is, the extractor 101 extracts the temperature and conductivity corresponding to the temperature at each of 1000° C., 1100° C., 1200° C., 1300° C., 1400° C., 1500° C., 1600° C., 1700° C., 1800° C., 1900° C., and 2000° C. Thus, information such as conductivity and temperature that the user wants to extract can be extracted reliably. Note that when extracting temperatures other than the temperatures at the scale marks, the extractor 101 identify the length of the space between two scale marks and the temperatures at the scale marks by using an image recognition tool, for example. Next, the extractor 101 uses the identified length and temperatures to interpolate temperatures at intermediate points between the scale marks. Thus, temperatures other than the temperatures at the scale marks and the conductivities corresponding to the temperatures can be extracted appropriately.

In the extraction list 33 illustrated in FIG. 6B, the line number or sentence number of a sentence adjacent to the figure with the extracted figure number may be recorded. Thus, by referencing the extraction list 33, a sentence related to a figure can be found easily.

Figure 7A:
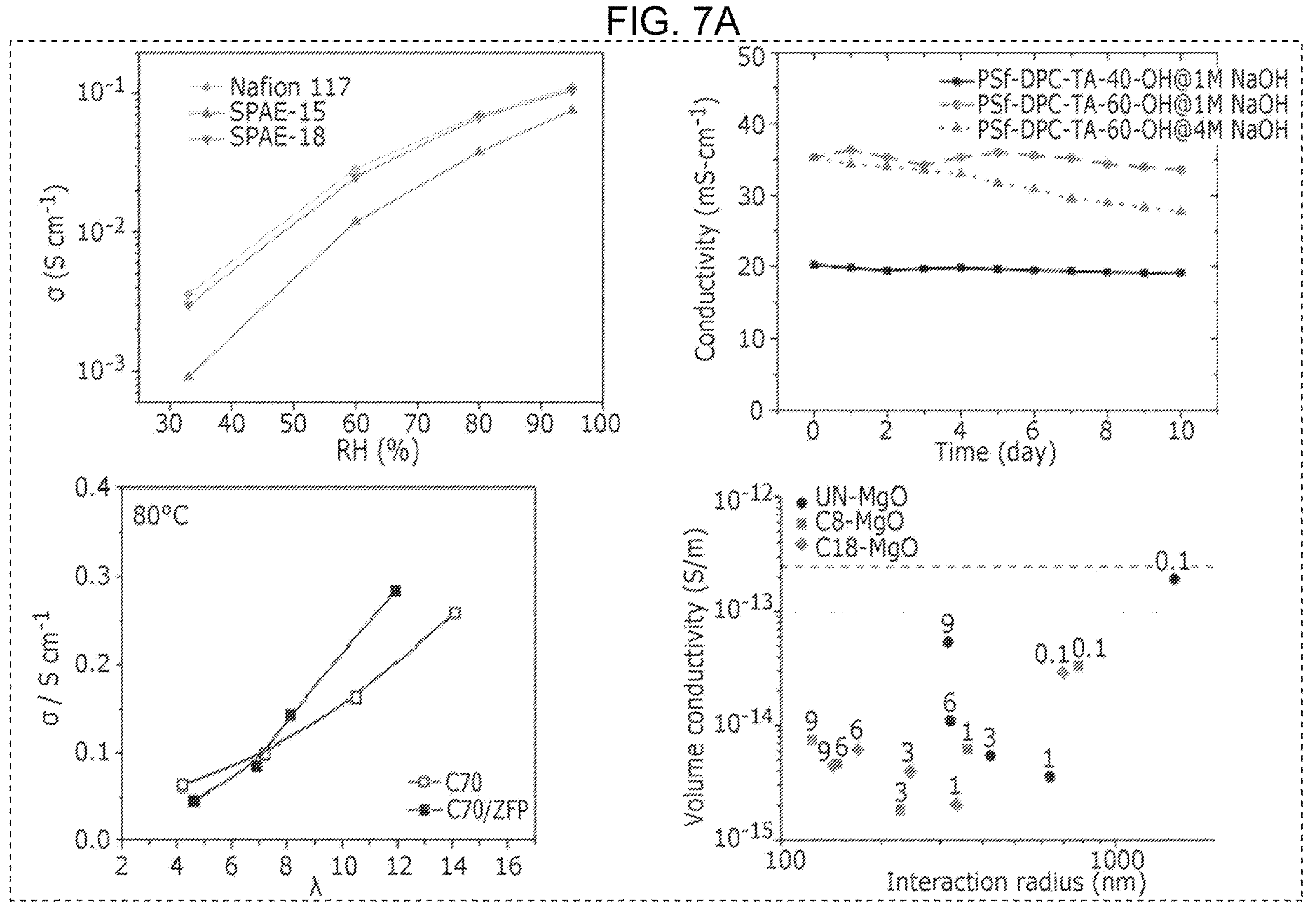
FIG. 7A is a diagram illustrating an example of figures treated as extraction sources by an extractor in Embodiment 1.
Figure 7B:
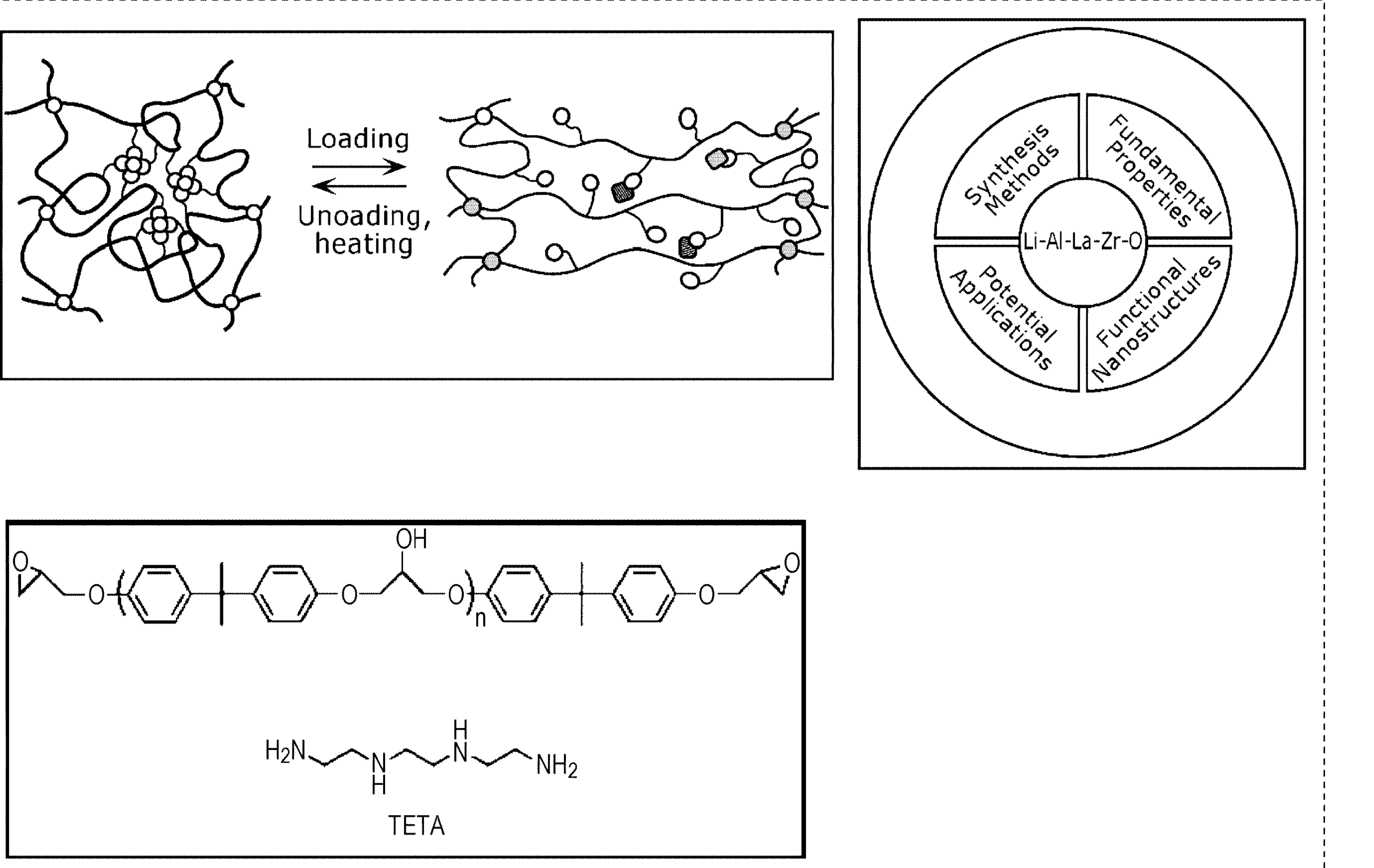
FIG. 7B is a diagram illustrating an example of figures excluded as extraction sources by the extractor in Embodiment 1.

FIG. 7A illustrates an example of figures treated as extraction sources by the extractor 101, and FIG. 7B is a diagram illustrating an example of figures excluded as extraction sources by the extractor 101.

In addition to figures related to property values of materials, figures not related to property values exist in large numbers in the body data D1. Figures not related to property values are, for example, diagrams for explaining an outline, experimental procedures, and the like, or photographs of experimental equipment, sources, and the like. Consequently, if all sentences included in the body data D1 are treated as extraction sources, errors occur easily in the extraction of property values and the like.

Accordingly, from among all figures included in the body data D1, the extractor 101 narrows down the figures to be treated as extraction sources, as illustrated in FIG. 7A, and excludes the figures illustrated in FIG. 7B from being extraction sources. As illustrated in FIG. 7B, for example, figures excluded from being extraction sources are figures illustrating reaction processes, figures illustrating the structure of a material, and the like. For example, the extractor 101 narrows down the figures to be treated as extraction sources by using an image recognition tool, a natural language processing tool, a deep learning tool, and the like. The image recognition tool may be OpenCV or Pillow, for example. Thus, highly accurate narrowing can be performed.

Alternatively, the extractor 101 may narrow down the figures to be treated as extraction sources by using pattern matching with regular expressions. The extractor 101 extracts words, units, character strings, or the like from captions, labels, or the like in figures, and generates a regular expression from the extracted words or the like. The extractor 101 then compares the regular expression to a pattern and treats a figure containing a regular expression matching the pattern as an extraction source. Note that the labels above are the labels applied to the axes of a graph, for example. Thus, highly accurate narrowing can be performed.

Specifically, the extractor 101 extracts words from the y-axis label "Conductivity (S/cm)", the caption "FIG. 1. Temperature dependent electrical conductivity of Li6.25Al0.25La3Zr2O12 samples", or the like illustrated in FIG. 6A, expresses the words as a regular expression, and compares the regular expression to a pattern. For example, the regular expression of "Conductivity" or "S/cm" included in the y-axis label is matched to a pattern, and the regular expression of "conductivity" included in the caption is matched to a pattern. As a result, the extractor 101 treats the graph illustrated in FIG. 6A as an extraction source. Thus, processing that attempts to forcibly extract property values from figures not related to property values can be suppressed.

FIG. 8A illustrates an example of tables treated as extraction sources in the body data D1, and FIG. 8B is a diagram illustrating an example of property values extracted from extraction source tables.

The extractor 101 extracts property values from Table 1 and Table 2 illustrated in FIG. 8A, for example, of the body data D1. To extract property values, the extractor 101 uses an image recognition tool, a deep learning tool, pattern matching with regular expressions, or the like in a manner similar to the above.

For example, in a table containing property values, keywords related to the property values, such as "conductivity", "eV", "S/cm", or "$Scm^{-1}$" are described in the column name cells in many cases. Consequently, the extractor 101 first uses a natural language processing tool, a deep learning tool, or pattern matching with regular expressions to detect these keywords from tables. Keywords are preregistered in the extractor 101. The extractor 101 then extracts property values from tables in which the keywords are detected. For example, the extractor 101 detects a keyword from a column name cell of the table, detects a material name from a row name cell of the table, and extracts a value stored in the cell at the intersection of the column of the column name cell and the row of the row name cell as a property value for that material name. Thus, property values related to keywords registered in advance can be extracted reliably.

Specifically, in Table 2 with the document ID "0001" in FIG. 8A, "Conductivity" and "$Scm^{-1}$" are described in one of the column name cells, and "Li6.25Al0.25La3Zr2O12 (ours)" is described in one of the row name cells. Consequently, the extractor 101 detects the keyword from the column name cell, detects the material name "Li6.25Al0.25La3Zr2O12 (ours)" from the row name cell, and extracts the value "2.45" stored in the cell at the intersection of the column of the column name cell and the row of the row name cell as the property value for the material name. The extractor 101 may also extract, as the property value, the character string obtained by concatenating the value "2.45" with the units "$Scm^{-1}$".

Next, as illustrated in FIG. 8B, the extractor 101 records detected material names, detected keywords, and extracted property values in an extraction list 34. At this time, the extractor 101 records the material name in a "Row label" column of the extraction list 34, for example, and record the keyword in a "Column label" column of the extraction list 34. Additionally, the extractor 101 records, in the extraction list 34, the figure number of the table from which the property value was extracted and the document ID of the body data D1 containing the table.

If a property value other than conductivity is described, the extractor 101 may also extract the value as another property value. The value may be density, for example. If a structure such as "Cubic" or "Hexagonal" is indicated like in Table 1 of FIG. 8A, the extractor 101 may also extract information indicating the structure. The density and information indicating the structure that are extracted in this way are recorded together with the conductivity in the extraction list 34. Note that the density and information indicating the structure may be handled as third information.

As above, the extractor 101 according to the present embodiment extracts, for each of multiple materials, identification information (that is, a material name) for identifying the material and property values of the material from at least one piece of document information D. Note that the identification information is first information and the property values are second information. The extractor 101 extracts multiple classes of property values as property values of the material. The multiple classes of property values including a property value of a first class and a property value of a second class. For example, the property value of the first class is conductivity, and the property value of the second class is the activation energy value. Furthermore, the extractor 101 extracts, for each of the materials, attribute information indicating attributes of the material from at least one piece of document information D. Note that the attribute information is third information. For example, the attributes are the publication date, number of times cited, author, and temperature.

[Correction Process by First Information Processor]

The first information processor 102 obtains first information indicating material names from the extractor 101. That is, material names are obtained by the first information processor 102. In the obtaining of the first information, the first information processor 102 may obtain from the extractor 101 the extraction lists 31 and 34 illustrated in FIGS. 5 and 8B, respectively, which contain the first information. The first information processor 102 corrects the obtained material names. This correction is also referred to as the correction process or the normalization process.

Figure 9:
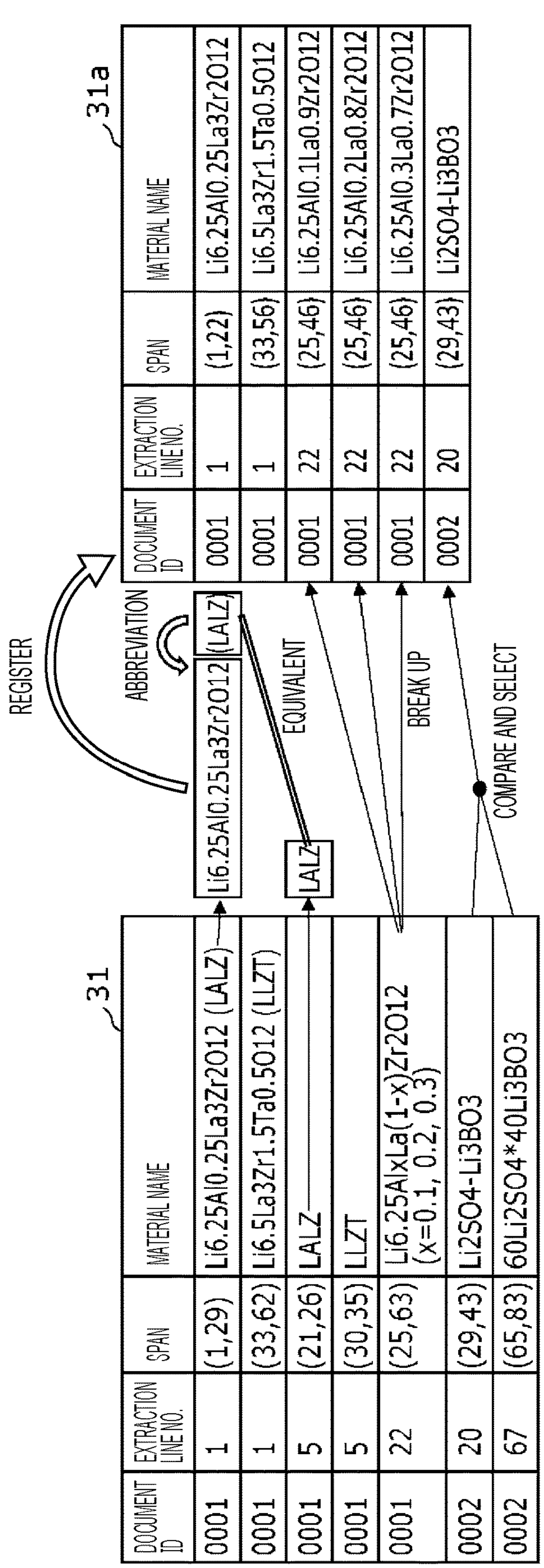
FIG. 9 is a diagram illustrating an example of a material name normalization process in Embodiment 1.

FIG. 9 is a diagram illustrating an example of the material name normalization process.

Extraction of material names by natural language processing (NLP) or machine learning such as deep learning is difficult to achieve with 100% accuracy. For example, a material name may be described using the official name of the material (such as Li6.25Al0.25La3Zr2O12, for example) at the beginning of a research paper and described using an abbreviation (such as LALZO, for example) later on. Furthermore, information such as the mixing ratio or state of each component may be expressed in the material name. Because of this, the material name of a single material may be described using more than representation. For example, representations such as sulfonated polyimide, SPI, SPI/poly (vinylidene fluoride) (PVDF) blends, 50 wt % of SPI content, and so on may be described. Consequently, as illustrated in FIGS. 5 and 9, material names for the same material are recorded with more than representation in the extraction list 31 generated by the extractor 101.

Accordingly, the first information processor 102 executes a normalization process for correcting the representations of material names included in the extraction list 31, and thereby converts the extraction list 31 to a corrected extraction list 31*a*.

For example, in the material name "Li6.25Al0.25La3Zr2O12 (LALZ)" included in the extraction list 31, the first information processor 102 recognizes the character string inside the parentheses as an abbreviation of the character string outside the parentheses, and recognizes the character string outside the parentheses as a standard representation of the material name. The first information processor 102 determines that the abbreviation is equivalent to the standard representation and removes the parentheses and the abbreviation inside the parentheses from the material name. In addition, the first information processor 102 replaces the abbreviation included in the extraction list 31 with the standard representation. Specifically, the first information processor 102 corrects the material name "LALZ" included in the extraction list 31 to "Li6.25Al0.25La3Zr2O12". Alternatively, the first information processor 102 removes the abbreviation from the extraction list 31.

In the material name "Li6.25AlxLa(1-x)Zr2O12 (x=0.1, 0.2, 0.3)" included in the extraction list 31, the first information processor 102 recognizes that x is a variable. Note that the variable x indicates the mixing ratio of Al and La. The first information processor 102 removes "(x=0.1, 0.2, 0.3)" from "Li6.25AlxLa(1-x)Zr2O12 (x=0.1, 0.2, 0.3)" and substitutes the values of "x=0.1, 0.2, 0.3" into the variable x in "Li6.25AlxLa(1-x)Zr2O12". Thus, the first information processor 102 breaks up "Li6.25AlxLa(1-x)Zr2O12 (x=0.1, 0.2, 0.3)" into "Li6.25Al0.1La0.9Zr2O12", "Li6.25Al0.2La0.8Zr2O12", and "Li6.25Al0.3La0.7Zr2O12". The first information processor 102 then corrects the pre-breakup "Li6.25AlxLa(1-x) Zr2O12" included in the extraction list 31 to the three representations obtained by the breakup.

The first information processor 102 compares the material name "60Li2SO4*40Li3BO3" and the material name "Li2SO4-Li3BO3" included in the extraction list 31, and thereby determines that the mixing ratio is described in the material name "60Li2SO4*40Li3BO3". As a result, the first information processor 102 removes "60Li2SO4*40Li3BO3" included in the extraction list 31. Alternatively, the first information processor 102 corrects "60Li2SO4*40Li3BO3" included in the extraction list 31 to "Li2SO4-Li3BO3".

The corrected extraction list 31*a* is generated by having the first information processor 102 make such corrections to the representations of the material names included in the extraction list 31.

Note that if the extraction list 31 is searched to find two material names in which the start and end points of the span are close to each other and the representations are similar, and two such material names are found, the first information processor 102 may determine that the material names are being used with respect to the same material. The first information processor 102 may determine that material names with more than one representation are being used with respect to the same material by performing natural language processing dependency parsing or the like on sentences in the body data D1.

In some cases, garbled characters, extraction errors, and the like may occur in the extraction of material names and the like by the extractor 101. Garbled characters occur due to error when converting from image data contained in a file in PDF or XML format to text data, for example. Extraction errors are caused by illegible or corrupted characters, for example. The first information processor 102 may detect such garbled characters and extraction errors and correct the material names included in the extraction list 31.

[Correction Process by Second Information Processor]

The second information processor 103 obtains second information indicating property values of materials from the extractor 101. That is, property values are obtained by the second information processor 103. In the obtaining of the second information, the second information processor 103 may obtain from the extractor 101 the extraction lists 32, 33, and 34 illustrated in FIGS. 5, 6B, and 8B, respectively, which contain the second information. The second information processor 103 corrects the obtained property values. This correction is also referred to as the correction process or the conversion process.

FIG. 10 is an example of a material property value conversion process.

The second information processor 103 converts combinations of numerals and units included in the property values extracted by the extractor 101 into numerals. The second information processor 103 uses a dictionary containing preregistered units that occur frequently in materials research papers, for example, to convert numerals in the property values extracted by the extractor 101 into numerals expressed using standard units and remove the units included in the property values. The second information processor 103 may also convert numeric representations using powers of 10 included in property values into numeric representations not using powers of 10.

For example, as illustrated in FIG. 10, in the extracted property value "$4.6\times10^{-3}$ $Scm^{-1}$", the second information processor 103 replaces "10-3" with 0.001 and performs the operation "4.6×0.001" to convert the property value "$4.6\times10^{-3}$ $Scm^{-1}$" into "0.0046". In the extracted property value "5.4 $mScm^{-1}$", the second information processor 103 replaces "m" with 0.001 and performs the operation "5.4×0.001" to convert the property value "5.4 $mScm^{-1}$" into "0.0054".

In some cases, like with "2.0-2.2 $mScm^{-1}$", for example, an extracted property value may indicate a numeric range. In this case, the second information processor 103 detects a hyphenation symbol to recognize that the property value indicates a numeric range. As a result, the second information processor 103 interpolates property values within the numeric range to convert the property value "2.0-2.2 $mScm^{-1}$" into "0.0020, 0.0021, 0.0022". In this example, the second information processor 103 interpolates property values at an interval of 0.0001, but the interval may be changed automatically or the interval may be set according to an input operation on the input device 11 by the user.

In some cases, like with "$4.38(6)\times10^{-3}$ $Scm^{-1}$", for example, an extracted property value may include error. Error is indicated by a numeral in parentheses. In this case, the third information processor 104 performs the operation "0.00438±0.00006", for example, to convert the property value "4.38(6)×$10^{-3}$ $Scm^{-1}$" into "0.00444, 0.00432". That is, a property value indicating error is converted into the maximum and minimum values for the property value in the error range.

It is possible that property values extracted from a figure in the body data D1 by the extractor 101 are incorrect. For example, the image of the figure treated as the extraction source may be unclear, line plots included in the figure may overlap too much, the line plots may be indistinct, or the figure may be too small. In such cases, it is possible that the extracted property values may be incorrect. Specifically, as illustrated in FIG. 6A, the graph of the body data D1 with the document ID "0002" contains an enlarged partial view. There is a possibility that the enlarged partial view may cause property values extracted by the extractor 101 to be incorrect.

The second information processor 103 may correct or remove such incorrect property values. For example, the second information processor 103 may use an image recognition tool to estimate a portion of a figure where error readily occurs and remove property values extracted from that portion. Alternatively, the second information processor 103 may compare property values extracted from a figure with property values extracted from another figure in the same body data D1, detect property values that differ greatly from each other, and remove the differing property values. In the case in which the property value is conductivity, the second information processor 103 may use a dictionary containing a preregistered numeric range that conductivity may take, for example, and remove the conductivity if the extracted conductivity falls outside the registered numeric range. Alternatively, the second information processor 103 may clip the conductivity to the upper or lower limit values of the numeric range.

It is possible that the extraction list 34 containing property values extracted from a table in the body data D1 by the extractor 101 is incorrect. For example, as illustrated in FIG. 8A, Table 2 with the document ID "0001" has two-tiered column labels. That is, there is a column label describing "Experimental 1" and a column label describing "Conductivity (mScm-1)". In this case, although "Conductivity (mScm-1)" should be recorded in the column label column of the extraction list 34, the extractor 101 may incorrectly record "Experimental 1", as illustrated in FIG. 8B.

In this case, the second information processor 103 compares the property value "2.45" indicated in the extraction list 34 to the numeric range that the conductivity may take, which is registered in the dictionary described above. If the property value is included in the numeric range, the second information processor 103 determines that the property value is associated with "Conductivity (mScm-1)", even if the property value had been associated with "Experimental 1" in the extraction list 34. As a result, the second information processor 103 replaces "Experimental 1" with "Conductivity (mScm-1)" in the extraction list 34 and handles the property value as conductivity.

It is possible that property values extracted from a table in the body data D1 by the extractor 101 are incorrect. For example, if the table is indistinct, it is possible that the extracted property values may be incorrect. In this case, the second information processor 103 likewise may detect that a property value is incorrect by comparing the property values to a numeric range that the property value may take, which is registered in a dictionary.

[Correction Process by Third Information Processor]

The third information processor 104 obtains third information indicating material attributes from the extractor 101. That is, attributes are obtained by the third information processor 104. In the obtaining of the third information, the third information processor 104 may obtain from the extractor 101 the extraction list 33 illustrated in FIG. 6B, which contains the third information. In the extraction list 33, the x value, namely temperature, is indicated as the third information. The third information processor 104 corrects the obtained third information, that is, the attributes, in a manner similar to the first information processor 102 and the second information processor 103.

[Information Combining Process]

For each piece of body data D1, the deriver 105 generates combined information by obtaining and combining the information outputted from each of the first information processor 102, the second information processor 103, and the third information processor 104. That is, the deriver 105 associates the processed first information outputted from the first information processor 102, the processed second information outputted from the second information processor 103, and the processing third information outputted from the third information processor 104 with the document ID of the body data D1. Note that the processed first information, processed second information, and processed third information indicates corrected material names, corrected property values, and corrected attributes, respectively. Thus, combined information is generated in which material names, property values, and attributes are associated with a document ID.

For example, for each piece of body data D1, the deriver 105 generates obtains a corrected extraction list (for example, the extraction list 31*a*) from each of the first information processor 102, the second information processor 103, and the third information processor 104. The deriver 105 then identifies the distance between a material name and a property value and the distance between a material name and an attribute on the basis of the figure number, extraction line number, span, and the like indicated in the extraction lists, and associates the material name, property value, and attribute. The deriver 105 associates a material name, property value, and attribute extracted from the same sentence or figure. Furthermore, a material name, property value, and attribute extracted from adjacent sentences or the like can also be associated. Note that the distance may be the difference between the extraction line numbers where two pieces of information are described, or a distance based on the extraction line number and the span. For example, the deriver 105 may identify the distance between a material name and a property value by calculating the number of characters from the end point of the material name to the start point of the property value. The deriver 105 may also create distance-dependent association rules and uses a natural language processing dependency tool to associate a material name, property value, and attribute. The natural language processing dependency tool may be ChemDataExtractor, for example.

The deriver 105 outputs the combined information for each piece of the body data D1 to the image processor 106. The image processor 106 updates the extracted-information table 22 by obtaining the combined information from the deriver 105 and including the combined information in the extracted-information table 22.

FIG. 11 is a diagram illustrating an example of the updated extracted-information table 22.

The updated extracted-information table 22 includes combined information, that is, first information, second information, and third information, extracted from each piece of the body data D1. The first information indicates final material names, the two pieces of second information indicate the conductivity and activation energy value, respectively, and the two pieces of third information indicate the author name and the research institution name, respectively. Note that "Author" and "Research Institution" denoted as class names of information in the extracted-information table 22 mean the author name and the research institution name, respectively.

Note that in the example illustrated in FIG. 11, the author name and the research institution name are each extracted from the body data D1 as the third information, that is, attributes. However, these attributes may also be extracted from the metadata D2 of the document information D. In the example illustrated in FIG. 11, "LiSo . . . " is indicated as the final material names, but specific examples of the final material names are "Li7La3Zr2O12", "LiCoO2", "Li3P—LiCl", "Li1.33Ti1.67O4", "Li2CO3", and the like.

FIG. 12 is a diagram illustrating an example of the display screen 20 including the updated extracted-information table 22.

As illustrated in FIG. 12, the image processor 106 displays the display screen 20 including the updated extracted-information table 22 on the display 13. At this time, the image processor 106 includes a start graph display button 23*c* on the display screen 20. The start graph display button 23*c* is a button for starting a display of a property value graph. In the example illustrated in FIG. 12, the conductivity and the activation energy value are each property values. The property value graph is a graph illustrating the property values indicated in each piece of document information D. Note that although the author name and research institution name are not indicated in the extracted-information table 22 illustrated in FIG. 12, these names may also be indicated.

By referring to such an extracted-information table 22 on the display screen 20, the user can check what materials with what kinds of property values are described in documents published on which dates. The display screen 20 illustrated in FIG. 12 does not include the document list window 21 in FIGS. 2A and 2B, but the document list window 21 may also be included. In this case, the user may perform an input operation on the input device 11 to deselect the icon of a piece of document information D or select a new icon in the document list window 21. The image processor 106 may update the extracted-information table 22 in response to the selection and deselection. Such an extracted-information table 22 allows for analysis in individual eras, analysis narrowed down to a specific materials field, and the like.

Figure 13:
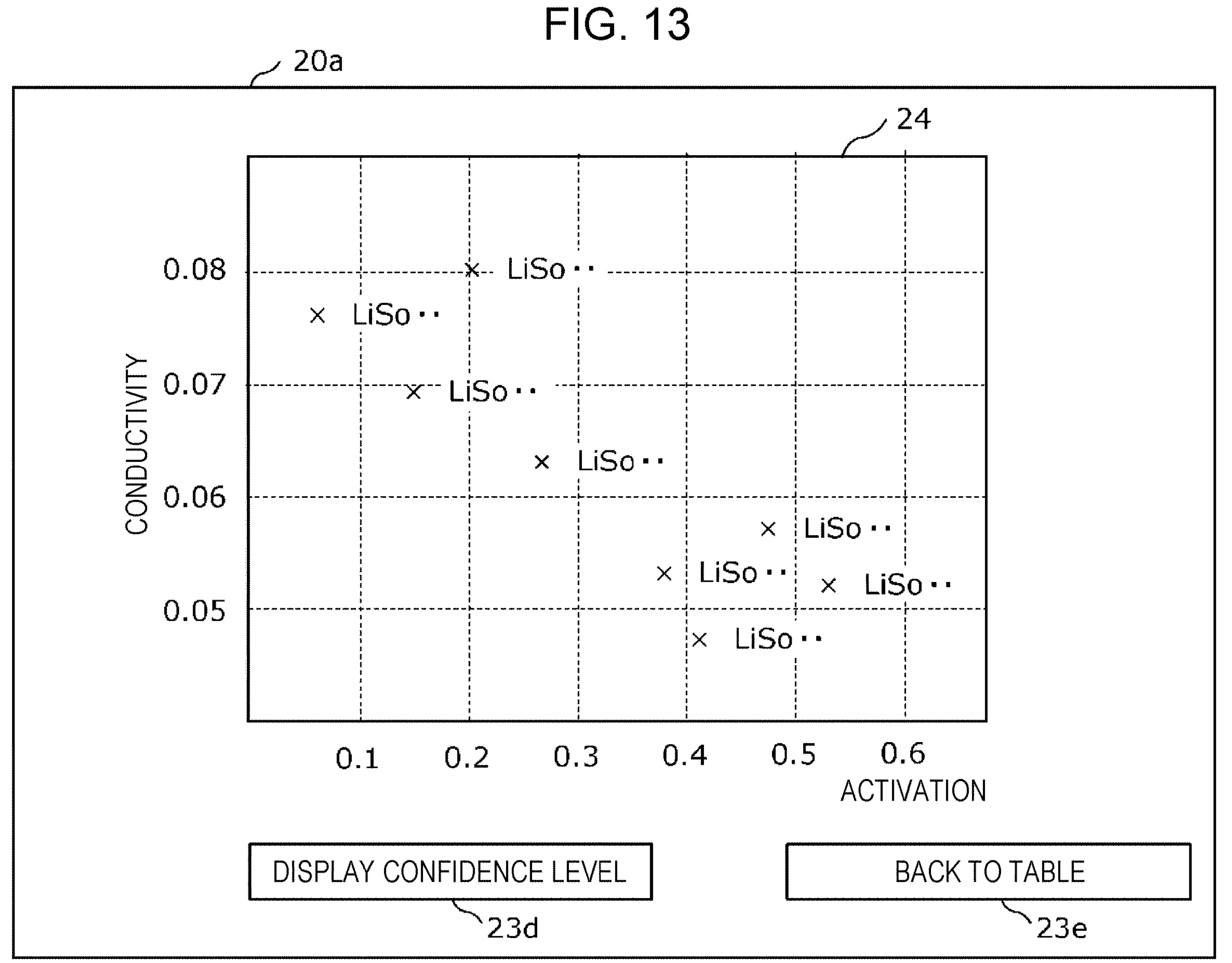
FIG. 13 is a diagram illustrating an example of a graph display screen including a property value graph in Embodiment 1.

FIG. 13 is a diagram illustrating an example of a graph display screen including a property value graph in Embodiment 1. "Activation" described in FIGS. 13, 14, 15A, 15B, and 15C means "activation energy".

For example, the user performs an input operation on the input device 11 to select the start graph display button 23*c* on the display screen 20 illustrated in FIG. 12. This causes the input device 11 to output an input signal prompting the display of a property value graph to the image processor 106. The image processor 106, upon receiving the input signal, switches the display screen 20 displayed on the display 13 to a graph display screen 20*a*.

As illustrated in FIG. 13, the graph display screen 20*a* includes a property value graph 24, a display confidence level button 23*d*, and a return button 23*e*. The display confidence level button 23*d* is a button for displaying the confidence levels of property values corresponding to marks plotted on the property value graph 24. The return button 23*e* is a button for returning the graph display screen 20*a* to the display screen 20 in FIG. 12. The return button 23*e* is labeled with the character string "Back to table", for example.

The property value graph 24 is a graph indicating the activation energy value on the horizontal axis and the conductivity on the vertical axis. For each material name (that is, final material name) indicated in the extracted-information table 22, the image processor 106 plots a mark at a position on the property value graph 24 corresponding to two types of property values indicated in association with the material name. The two types of a property values are a property value of the first class and a property value of the second class, specifically the conductivity and the activation energy value. In the example illustrated in FIG. 13, the marks are X symbols. The image processor 106 places the material name corresponding to each mark in the vicinity of the marks. Thus, the property value graph 24 illustrating the conductivity and activation energy value of each material extracted from the document information D selected by the user is displayed on the graph display screen 20*a*. The property value graph 24 illustrates the conductivity and activation energy value in association with the material name.

Note that the materials or material names corresponding to the marks plotted on the property value graph 24 may be the same or different. For example, the materials may be materials for the same purpose to be used for the negative electrode or positive electrode of a battery, or may be materials that each contain the elemental species Li. These materials may also be material that each contain the same elemental species, but with different composition ratios of the elemental species. In the example illustrated in FIGS. 13-15C, "LiSo . . . " is indicated as the material names, but specific examples of the material names are "Li7La3Zr2O12", "LiCoO2", "Li3P—LiCl", "Li1.33Ti1.67O4", "Li2CO3", and the like.

For example, a materials researcher or other user can reference such a graph display screen 20*a* to explore materials that are suitable for their own experimental environment or object of experiment, with consideration for the balance of property values.

Note that the image processor 106 may automatically adjust the scale of the vertical and horizontal axes of the property value graph 24. Such a function for automatically adjusting the scale is expected to help the user get a full and accurate picture of the property values. For example, the image processor 106 determines the scale according to the maximum and minimum property values indicated in the extracted-information table 22. In a specific example, the image processor 106 sets the minimum property values to the origin of the property value graph 24 and sets the maximum property values to the ends of the axes of the property value graph 24. However, if the extracted-information table 22 contains outliers as property values, it is possible that the presence of the outliers may make it difficult to observe property values other than the outliers on the property value graph 24. In a specific example, 99% of all property values included in the extracted-information table 22 fall within the range from 0 to 0.001 while the remaining 1% of the property values fall within the range from 1.0 to 2.0. In this case, the 1% of the property values are outliers. If these property values are used to determine the scale, the 1% outliers will cause the scale marks to be set in the range from 0 to 2.0 at intervals of 0.1 on the axis of the property value graph 24 corresponding to the property values. As a result, it is difficult to appropriately observe the 99% of the property values to be observed originally.

Consequently, the image processor 106 may exclude outliers included in the extracted-information table 22 and generate the property value graph 24 on the basis of the property values other than the outliers. Thus, the property values to be observed originally can be observed appropriately.

Alternatively, the image processor 106 may adjust the scale of the vertical and horizontal axes of the property value graph 24 according to the class of material. For example, the image processor 106 identifies the class of material from the material name of the material and sets the scale of property values associated with the identified class as the scale of the vertical and horizontal axes of the property value graph 24. In a specific example, if solid-state electrolyte is identified as the class of material, the image processor 106 sets the scale of the axis of the property value graph 24 corresponding to conductivity from 0 to 0.001 because the conductivity of a solid-state electrolyte is from 0 S/cm to 0.001 S/cm. Such a range of the conductivity of a solid-state electrolyte may be preregistered in memory. The image processor 106 may also adjust the scale of the vertical and horizontal axes of the property value graph 24 in response to an input operation on the input device 11 by the user. If the property values are determined to be conductivity, the image processor 106 may also set a predetermined logarithmic scale with respect to conductivity on an axis of the property value graph 24.

If one of the marks is selected according to an input operation on the input device 11 by the user, the image processor 106 may obtain, via the extractor 101, the document information D in which the material name and two types of property values corresponding to the mark are described, and display the obtained information on the display 13.

[Confidence Level Derivation Process]

For example, the user performs an input operation on the input device 11 to select the display confidence level button 23*d* on the graph display screen 20*a* illustrated in FIG. 13. This causes the input device 11 to output an input signal prompting for the display of confidence levels to the deriver 105. The deriver 105, upon obtaining the input signal, derives confidence levels for the conductivity and activation energy value of each material illustrated in the property value graph 24. The deriver 105 then outputs an output signal containing the derived confidence levels to the image processor 106. The image processor 106, upon obtaining the output from the deriver 105, changes the mark of each material plotted on the property value graph 24 to a display mode according to the confidence levels derived for the conductivity and activation energy value of the material.

In a specific example, the deriver 105 calculates the distances between the mark of a material to be derived and the marks of each of the other materials, and further calculates the average value of the distances. Note that the distance may be a distance such as the Euclidean distance or the Manhattan distance, or some other distance. Next, the deriver 105 calculates the average value of the distances as the similarity of the property values of the material to be derived. The greater the average value of the distances between the mark of the material to be derived and the marks of each of the other materials is, the smaller the similarity is, and the smaller the average value is, the larger the similarity is. For example, the similarity is expressed as a numerical value in the range from 0 to 100. The property values are the conductivity and the activation energy value. Next, the deriver 105 set the similarity as the confidence level. In this way, in the present embodiment, a single confidence level is calculated with respect to two types of property values of the material to be derived.

An example of the above process will be illustrated for the case in which eight different coordinates are displayed on the property value graph 24 in FIG. 13 (the updated extracted-information table 22 in FIG. 12 contains data for the IDs 0001 to 0008). The coordinates (0.41, 0.048) corresponding to a first pair of the conductivity value and activation energy value identified by the ID 0001 is referred to as the first coordinates and so on to the eighth coordinates, which are the coordinates (0.15, 0.077) corresponding to an eighth pair of the conductivity value and activation energy value identified by the ID 0008. The number of different coordinates may also be a number other than eight.

The deriver 105 calculates a distance L12 between the first and second coordinates and so on to a distance L18 between the first and eight coordinates, a distance L23 between the second and third coordinates and so on to a distance L28 between the second and eighth coordinates, and so on to a distance L78 between the seventh and eighth coordinates. The number of calculated distances is (8×7)/2=28.

The deriver 105 calculates an average L(avg1)=(L12+ . . . +L18)/7 in relation to the first coordinates, an average L(avg2)=(L12+L23+ . . . +L28)/7 in relation to the second coordinates, and so on to an average L(avg8)=(L18+L28+ . . . +L78)/7 in relation to the eighth coordinates.

If L(avg n) is large, the deriver 105 sets a small similarity with respect to the nth pair of the conductivity and activation energy value, whereas if L(avg n) is small, the deriver 105 sets a large similarity with respect to the nth path of the conductivity and activation energy value. Here, n is a natural number from 1 to 8.

Figure 14:
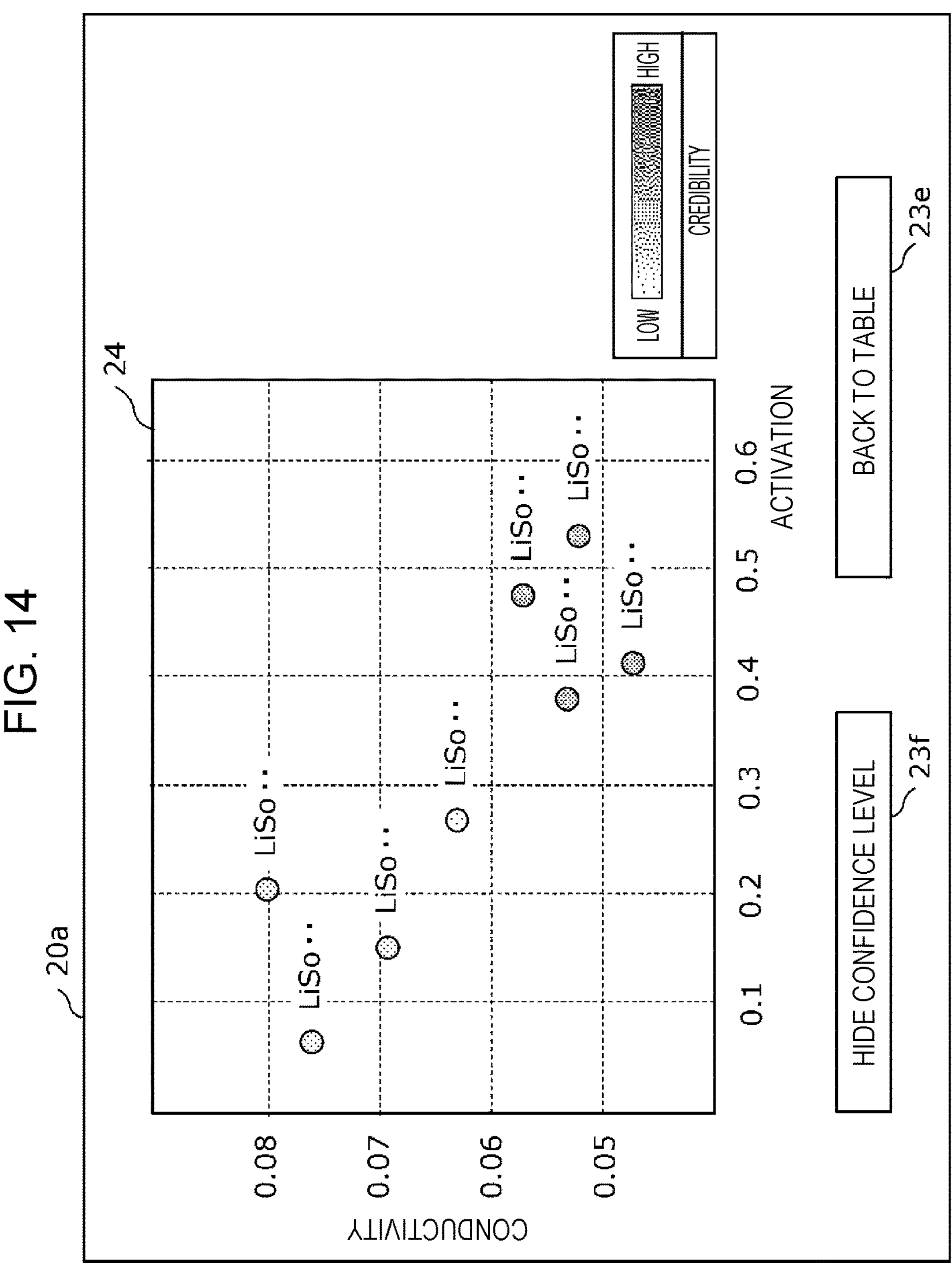
FIG. 14 is a diagram illustrating an example of a graph display screen indicating confidence levels in Embodiment 1.

FIG. 14 is a diagram illustrating an example of the graph display screen 20*a* indicating confidence level.

As illustrated in FIG. 14, the image processor 106 displays each mark plotted on the property value graph 24 in a mode according to the confidence level with respect to the two types of property values of the material indicated by the mark, that is, according to the similarity with respect to the conductivity and activation energy value. In a specific example, the marks are circles, and the higher the confidence level for two types of property values, the more the image processor 106 intensifies the color of the mark corresponding to the two types of property values, and the lower the confidence level for two types of property values, the more the image processor 106 lightens the color of the mark corresponding to the two types of property values. In other words, the higher the degree of clustering of the marks on the property value graph 24, the more the image processor 106 intensifies the color of the marks, and the lower the degree of clustering, the more the image processor 106 lightens the color of the marks. Consequently, since a mark located apart from many other marks a displayed lighter, the user can judge that the property values of the material corresponding to the mark are relatively less credible. Conversely, since marks clustered close together are displayed more intensely, the user can judge that the property values of the materials corresponding to the marks are relatively more credible.

The image processor 106 displays the graph display screen 20*a* including a hide confidence level button 23*f* instead of the display confidence level button 23*d* described above. The hide confidence level button 23*f* is a button for hiding the confidence levels, and is a button for returning the graph display screen 20*a* illustrated in FIG. 14 to the graph display screen 20*a* illustrated in FIG. 13, for example.

In this way, in the present embodiment, confidence levels with respect to property values extracted from the document information D are presented to the user. If the pieces of document information D selected by the user are the electronic data of research papers related to material synthesis experiments, the confidence level is a measure of the reproducibility of a single experiment described in the research papers, as estimated on the basis of the information extracted from a single research paper. Reproducibility is a measure of the ratio of the number of successes to the number of attempts when an experiment is actually conducted multiple times. If a single author has conducted similar experiments, obtained materials with similar property values, and published the results in several research papers, it can be said that the greater is the number of publications, the higher is the probability of success in experiments for synthesizing the material. Consequently, reproducibility can also be calculated from the number of research papers published by a single author. If similar property values are described in research papers published by different authors or different research institutions, high confidence levels can be presented, and the confidence levels can be visualized with consideration for the development skills of the authors or research institutions. Even if property values are measured with different devices, if the property values are close, the property values can be determined to be highly credible, and this is expected to have the effect of increasing the certainty of the confidence levels. Consequently, the present embodiment is expected to be useful in the exploration of desired materials by a materials researcher who values the number of research papers related to material synthesis reported in the past.

Note that in the present embodiment, the confidence level is presented with respect to two types of property values, namely the conductivity and activation energy value, but the property values may be other than the above, and moreover, the confidence level may also be presented with respect to a single property value. In the present embodiment, the property value graph 24 has two axes representing the conductivity and the activation energy value, respectively, but may also have three axes representing three types of property values. That is, the property value graph 24 may also be constructed as a three-dimensional graph. One of the three types of property values may also be a condition to be used in material synthesis, such as temperature or time, for example. Furthermore, the property value graph 24 may also have four or more axes. That is, the property value graph 24 expresses four or more types of property values. Note that since a property value graph 24 with four or more axes is difficult to visualize, the property value graph 24 may also be constructed by reducing the number of axes to two or three axes using a dimensional reduction method such as principal component analysis (PCA) or t-distributed stochastic neighbor embedding (t-SNE). The image processor 106 may also select the types and number of axes in response to an input operation on the input device 11 by the user. Such selection of the types of axes and increasing of the number of axes can enhance the ability to express property values and allow for more detailed analysis.

The function of changing the color intensity of the mark corresponding to a material according to the confidence level for the property values of the material is a necessary function for a materials researcher to quickly check a vast number of property values, and has the effect of indicating areas of interest in the property value graph 24 in an easily understood way. For example, when the user explores materials with importance placed on high reproducibility, the user can explore materials by focusing attention on intensely colored marks. Conversely, when the user explores materials with importance placed on rarity of material, the user can explore materials by focusing attention on lightly colored marks. Thus, material exploration can be achieved in accordance with the objective of the materials researcher or other user.

The color of the mark of a material plotted on the property value graph 24 may be the same as the color used for the main element of the material in a table of chemical symbols normally used by the user. For example, if the main element of a material is Li, and the Li region of the table of chemical symbols is indicated in yellow, the image processor 106 may display the mark of the material in yellow on the display 13. In a specific example, the image processor 106 stores in advance data indicating the table of chemical symbols normally used by the user, identifies the main element of a material indicated in the extracted-information table 22, and determines the color corresponding to the element on the basis of the above data stored in advance. The image processor 106 then sets the color of the mark corresponding to the element to the color determined as above and plots the mark in that color on the property value graph 24. Thus, the user can easily grasp the main components of materials from the colors of each corresponding marks illustrated on the property value graph 24, and even more efficient data analysis can be attained.

In this way, the deriver 105 according to the present embodiment derives, for each material, a confidence level for the property values of the material on the basis of the similarity of the property values between the material and one or more other materials. Additionally, the image processor 106 generates a first image in which the property values of each of the materials are (i) illustrated in a display mode according to the confidence level derived for the property values of the material and (ii) illustrated in association with identification information of the material, and outputs the first image to the display 13. The first image is the graph display screen 20*a* in FIG. 14, for example. Thus, in the first image to be displayed, the property values of each of the materials are displayed in a display mode according to the confidence level of the property values, and material identification information is associated with the property values. Consequently, by looking at the first image, a materials researcher or other user can easily grasp from the first image the credibility of the property values of materials described in an enormous amount of document information D stored in the document database 12.

The image processor 106 sets in the first image a property map having a first coordinate axis for representing a property value of the first class, namely the conductivity, and a second coordinate axis for representing a property value of the second class, namely the activation energy value. The property map is the property value graph 24 in FIG. 14, for example. The image processor 106 then superimposes a mark corresponding to each of the materials onto the position corresponding to the property value of the first class and the property value of the second class of the material on the property map, in a display mode according to the confidence level derived for the property values of the material. Thus, confidence levels for multiple classes of property values of each material can be grasped easily as a whole.

The deriver 105 identifies the similarity of the property values of a material on the basis of the distance between the mark corresponding to the material and the mark corresponding to each of one or more other materials. Thus, a single similarity can be specified appropriately for multiple classes of property values of a material, and as a result, a confidence level based on similarity can be derived appropriately.

The image processor 106 determines, as the display mode of the property values of a material, a color intensity that is more intense the higher the confidence level that is derived for the property values, and generates a first image in which the property values are illustrated with the determined color intensity. Thus, the user can grasp the confidence levels for property values easily in a visual manner. Note that in the present embodiment, the property value graph 24 is used and the marks indicating the property values are displayed with the determined color intensity, but in cases in which the property value graph 24 is not used, the numerical value themselves of the property values may be displayed with the determined color intensity.

Figure 15A:
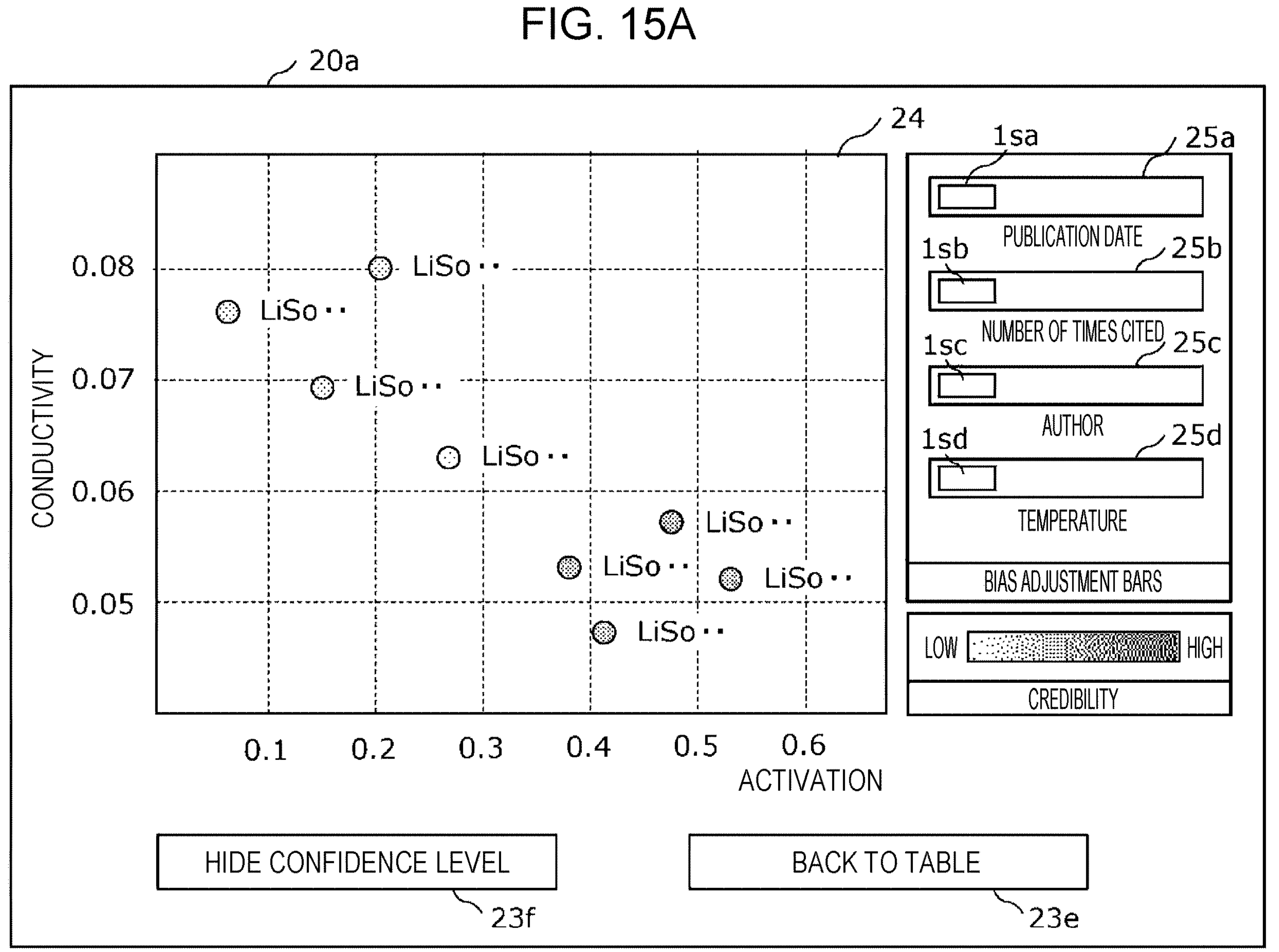
FIG. 15A is a diagram illustrating another example of a graph display screen indicating confidence levels in Embodiment 1.

FIG. 15A is a diagram illustrating another example of the graph display screen 20*a* indicating confidence level.

In the example illustrated in FIG. 14, the deriver 105 derives a similarity based on the distance described above as the confidence level. That is, if the similarity is R0 and the confidence level is K, the deriver 105 calculates the confidence level K according to K=1×R0. However, in the calculation of the confidence level K, the deriver 105 may also cause the similarity R0 and attribute values according to the attributes of the material to be reflected in the confidence level K. For example, if there are four attribute values R1, R2, R3, and R4, the deriver 105 calculates the confidence level K according to K=(p×R0)+(a×R1)+(b×R2)+(c×R3)+(d×R4), or in other words, a weighted sum of the four attribute values R1 to R4 and the similarity R0. Here, p is a weight on the similarity R0, a is a weight on the attribute value R1, and b is a weight on the attribute value R2. Also, c is a weight on the attribute value R3 and d is a weight on the attribute value R4. That is, the deriver 105 imposes several types of biases on the derivation of the confidence level K. The weights p and a to d satisfy p+a+b+c+d=1 and are set to values according to an input operation on the input device 11 by the user. Note that the weight p on the similarity R0 satisfies 0<p≤1, and each of the weights a to d on the attribute values R1 to R4 satisfies 0≤[a, b, c, d]<1. The weights are also referred to as biases.

As illustrated in FIG. 15A, for example, the image processor 106 displays slider bars 25*a* to 25*d* for adjusting the weights a to d of the attribute values R1 to R4 on the graph display screen 20*a*.

The slider bar 25*a* is a display element for setting the weight a of the attribute value R1 based on the publication date according to the position of a slider 1*sa*. The publication date is the publication date of the document information D from which the material name, conductivity, and activation energy value of a material are extracted, and is an attribute of the material. The deriver 105 determines a value closer to 100 for a more recent publication date and a value closer to 0 for an older publication date as the attribute value R1 based on the publication date. The deriver 105 sets the weight a to 0 if the slider 1*sa* is at the left edge, and sets the weight a to an increasingly larger value the closer the slider 1*sa* is to the right edge. For example, if the slider 1*sa* is in the center of the slider bar 25*a*, the weight a may be 0.5.

The slider bar 25*b* is a display element for setting the weight b of the attribute value R2 based on the number of times cited according to the position of a slider 1*sb*. The number of times cited is the number of times the document information D from which the material name, conductivity, and activation energy value of a material are extracted has been cited, and is an attribute of the material. The deriver 105 determines a value closer to 100 for a greater number of times cited and a value closer to 0 for a lesser number of times cited as the attribute value R2 based on the number of times cited. The deriver 105 sets the weight b to 0 if the slider 1*sb* is at the left edge, and sets the weight b to an increasingly larger value the closer the slider 1*sb* is to the right edge. For example, if the slider 1*sb* is in the center of the slider bar 25*b*, the weight b may be 0.5.

The slider bar 25*c* is a display element for setting the weight c of the attribute value R3 based on the author name according to the position of a slider 1*sc*. The author name is the author name of the document information D from which the material name, conductivity, and activation energy value of a material are extracted, and is an attribute of the material. The deriver 105 determines a value closer to 100 for a more well-known author name and a value closer to 0 for a less well-known author name as the attribute value R3 based on the author name. Note that the information providing device 100 may store data indicating how well known each author name is. The deriver 105 sets the weight c to 0 if the slider 1*sc* is at the left edge, and sets the weight c to an increasingly larger value the closer the slider 1*sc* is to the right edge. For example, if the slider 1*sc* is in the center of the slider bar 25*c*, the weight c may be 0.5.

The slider bar 25*d* is a display element for setting the weight d of the attribute value R4 based on the temperature according to the position of a slider 1*sd*. The temperature is the temperature used to synthesize the material of the extracted material name, and is an attribute of the material. The temperature may also be thought of as a condition included in the synthesis method of the material. The deriver 105 calculates the difference between the temperature of the material and the temperature of each of one or more other materials, and determines a value closer to 100 for a smaller average value of the difference and a value closer to 0 for a larger average value as the attribute value R4 based on the temperature of the material. That is, the attribute value R4 indicates the similarity of the temperature. The deriver 105 sets the weight d to 0 if the slider 1*sd* is at the left edge, and sets the weight d to an increasingly larger value the closer the slider 1*sd* is to the right edge. For example, if the slider 1*sd* is in the center of the slider bar 25*d*, the weight d may be 0.5.

Note that the publication date, number of times cited, author name, and temperature are each extracted by the extractor 101 as the third information.

The user adjusts the positions of the sliders 1*sa* to 1*sd* of the slider bars 25*a* to 25*d* by performing an input operation on the input device 11. For example, the user moves each of the sliders 1*sa* to 1*sd* to the left edge. In this case, the deriver 105, in response to an input signal outputted from the input device 11 because of the input operation by the user, sets the weights a to d of each of the publication date, number of times cited, author name, and temperature to 0, and sets the weight p of the similarity R0 to 1. As a result, the deriver 105 calculates the confidence level K according to K=(1×R0)+(0×R1)+(0×R2)+(0×R3)+(0×R4), or in other words, according to the similarity R0, similarly to the example illustrated in FIG. 14. As a result, as illustrated in FIG. 15A, the image processor 106 displays the graph display screen 20*a* including a property value graph 24 similar to the example in FIG. 14 on the display 13.

In this way, the deriver 105 according to the present embodiment calculates the confidence level K for the property values of a material on the basis of the similarity R0 of the property values of the material and attribute information extracted in relation to the material. That is, the deriver 105 calculates the confidence level K for the property values of a material according to a weighted sum of the similarity R0 of the property values of the material and the attribute values R1 to R4 based on attribute information extracted in relation to the material. Thus, the confidence level K for the property values is derived on the basis of the similarity R0 of the property values and the attributes of the material, and therefore the confidence level K can be derived from various perspectives and the certainty of the confidence level K can be improved. By adjusting the weights for each of the similarity R0 and the attributes as biases, a confidence level K suited to the objective of the user can be derived.

Figure 15B:
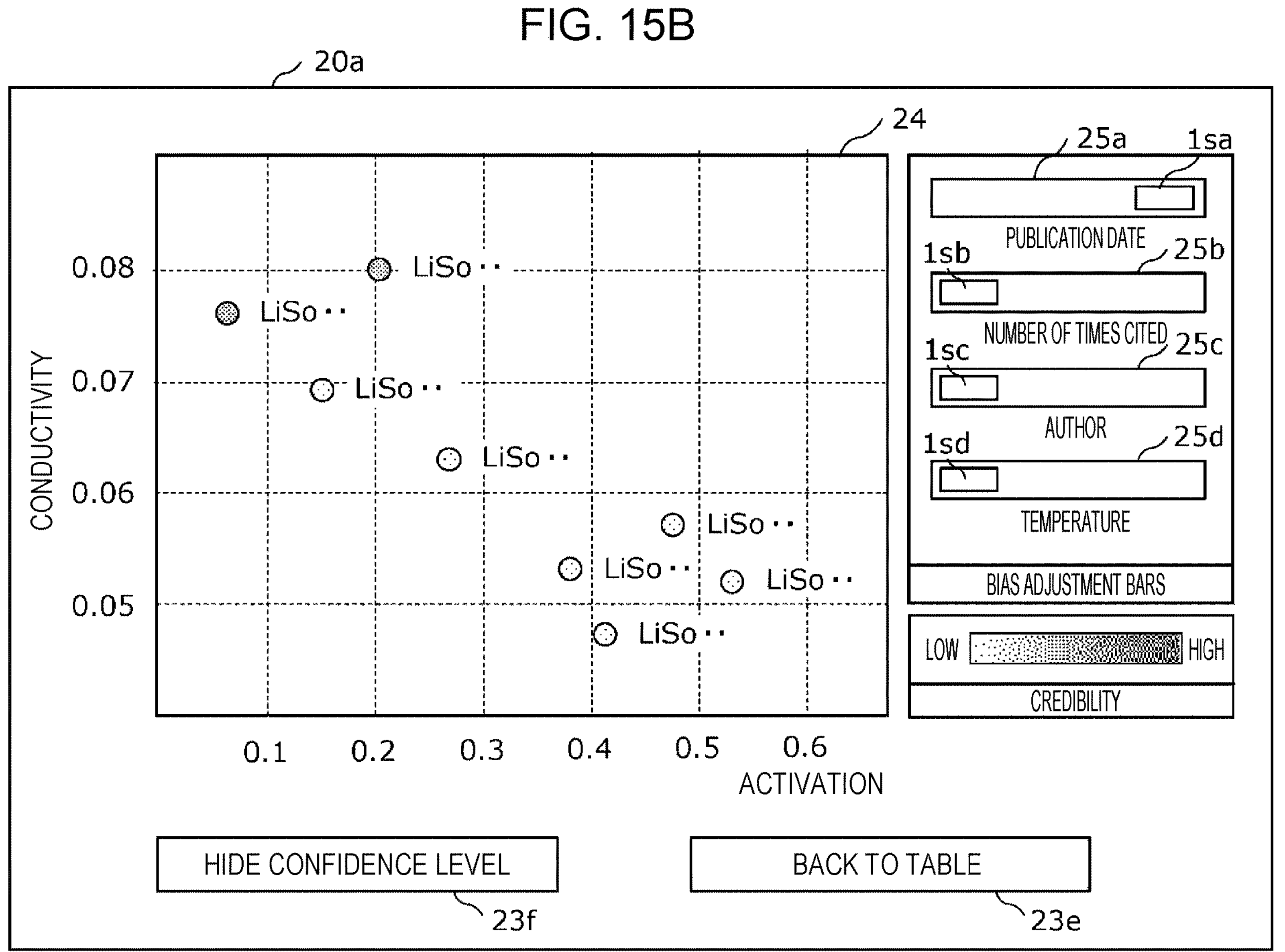
FIG. 15B is a diagram illustrating an example of a graph display screen after biases are changed in Embodiment 1.
Figure 15C:
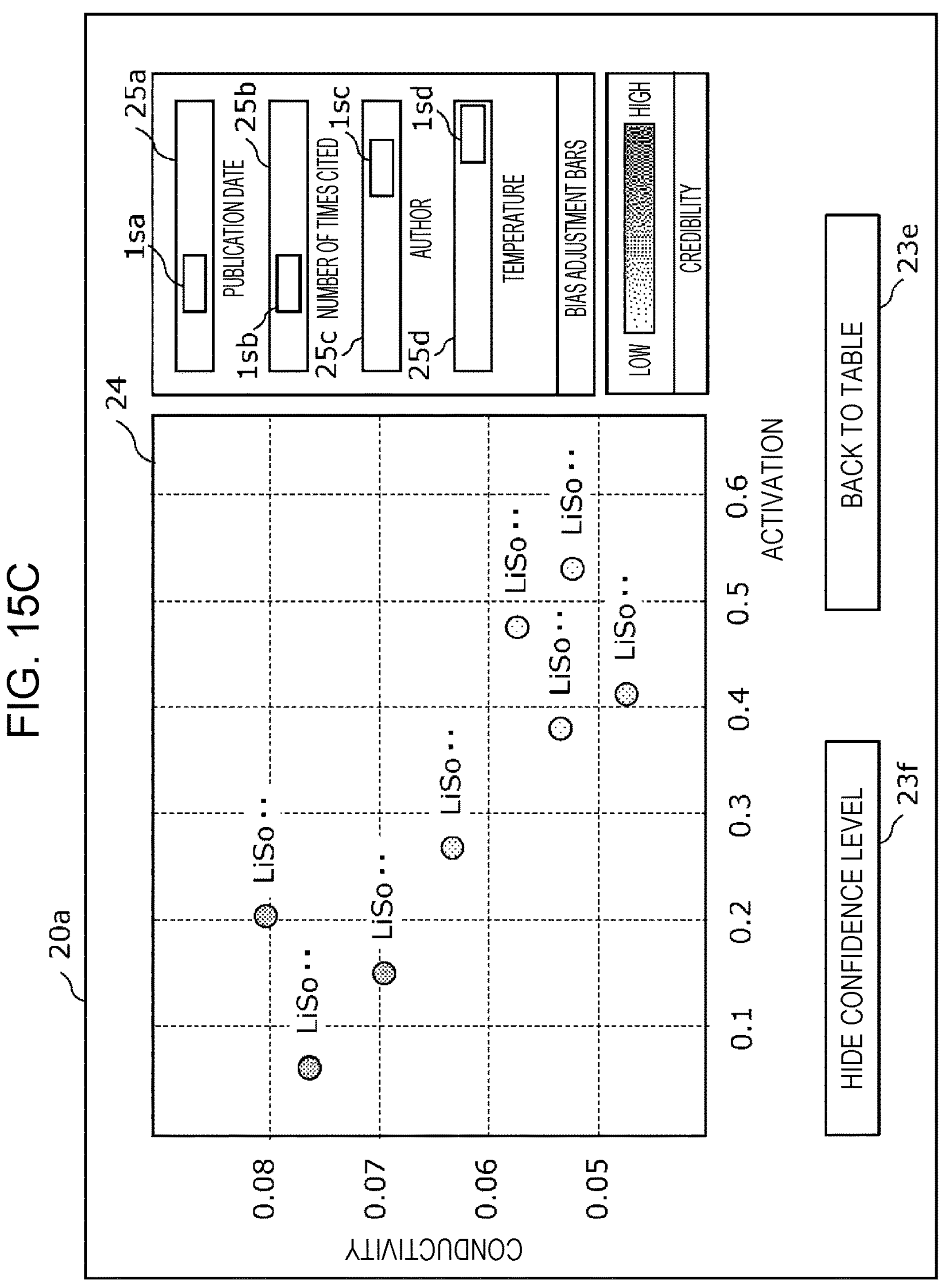
FIG. 15C is a diagram illustrating another example of a graph display screen after biases are changed in Embodiment 1.

FIGS. 15B and 15C are diagrams illustrating examples of the graph display screen 20*a* after the biases are changed.

As illustrated in FIG. 15B, the user performs an input operation on the input device 11 to move the slider 1*sa* among the sliders 1*sa* to 1*sd* of the slider bars 25*a* to 25*d* from the position illustrated in FIG. 15A to the right edge. In this case, the deriver 105, in response to an input signal outputted from the input device 11 because of the input operation, sets the weight a of the publication date to 0.9, for example, sets the weights b to d of each of the number of times cited, author name, and temperature to 0, and sets the weight p of the similarity R0 to 0.1. As a result, the deriver 105 calculates the confidence level K according to K=(0.1×R0)+(0.9×R1)+(0×R2)+(0×R3)+(0×R4), or in other words, with a large bias imposed on the publication date. As a result, as illustrated in FIG. 15B, the image processor 106 displays, on the display 13, the graph display screen 20*a* including a property value graph 24 different from the examples in FIGS. 14 and 15A. That is, the publication date influences the confidence level K more than the similarity R0 such that the more recent the publication date of a piece of document information D is, the more intensely displayed is the color of the mark corresponding to the material name, conductivity, and activation energy value extracted from that piece of document information D.

In other words, plotted marks are not displayed in more intense color simply due to being clustered together, but rather the plotted marks are displayed in more intense color to the extent that the marks are clustered together and the publication dates corresponding to the marks are more recent. In this way, with the slider bars 25*a* to 25*d* set as illustrated in FIG. 15B, the more recent is the document information D from which property values and the like are extracted, the higher the confidence level K for the property values is, or in other words, the more intensely displayed is the mark corresponding to the property values. Consequently, the present embodiment is expected to be useful in the exploration of desired materials by a materials researcher who values the recency of document information D such as research papers.

In this way, in the present embodiment, the attribute information indicates, as an attribute, the time of publication of a piece of document information D in which the identification information and property values of a material corresponding to the attribute information are described from among at least one piece of document information D. The time of publication is the publication date described above, and may be the day of publication. Additionally, the deriver 105 uses the attribute value R1 indicating the recency of the time of publication to derive the confidence level K for the property values. Specifically, the more recent is the time of publication, the larger is the value indicated by the attribute value R1. Furthermore, the higher the similarity R0 of the property values of the material and the larger the attribute value R1 corresponding to the material are, the greater the value that is derived by the deriver 105 as the confidence level K for the property values of the material. Thus, a relatively higher confidence level K can be derived for property values described in more recent document information D. Consequently, an appropriate confidence level K can be derived for a user who places importance on the time of publication.

Next, as illustrated in FIG. 15C, the user moves each of the sliders 1*sa* to 1*sd* of the slider bars 25*a* to 25*d* to the right by performing an input operation on the input device 11. The deriver 105 sets the weights p and a to d according to an input signal outputted from the input device 11 because of the input operation, that is, according to the distance from the left side of each of the sliders 1*sa* to 1*sd*. The ratio of each of the weights a to d is set to the ratio of the distance from the left edge of each of the sliders 1*sa* to 1*sd*. For instance, in the example in FIG. 15C, the weights a to d are set so that (weight d of temperature)>(weight c of author name)>(weight b of number of times cited)=(weight a of the publication date), and the weight p on the similarity R0 is set according to p=1−(a+b+c+d).

As a result, the deriver 105 calculates the confidence level K according to K=(p×R0)+(a×R1)+(b×R2)+(c×R3)+(d×R4), or in other words, with a bias of greater-than-0 value imposed on each of the similarity R0, publication date, number of times cited, author name, and temperature. As a result, as illustrated in FIG. 15C, the image processor 106 displays, on the display 13, the graph display screen 20*a* including a property value graph 24 different from the examples in FIGS. 14, 15A, and 15B. That is, the more similar the temperature of material synthesis is to the temperatures of other materials, the more well known the author name is, the higher the number of times cited is, and the more recent the publication date is, the marks of corresponding materials are displayed in more intense color. Such settings of the slider bars 25*a* to 25*d* are expected to be effective for a materials researcher who wants to search for materials in a multifaceted or advanced way.

In this way, in the present embodiment, the attribute information indicates, as an attribute, the number of times cited of a piece of document information D in which the identification information and property values of a material corresponding to the attribute information are described from among at least one piece of document information D. Additionally, the deriver 105 uses the attribute value R2 according to the number of times cited to derive the confidence level K for the property values. Specifically, the higher is the number of times cited, the larger is the value indicated by the attribute value R2. Furthermore, the higher the similarity R0 of the property values of the material and the larger the attribute value R2 corresponding to the material are, the greater the value that is derived by the deriver 105 as the confidence level K for the property values of the material. Thus, a relatively higher confidence level K can be derived for property values described in a highly cited piece of document information D. Consequently, an appropriate confidence level K can be derived for a user who places importance on the number of times cited.

In the present embodiment, the attribute information indicates, as an attribute, the synthesis method of the material corresponding to the attribute information. Additionally, the deriver 105 uses the attribute value R4 according to the degree of similarity between the synthesis method of the material and each synthesis method of one or more other materials to derive the confidence level K for the property values. The synthesis method of the material is a temperature condition used in material synthesis, like in the example in FIG. 15C. Note that the synthesis method may also be a time condition or a type of device used in material synthesis rather than a temperature condition. That is, the synthesis method of a material may include at least one from among a temperature condition, a time condition, and a type of device used in material synthesis. Specifically, the greater is the degree of similarity between the synthesis method of the material and each synthesis method of one or more other materials, the larger is the value indicated by the attribute value R4. Furthermore, the higher the similarity R0 of the property values of the material and the larger the attribute value R4 corresponding to the material are, the greater the value that is derived by the deriver 105 as the confidence level K for the property values of the material. Thus, if a piece of document information D describes that a material with certain property values is synthesized by a synthesis method similar to another piece of document information D, a relatively high confidence level K can be derived for the property values. Consequently, an appropriate confidence level K can be derived for a user who places importance on the synthesis method.

In the present embodiment, the attribute information indicates, as an attribute, the author of a piece of document information D in which the identification information and property values of a material corresponding to the attribute information are described from among at least one piece of document information D. Additionally, the deriver 105 uses the attribute value R3 according to how well known the author of the piece of document information D is to derive the confidence level K for the property values. Specifically, the more well known is the author, the larger is the value indicated by the attribute value. Furthermore, the higher the similarity R0 of the property values of the material and the larger the attribute value R3 corresponding to the material are, the greater the value that is derived by the deriver 105 as the confidence level K for the property values of the material. Thus, a relatively higher confidence level K can be derived for property values described in a piece of document information D by a well-known author. Consequently, an appropriate confidence level K can be derived for a user who places importance on how well known the author of the piece of document information D is.

Note that the deriver 105 may also derive the confidence level K for the property values using an attribute value R3*a* according to whether the author of the piece of document information D is the same as the author of each of one or more other pieces of document information D. That is, the attribute value R3*a* may be used instead of the attribute value R3 above. Specifically, the higher is the number of authors of the one or more other pieces of document information D who are different from the author of the piece of document information D, the larger is the value indicated by the attribute value R3*a*. Furthermore, the higher the similarity R0 of the property values of the material and the larger the attribute value R3*a* corresponding to the material are, the greater the value that is derived by the deriver 105 as the confidence level K for the property values of the material. Thus, a relatively higher confidence level K can be derived for the property values described in a piece of document information D written by an author different from the authors of many other pieces of document information D. That is, if similar property values are described in many pieces of document information D written by different authors, a high confidence level K is derived for the property values. On the other hand, if similar property values are described in many pieces of document information D, but the pieces of document information D are written by the same author, a low confidence level K is derived for the property values. Consequently, an appropriate confidence level can be derived for a user who places importance on the identity of the author of a piece of document information D.

Note that in the examples in FIGS. 15A to 15C, a bias is adjusted for each of the four attributes of publication date, number of times cited, author name, and temperature, but a bias may also be adjusted for another attribute (that is, third information) included in the extracted-information table 22 in FIG. 11 or 12. The image processor 106 may increase or decrease the number of slider bars to be used for bias adjustment in response to an input operation on the input device 11 by the user.

If a piece of document information D is a research paper, there is a possibility that the publication date, date of submission, and date of adoption are indicated in the metadata D2. In this case, the extractor 101 may extract each of the date of submission and the date of adoption from the metadata D2 as an attribute of the material, and the deriver 105 may include these attributes in the extracted-information table 22. The deriver 105 may then use an attribute value R5 according to the period from the date of submission to the date of adoption instead of the attribute value R1 based on the publication date described above, or together with the attribute value R1, in the calculation of the confidence level K. At this time, the deriver 105 determines a value closer to 100 for a shorter period from the date of submission to the date of adoption and a value closer to 0 for a longer period as the attribute value R5, for example. Additionally, the deriver 105 calculates the confidence level K with a weighted sum that includes the attribute value R5.

Thus, a confidence level K that accounts for the period from the date of submission to the date of adoption is presented, and therefore information that is meaningful to a materials researcher who values such a period can be provided. That is, if there is a long period from the date of submission to the date of adoption, there is a possibility that the research paper corresponding to the period was repeatedly revised on the basis of shortcomings identified by peer reviewers. Repeated revisions of this kind may be factor that lowers the confidence level for a research paper, that is, the confidence level for the property values of a material listed in the research paper. Accordingly, as described above, by presenting a confidence level K that accounts for the period from the date of submission to the date of adoption, the certainty of the confidence level K can be improved.

If the journal name and impact factor (also referred to as the IF) are included as attributes in the extracted-information table 22, the deriver 105 may calculate the confidence level K with a weighted sum using attribute values based on these attributes. The attribute value based on the journal name is a value closer to 100 for a more well-known journal name and a value closer to 0 for a less well-known journal name. The attribute value based on IF is a value closer to 100 for a larger IF and a value closer to 0 for a smaller IF.

Such journal name recognition and IF can be said to indicate the quality of a piece of document information D, that is, a research paper. Consequently, by presenting a confidence level K that uses attribute values based on the journal name and the IF to account for the quality of the research paper, the certainty of the confidence level K can be improved.

If the journal name and IF are not extracted from the document information D and are not included as attributes in the extracted-information table 22, the deriver 105 may infer these attributes. For example, the deriver 105 may use a natural language processing tool, for example, to compare a piece of document information D for which the journal name and IF are known with a piece of document information D for which these are unknown, and determine whether the similarity between the pieces of document information D is equal to or greater than a threshold value. If the similarity is equal to or greater than the threshold value, the deriver 105 may infer the known journal name and IF as the journal name and IF of the unknown piece of document information D. Thus, a confidence level K with a high certainty can also be calculated with respect to an unknown piece of document information D.

In the examples illustrated in FIGS. 15A to 15C, the deriver 105 determines the similarity of the temperature of a material as the attribute value R4. However, the deriver 105 may also determine a value closer to 100 for a higher temperature of the material and a value closer to 0 for a lower temperature as the attribute value R4 based on the temperature of the material.

[Processing Operations]

Figure 16:
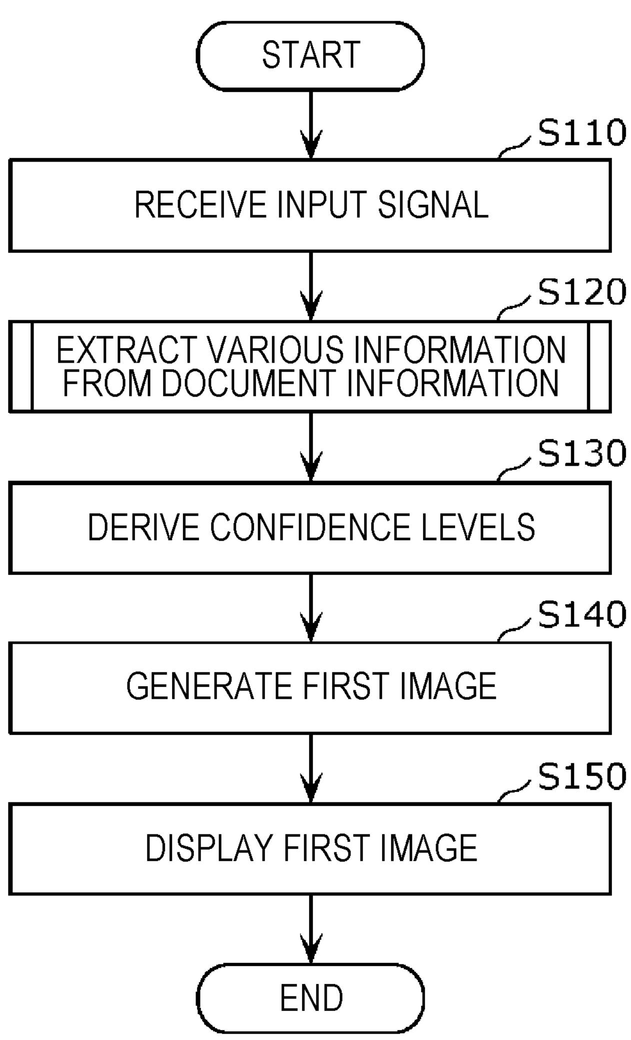
FIG. 16 is a flowchart illustrating an example of overall processing operations by an information providing device in Embodiment 1.

FIG. 16 is a flowchart illustrating an example of overall processing operations by the information providing device 100 in the present embodiment.

(Step S110)

First, the extractor 101 of the information providing device 100 receives an input signal outputted from the input device 11 in response to an input operation on the input device 11 by the user. The input signal is, for example, a signal for identifying one or more pieces of document information D selected according to the input operation by the user from among the document information D stored in the document database 12. For example, the input signal may indicate the document ID of the document information D.

(Step S120)

Next, the extractor 101 specifies the one or more pieces of document information D identified by the input signal received in step S110, and extracts various information about each of multiple materials from the document information D. The various information is the first, second, and third information above. In other words, material names, property values, and attributes are extracted. A material name is identification information for identifying a material. That is, the extractor 101 extracts, for each of multiple materials, identification information for identifying the material and property values of the material from at least one piece of document information D.

(Step S130)

Next, the deriver 105 derives a confidence level for the property values of each material on the basis of the material names, property values, and attributes of the materials extracted in step S120. For example, the deriver 105 derives, for each material, a confidence level for the property values of the material on the basis of the similarity of the property values between the material and one or more other materials.

(Step S140)

Next, the image processor 106 generates, on the basis of the confidence level for the property values of each material derived in step S130, a first image in which the property values are illustrated in a display mode according to the confidence level therefor. The first image is the property value graph 24 illustrated in FIGS. 14 to 15C, for example. That is, the image processor 106 generates a first image in which the property values of each of the materials are (i) illustrated in a display mode according to the confidence level derived for the property values of the material and (ii) illustrated in association with the identification information of the material.

(Step S150)

Next, the image processor 106 displays the first image generated in step S140 on the display 13. That is, the image processor 106 outputs the first image to the display 13.

Figure 17:
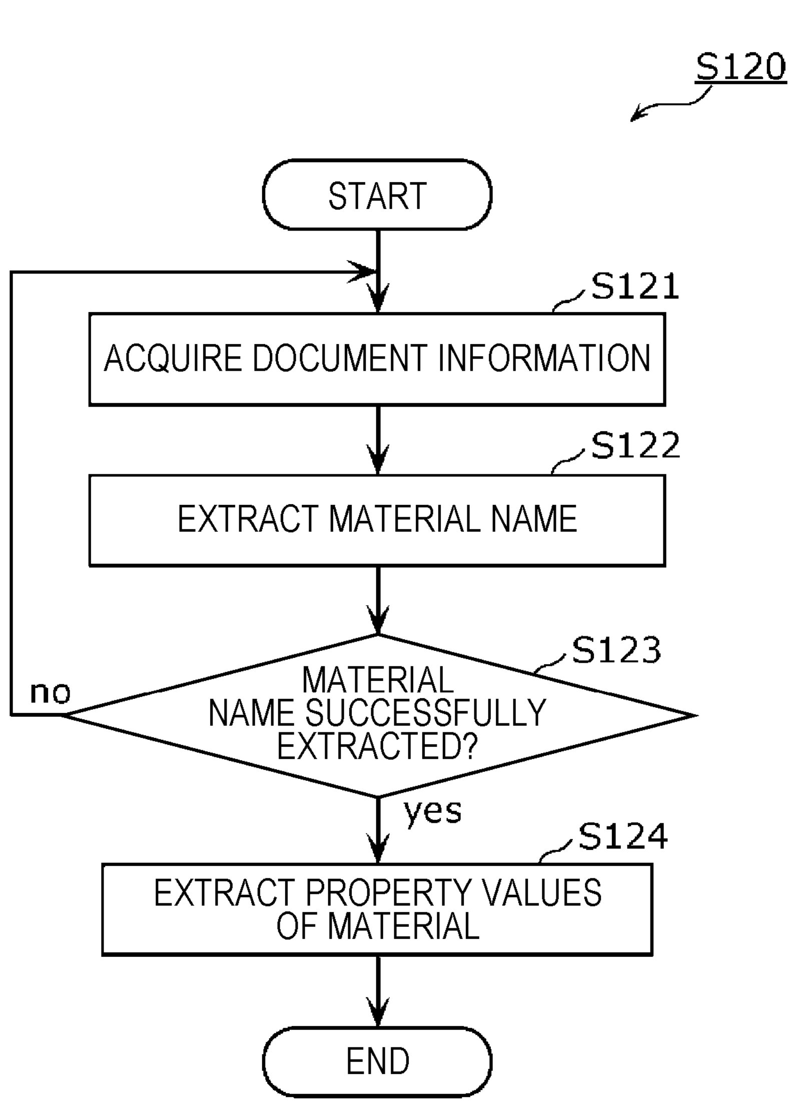
FIG. 17 is a flowchart illustrating an example of a process by the extractor in Embodiment 1.

FIG. 17 is a flowchart illustrating an example of processes by the extractor 101. Namely, FIG. 17 is a flowchart illustrating details of the processing operations in step S120 of FIG. 16.

(Step S121)

First, the extractor 101 acquires the document information D specified by the input signal described above from the document database 12.

(Step S122)

Next, the extractor 101 performs a process for retrieving and extracting the first information, that is, the material names, from the document information D.

(Step S123)

Next, the extractor 101 determines whether material names were extracted from the document information D by the process in step S122. If it is determined that material names could not extracted (step S123, no), the extractor 101 repeats the execution of the processes from step S121. When the process in step S121 is repeated, the extractor 101 obtains document information D that has not been obtained from the document database 12 before.

(Step S124)

If it is determined in step S123 that material names were extracted from the document information D (step S123, yes), the extractor 101 extracts the second and third information from the document information D. The second and third information is the property values and attributes of the materials corresponding to the material names already extracted.

Modification of Embodiment 1

FIG. 18A is a block diagram illustrating an example of the configuration of an information providing system according to a modification of Embodiment 1. Note that structural elements of the present modification which are the same as structural elements of Embodiment 1 are denoted with the same reference signs as Embodiment 1, and detailed description thereof will be reduced or omitted.

As illustrated in FIG. 18A, an information providing system 1001 according to the present modification is provided with the information providing device 100, the input device 11, the document database 12, the display 13, and a material properties database (DB) 14.

The material properties database 14 is a recording medium in which, for each of multiple materials, the material name of the material and property values and attributes of the material are stored in association with each other in advance. Such a recording medium is a hard disk drive, RAM, ROM, semiconductor memory, or the like. Note that the recording medium may be volatile or non-volatile.

The deriver 105 of the information providing device 100 according to the present modification uses the material properties database 14. For example, the deriver 105 determines whether property values and attributes are associated with the material name of each of the materials indicated in the extracted-information table 22. If it is determined that property values and attributes are not associated with a material name, the deriver 105 handles the material name as a material name to be processed, and references the material properties database 14. The deriver 105 retrieves the material name to be processed from the material properties database 14 and extracts the property values and attributes associated with the material name to be processed in the material properties database 14. The deriver 105 records the extracted property values and attributes in association with the material name to be processed in the extracted-information table 22.

Thus, even if the property values and attributes of a material cannot be extracted from the document information D stored in the document database 12, the property values and attributes can be supplemented by using the material properties database 14.

FIG. 18B is a block diagram illustrating another example of the configuration of an information providing system 1001 according to a modification of Embodiment 1.

The information providing system 1001 may be provided with a materials database 15 instead of the material properties database 14 illustrated in FIG. 18A. The materials database 15 is an open access database and is a recording medium storing various information about each of multiple materials. Such a recording medium is a hard disk drive, RAM, ROM, semiconductor memory, or the like. Note that the recording medium may be volatile or non-volatile.

The deriver 105 extracts property values and attributes corresponding the above material name to be processed from the materials database 15, in a manner similar to the extractor 101. By referencing the materials database 15, the deriver 105 may estimate the property values and attributes corresponding to the material name to be processed.

Embodiment 2

The information providing system 1000 and information providing device 100 according to the present embodiment have the same configuration as the information providing system 1000 and information providing device 100 of Embodiment 1. The information providing device 100 according to the present embodiment has a source display function in addition to the function of the information providing device 100 of Embodiment 1, that is, the confidence level derivation function. The source display function is a function for displaying information about a portion of the document information D stored in the document database 12 as sources on the display 13. Note that structural elements of the present embodiment which are the same as structural elements of Embodiment 1 are denoted with the same reference signs as Embodiment 1, and detailed description thereof will be reduced or omitted.

Figure 19:
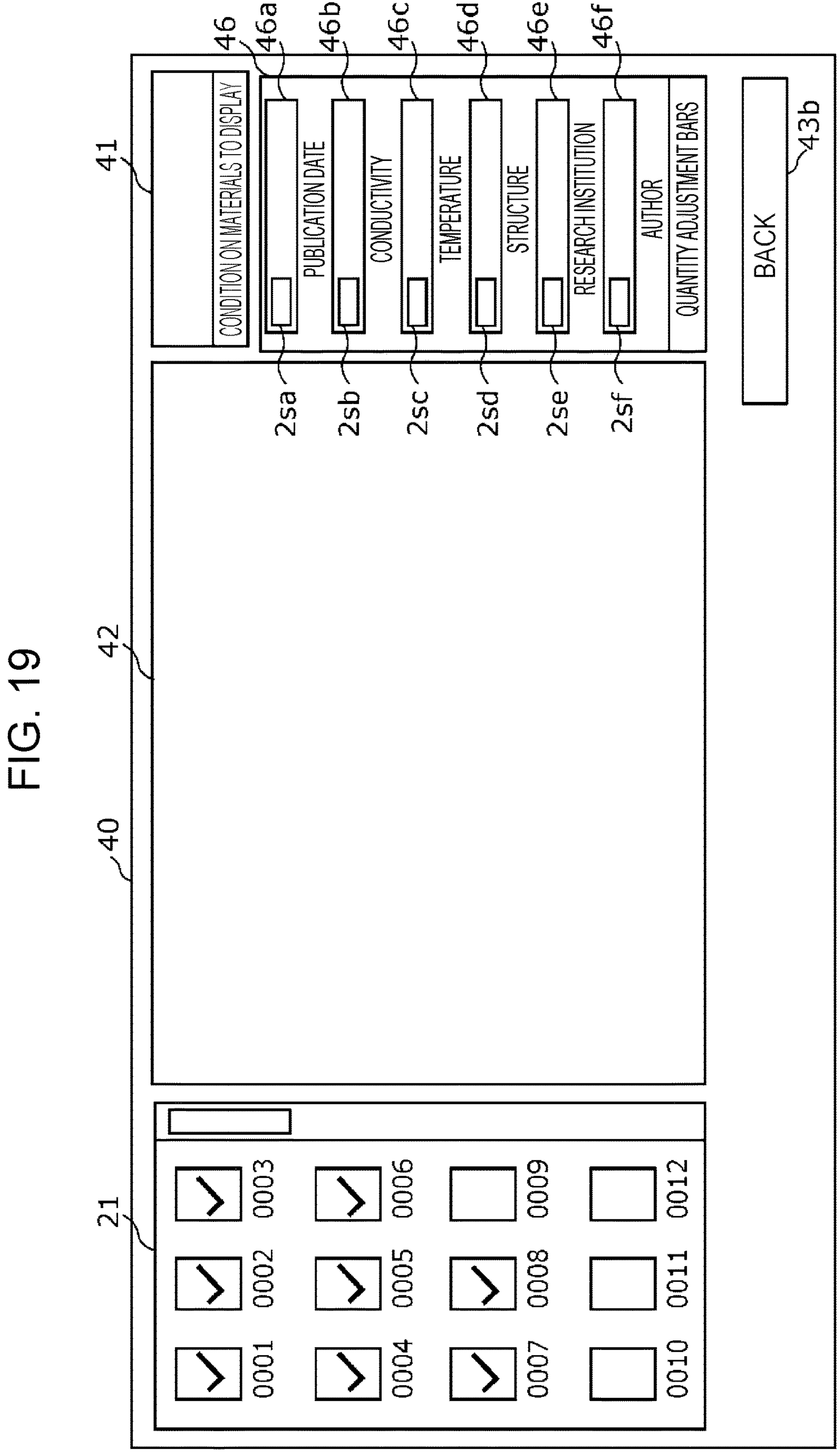
FIG. 19 is a diagram illustrating an example of a source display screen in Embodiment 2.

FIG. 19 is a diagram illustrating an example of a source display screen in the present embodiment.

After confidence levels are derived by the confidence level derivation function, the user performs an input operation on the input device 11 to instruct the information providing device 100 to display a source display screen 40. The image processor 106, upon obtaining an input signal according to the input operation from the input device 11, displays the source display screen 40 illustrated in FIG. 19, for example, on the display 13.

The source display screen 40 includes the document list window 21, a material window 41, a source window 42, a quantity adjustment window 46, and a return button 43*b*.

In the document list window 21, a list of document information D stored in the document database 12 is displayed. In the list, the icons of pieces of document information D that are selected by the user to derive confidence levels are displayed in a differentiated state from the icons of pieces of document information D that are not selected.

The material window 41 is a window for displaying a material condition inputted by the user. The material condition is a condition regarding the elemental species, composition, or the like of a material.

The quantity adjustment window 46 is for adjusting the quantities of sources to be displayed, and includes slider bars 46*a* to 46*f*. The slider bar 46*a* is a display element for adjusting the quantity of sources to be displayed in relation to publication date according to the position of a slider 2*sa*. The slider bar 46*b* is a display element for adjusting the quantity of sources to be displayed in relation to conductivity according to the position of a slider 2*sb*. The slider bar 46*c* is a display element for adjusting the quantity of sources to be displayed in relation to temperature according to the position of a slider 2*sc*. The slider bar 46*d* is a display element for adjusting the quantity of sources to be displayed in relation to structure according to the position of a slider 2*sd*. The slider bar 46*e* is a display element for adjusting the quantity of sources to be displayed in relation to research institution according to the position of a slider 2*se*. The slider bar 46*f* is a display element for adjusting the quantity of sources to be displayed in relation to author name according to the position of a slider 2*sf*.

Note that each of the sliders 2*sa* to 2*sf* indicates a smaller quantity the closer the slider is to the left edge and a larger quantity the closer the slider is to the right edge. The publication date, conductivity, temperature, structure, research institution name, and author name are each an attribute of a material. That is, the sliders 2*sa* to 2*sf* are used to adjust the biases on the quantity of sources to be displayed in relation to each attribute such as the publication date. Note that the biases on the quantity of sources are also referred to as the weights on the quantity of sources.

The source window 42 is a window for displaying sources related to materials satisfying a material condition inputted by the user. In the source window 42, sources related to each of the publication date, conductivity, temperature, structure, research institution name, and author name are displayed in the quantities adjusted by the quantity adjustment window 46.

The return button 43*b* is a button for returning the source display screen 40 displayed on the display 13 to the display screen 20 or the graph display screen 20*a* of Embodiment 1.

Figure 20:
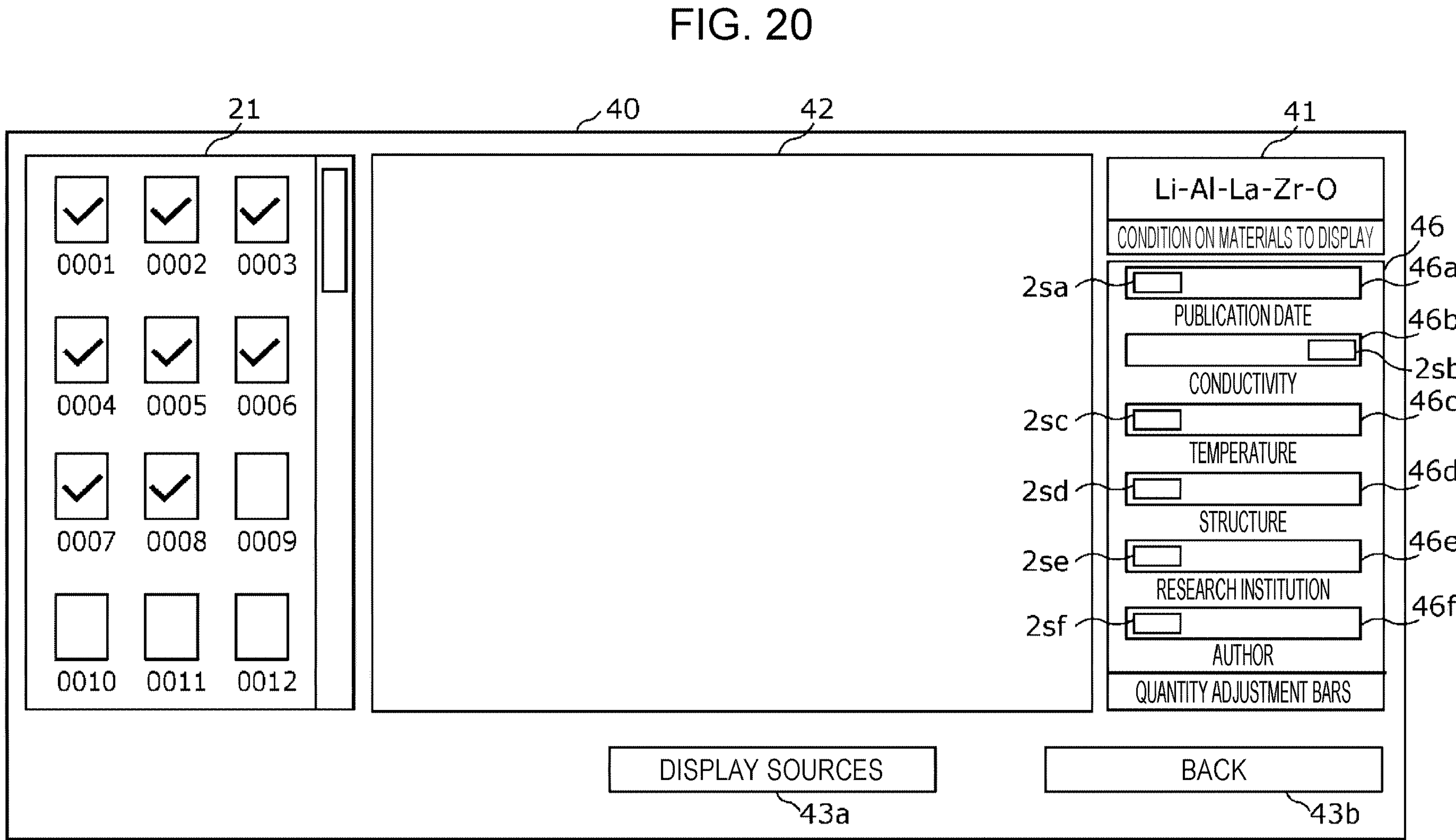
FIG. 20 is a diagram illustrating another example of a source display screen in Embodiment 2.

FIG. 20 is a diagram illustrating another example of the source display screen 40 in the present embodiment.

The user performs an input operation on the input device 11 to input a material condition and manipulate the slider 2*sb* of the slider bar 46*b*. This causes the extractor 101 to obtain the material condition according to the input operation. The image processor 106 then displays "Li—Al—La—Zr—O" as the material condition in the material window 41. In addition, the image processor 106 moves the slider 2*sb* of the slider bar 46*b* to the right edge. Note that the sliders 2*sa* and 2*sc* to 2*sf* of the slider bars 46*a* and 46*c* to 46*f* are at the left edge. The quantity adjustment window 46 in such a state means that sources related to conductivity are displayed in the entire source window 42. In addition, the image processor 106 displays the source display screen 40 including a display source button 43*a*. The display sources button 43*a* is a button for displaying sources in the source window 42.

Next, the extractor 101 extracts information related to the conductivity of materials with a material name satisfying the material condition "Li—Al—La—Zr—O" from each piece of document information D in the document database 12 that is selected by the user. Specifically, the extractor 101 first retrieves a material name containing the elemental species Li, Al, La, Zr, and O from the extraction lists 31 to 34, 31*a*, and the like of Embodiment 1. Next, the extractor 101 specifies the document ID and conductivity associated with the material name from the extraction lists 31 to 34, 31*a*, and the like. The extractor 101 then extracts a graph, figure, table, sentence, or the like describing the conductivity as an extracted image from the piece of document information D with the document ID.

The extractor 101 outputs, to the deriver 105, information including the document ID, conductivity, and extracted image as a display information candidate. When more than one material name is found by the material name retrieval described above, the extractor 101 performs a process similar to the above and outputs a display information candidate to the deriver 105 for each material name.

The deriver 105, upon obtaining the display information candidates, narrows down the display information candidates on the basis of the confidence level for the conductivity included in the display information candidates. That is, the deriver 105 selects, as display information, display information candidates with a confidence level equal to or greater than a threshold value from among the display information candidates. The deriver 105 then outputs the selected one or more pieces of display information to the image processor 106.

The image processor 106, upon obtaining one or more pieces of display information from the deriver 105, combines the one or more pieces of display information to generate an edited source, and displays the edited source in the source window 42 on the source display screen 40.

Figure 21:
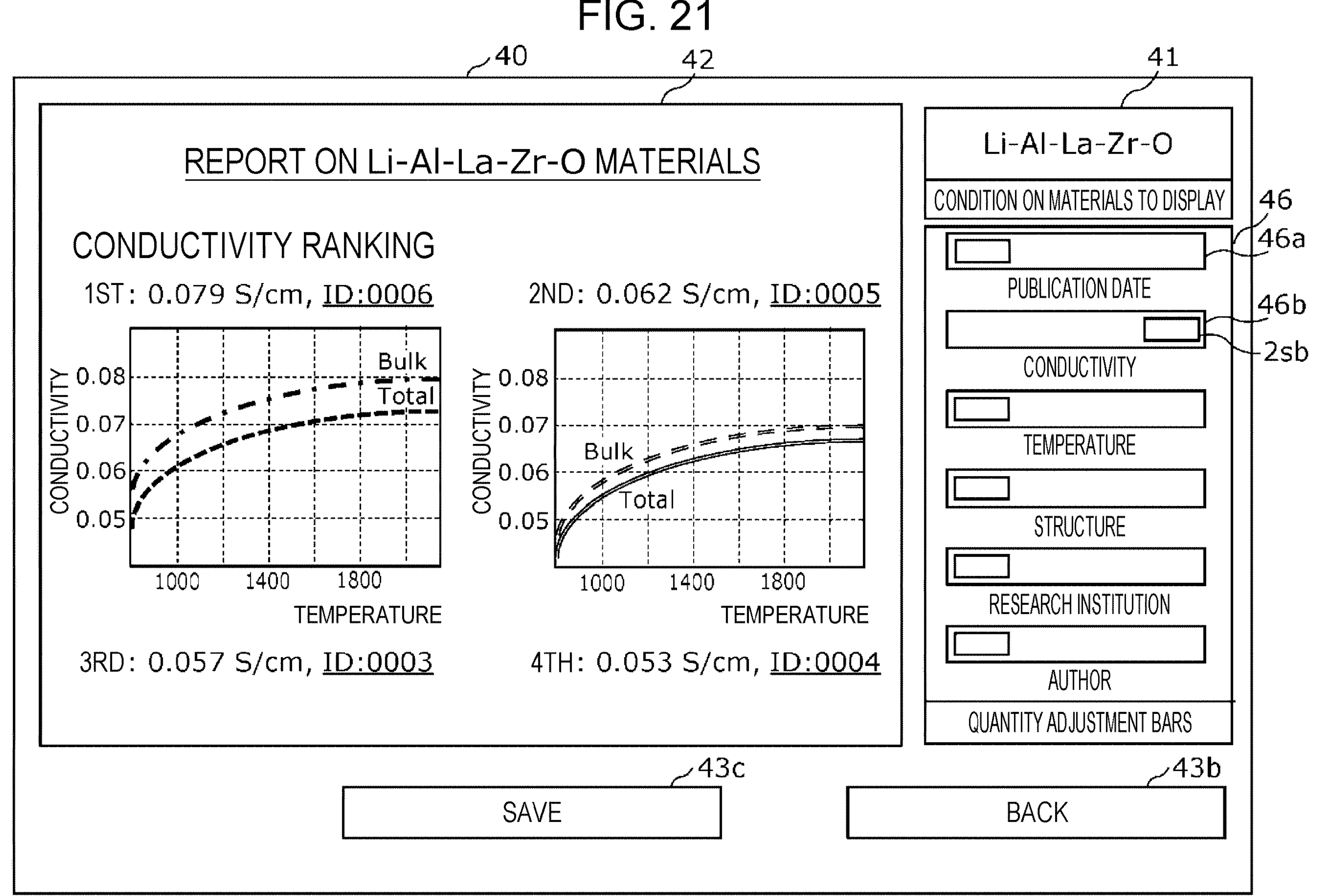
FIG. 21 is a diagram illustrating an example of a source display screen on which an edited source is displayed in Embodiment 2.

FIG. 21 is a diagram illustrating an example of the source display screen 40 on which an edited source is displayed.

The image processor 106 displays the edited source on the source display screen 40 as "Report on Li—Al—La—Zr—O Materials". The edited source is a source indicating a conductivity ranking like in FIG. 21, for example. In the example in FIG. 21, the slider 2*sb* of the slider bar 46*b* corresponding to conductivity is at the right edge, and therefore sources related to conductivity are displayed on the entire source display screen 40. In the conductivity ranking, the conductivity and the document ID of pieces of document information D describing the conductivity are indicated in order of highest conductivity. The conductivity in each of first and second place is displayed together with a graph or other extracted image in which the conductivity is described.

Note that the image processor 106 may also display the source display screen 40 including a save button 43*c*. The save button 43*c* is a button for saving the edited source. If the save button 43*c* is selected by an input operation on the input device 11 by the user, the image processor 106 saves the edited source in a memory or other recording medium provided in the information providing device 100.

FIG. 22 is a diagram illustrating another example of the source display screen 40 on which an edited source is displayed.

Next, the user manipulates the sliders 2*sa* and 2*sc* of the slider bars 46*a* and 46*c* by performing an input operation on the input device 11. This causes the image processor 106 to move the sliders 2*sa* and 2*sc* to the right. For example, the slider 2*sb* corresponding to conductivity is moved to the right by the largest amount, and the slider 2*sa* corresponding to publication date and the slider 2*sc* corresponding to temperature are moved to the right by smaller amounts compared to the slider 2*sb*.

In this case, the extractor 101 retrieves a material name according to the material condition "Li—Al—La—Zr—O" from the extraction lists 31 to 34, 31*a*, and the like, and specifies the document ID, publication date, conductivity, and temperature of the piece of document information D associated with the material name. The extractor 101 then extracts a graph, figure, table, sentence, or the like describing the conductivity as an extracted image from the piece of document information D with the document ID.

Next, the extractor 101 outputs, to the deriver 105, information including the document ID, material name, publication date, conductivity, temperature, and extracted image as a display information candidate. When more than one material name is found by the material name retrieval described above, the extractor 101 performs a process similar to the above and outputs a display information candidate to the deriver 105 for each material name.

The deriver 105, upon obtaining the display information candidates, narrows down the display information candidates on the basis of the confidence level for the conductivity included in the display information candidates. That is, the deriver 105 selects, as display information, display information candidates with a confidence level equal to or greater than a threshold value from among the display information candidates. The deriver 105 then outputs the selected one or more pieces of display information to the image processor 106.

The image processor 106, upon obtaining one or more pieces of display information from the deriver 105, combines the one or more pieces of display information to generate an edited source, and displays the edited source in the source window 42 on the source display screen 40. The edited source contains a first source, a second source, and a third source to be described later. Specifically, the image processor 106 divides up the entire area of the source window 42 on the basis of the states of the slider bars 46*a* to 46*f* in the quantity adjustment window 46, allotting half of the quantity to conductivity, a quarter of the quantity to publication date, and the remaining quarter of the quantity to temperature. The image processor 106 then displays the first source indicating a conductivity ranking similar to the example in FIG. 21 in the area of the left half of the source window 42. Additionally, the image processor 106 displays a graph related to conductivity and temperature as the second source in the area of the upper-right quarter of the source window 42, and displays a graph related to conductivity and publication date as the third source in the area of the lower-right quarter of the source window 42. The second source is a graph illustrating temperature on the horizontal axis and conductivity on the vertical axis, with a point plotted at the position corresponding to the temperature and conductivity of each material on the graph. The material name may also be added at the position. The third source is a graph illustrating publication date on the horizontal axis and conductivity on the vertical axis, with points plotted on the graph. Each of the points is plotted at the position corresponding to the publication date and conductivity of the piece of document information D describing the material. The material name may be added at the position.

Figure 23:
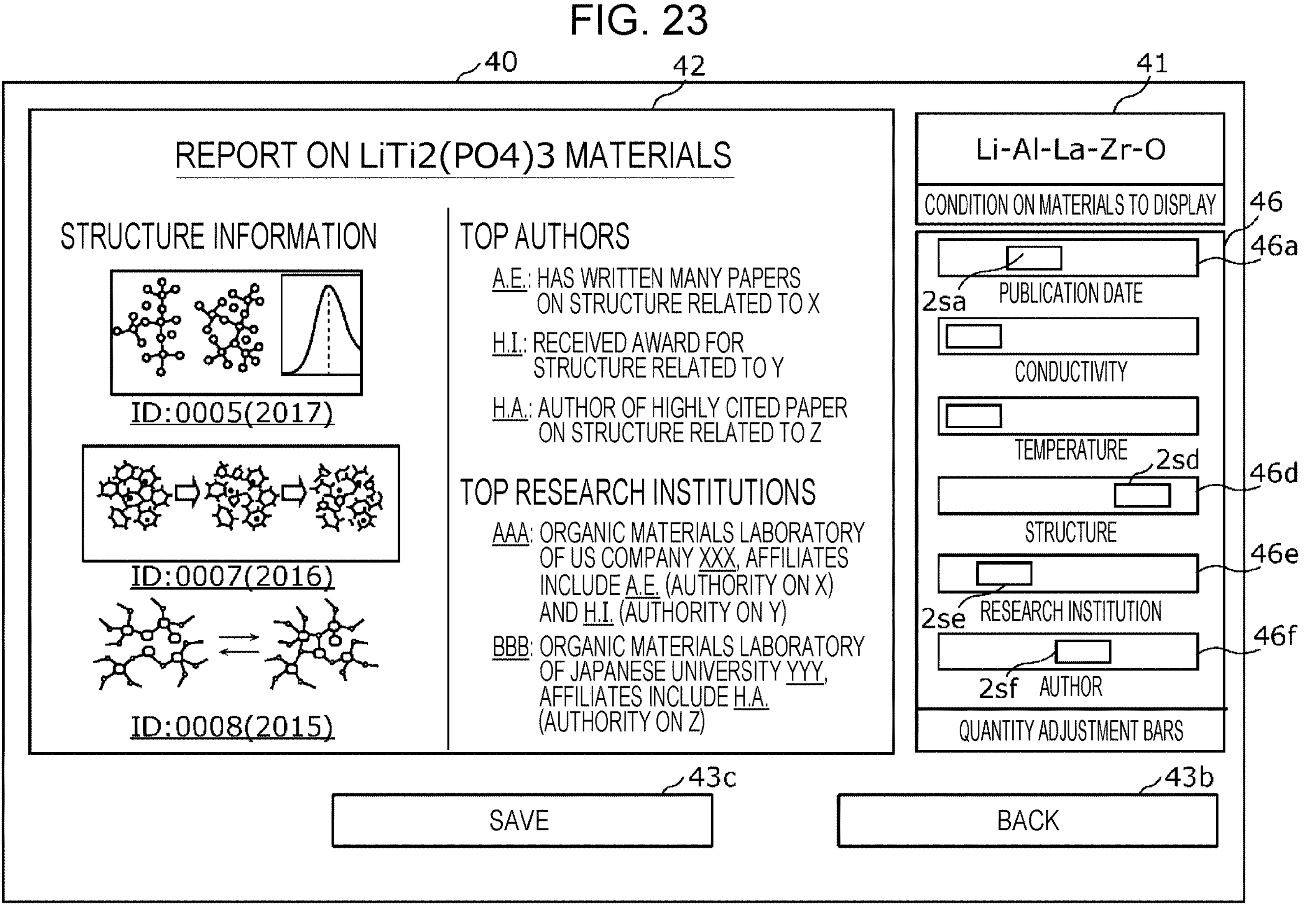
FIG. 23 is a diagram illustrating another example of a source display screen on which an edited source is displayed in Embodiment 2.

FIG. 23 is a diagram illustrating another example of the source display screen 40 on which an edited source is displayed.

From the state of the quantity adjustment window 46 in FIG. 19, the user manipulates the sliders 2*sa* and 2*sd* to 2*sf* of the slider bars 46*a* and 46*d* to 46*f* by performing an input operation on the input device 11. This causes the image processor 106 to move the sliders 2*sa* and 2*sd* to 2*sf* to the right. For example, the slider 2*sd* corresponding to structure is moved to the right by the largest amount, and the slider 2*sa* corresponding to publication date, the slider 2*se* corresponding to research institution name, and the slider 2*sf* corresponding to author name are moved to the right by smaller amounts compared to the slider 2*sd*.

In this case, the extractor 101 retrieves a material name according to the material condition "Li—Al—La—Zr—O" from the extraction lists 31 to 34, 31*a*, and the like, and specifies the document ID, publication date, conductivity, structure, research institution name, and author name of the piece of document information D associated with the material name. The extractor 101 then extracts a graph, figure, table, or the like describing the structure as an extracted image from the piece of document information D with the document ID.

The extractor 101 outputs, to the deriver 105, information including the document ID, publication date, conductivity, structure, research institution name, author name, and extracted image as a display information candidate. When more than one material name is found by the material name retrieval described above, the extractor 101 performs a process similar to the above and outputs a display information candidate to the deriver 105 for each material name.

The deriver 105, upon obtaining the display information candidates, narrows down the display information candidates on the basis of the confidence level for the conductivity included in the display information candidates. That is, the deriver 105 selects, as display information, display information candidates with a confidence level equal to or greater than a threshold value from among the display information candidates. The deriver 105 then outputs the selected one or more pieces of display information to the image processor 106.

The image processor 106, upon obtaining one or more pieces of display information from the deriver 105, combines the one or more pieces of display information to generate an edited source, and displays the edited source in the source window 42 on the source display screen 40. The edited source contains a fourth source, a fifth source, and a sixth source to be described later. Specifically, the image processor 106 divides up the entire area of the source window 42 on the basis of the states of the slider bars 46*a* to 46*f* in the quantity adjustment window 46, allotting half of the quantity to structure and publication date, a quarter of the quantity to author name, and the remaining quarter of the quantity to research institution name. The image processor 106 then displays the fourth source illustrating extracted images of the structure of each material sorted by publication date in the area of the left half of the source window 42. Additionally, the image processor 106 displays information related to author name as the fifth source in the area of the upper-right quarter of the source window 42, and displays information related to research institution name as the sixth source in the area of the lower-right quarter of the source window 42.

In the fourth source, the more recent is the publication date of a piece of document information D is, the closer to the top is placed the extracted image of the structure described in the piece of document information D. The document ID and year of publication may also be added to the extracted image.

The fifth source indicates the names of the first, second, and third most well-known authors from among the one or more author names included in the one or more pieces of display information acquired by the image processor 106, along with information related to the three authors. For example, the image processor 106 may generate the fifth source by referencing author data indicating how well known authors are and information related to the authors. The author data may be saved in a sever connected to the information providing device 100 through a communication network such as the Internet, or the author data may be saved in the image processor 106 or the information providing device 100.

The sixth source indicates the names of the first and second most well-known research institutions from among the one or more research institution names included in the one or more pieces of display information acquired by the image processor 106, along with information related to the two research institutions. For example, the image processor 106 may generate the sixth source by referencing research institution data indicating how well known research institutions are and information related to the research institutions. The research institution data may be saved in a sever connected to the information providing device 100 through a communication network such as the Internet, or the research institution data may be saved in the image processor 106 or the information providing device 100.

In this way, in the present embodiment, the extractor 101 acquires a material condition, and for each of one or more materials satisfying the material condition, extracts information related to the material from at least one piece of document information D as a display information candidate. The image processor 106 also acquires the weight on each of multiple types of attributes of materials. The weight on each of the multiple types of attributes is the weight or bias on each of the publication date, conductivity, temperature, structure, research institution name, and author name, for example. Next, the image processor 106 selects, from the display information candidates extracted by the extractor 101, one or more display information candidates corresponding to a material with property values having a derived confidence level equal to or greater than a threshold value as one or more pieces of display information. The image processor 106 then generates a second image in which the display information corresponding to each of the multiple types of attributes from among the one or more pieces of display information is indicated in a quantity according to the weight on each of the multiple types of attributes, and outputs the second image to the display 13. The second image is the edited source on the source display screen 40 or in the source window 42 illustrated in FIGS. 21 to 23, for example.

Thus, by adjusting the biases, that is, the weights for each of several types of attributes, it is possible to change the amount of display information corresponding to each of multiple types of attributes that is illustrated in the second image. Consequently, the user can freely adjust the amount of display information for each attribute so that more display information is displayed in relation to attributes the user is interested in and less display information is displayed in relation to attributes the user is not interested in. Furthermore, since the display information to be displayed is information pertaining to materials with a confidence level equal to or greater than a threshold value, the user can feel confident in using the display information for materials research and other work. Display information about a material satisfying a material condition is displayed, the material condition being, for example, a condition regarding the elemental species contained in the material or the composition of the material. Thus, the one or more pieces of display information to be displayed can be limited to a material the user is interested in. In the present embodiment, an edited source in accordance with the preferences of the user is generated automatically as technical source data, and therefore a reduction in the man-hours involved in the creation of technical source data can be attained.

Figure 24:
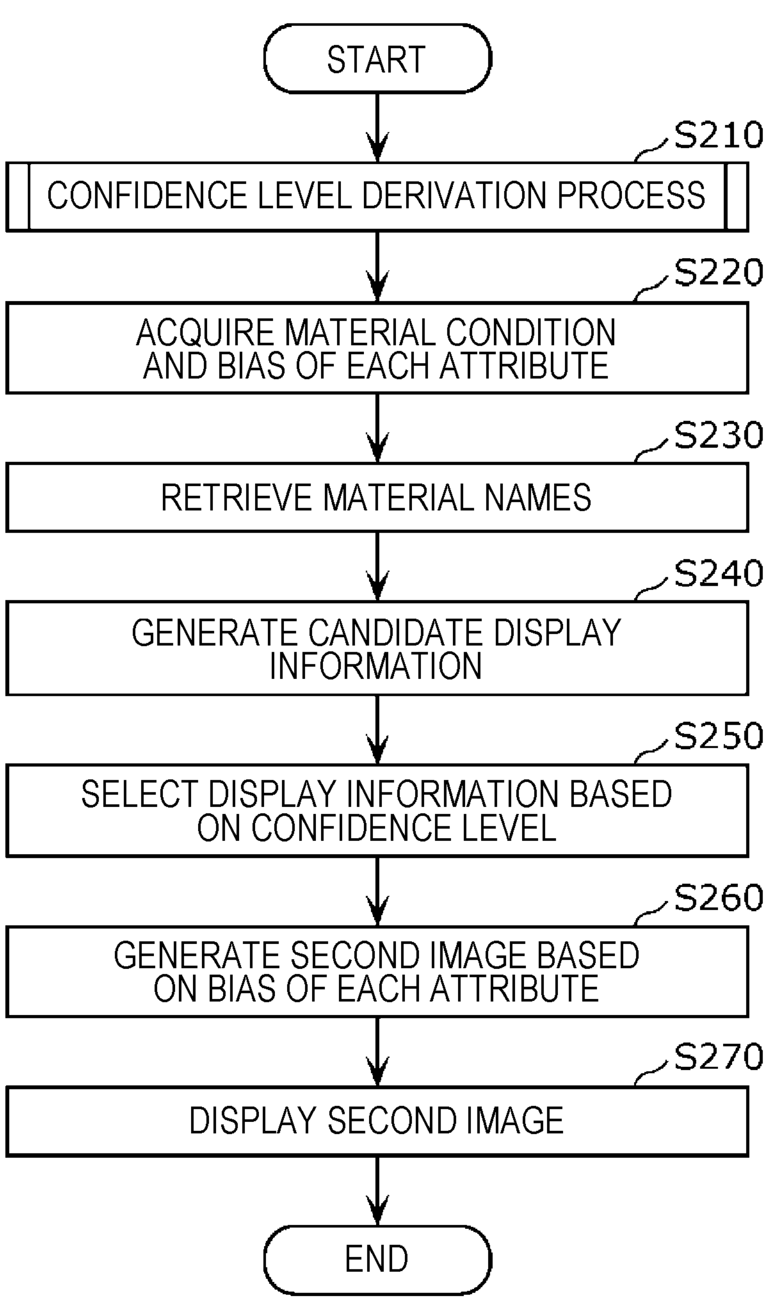
FIG. 24 is a flowchart illustrating an example of overall processing operations by an information providing device in Embodiment 2.

FIG. 24 is a flowchart illustrating an example of overall processing operations by the information providing device 100 in the present embodiment.

(Step S210)

First, the information providing device 100 performs the confidence level derivation process. The confidence level derivation process is the process of deriving a confidence level for the property values of each of multiple materials like in Embodiment 1, and may include the processes in steps S110 to S130 or the processes in steps S110 to S150 of FIG. 16.

(Step S220)

The extractor 101 obtains a material condition according to an input operation on the input device 11 by the user. Additionally, the image processor 106 obtains the bias on each of multiple types of attributes according to an input operation on the input device 11 by the user.

(Step S230)

Next, the extractor 101 retrieves material names satisfying the material condition obtained in step S220. For example, the extractor 101 retrieves the material names from the extraction lists 31 to 34, 31*a*, and the like generated in the confidence level derivation process in step S210.

(Step S240)

Next, the extractor 101 generates, for each of the one or more material names retrieved in step S230, a display information candidate pertaining to the material name. That is, the extractor 101 specifies the document ID and various information associated with the material name from the extraction lists 31 to 34, 31*a*, and the like. Note that the various information includes the property values of the material with the material name. Additionally, the extractor 101 extracts a graph, figure, table, sentence, or the like describing the various information as an extracted image from the piece of document information D with the document ID. The extractor 101 then generates information including the document ID, the various information, and the extracted image as a display information candidate.

(Step S250)

Next, the deriver 105 obtains the display information candidates and narrows down the display information candidates on the basis of the confidence level for the property values included in the display information candidates. That is, the deriver 105 selects, as display information, display information candidates with a confidence level equal to or greater than a threshold value from among the display information candidates.

(Step S260)

Next, the image processor 106 obtains one or more pieces of display information from the deriver 105 and combines the one or more pieces of display information to generate a second image. That is, the image processor 106 generates a second image in which the display information corresponding to each of multiple types of attributes from among the one or more pieces of display information is indicated in a quantity according to the bias on each of the multiple types of attributes acquired in step S220.

(Step S270)

The image processor 106 then displays the generated second image on the display 13.

The foregoing thus describes an information providing device according to one or more aspects on the basis of the above embodiments and modifications, but the present disclosure is not limited to these embodiments and modifications. Embodiments obtained by making various changes that occur to a person skilled in the art to the above embodiments and modifications, as well as embodiments constructed by combining structural elements from different embodiments or different modifications, may also be included in the scope of the present disclosure insofar as such embodiments do not depart from the gist of the present disclosure.

For example, in the above embodiments and modifications, the document information D is electronic data of research papers, but may also be electronic data of textbooks, journals, patent documents, or the like.

In the above embodiments and modifications, the information providing device 100 is configured as a single device, such as a personal computer, for example, but may also be formed from multiple devices. In this case, the extractor 101, first information processor 102, second information processor 103, third information processor 104, deriver 105, and image processor 106 may be provided in the multiple devices in a distributed manner rather than being provided in the same device.

The screens illustrated in FIGS. 13 to 15C and FIGS. 21 to 23 in the above embodiments do not include the document list window 21 in FIGS. 2A and 2B, but the document list window 21 may also be included. In this case, the user may perform an input operation on the input device 11 to deselect the icon of a piece of document information D or select a new icon in the document list window 21. The image processor 106 may update the property value graph 24 or the source window 42 in response to the selection and deselection.

In the above embodiments and modifications, the classes of property values and attributes of materials to be extracted by the extractor 101 may also be designated according to an input operation on the input device 11 by the user. That is, the extractor 101 may obtain an input signal from the input device 11 and extract, from the document information D, property values and attributes of the classes indicated by the input signal. As a result, the extractor 101 may extract density or the like instead of conductivity as the property values of materials, for example. The classes of property values and attributes to be extracted may also be predetermined.

In Embodiment 2 above, the display information is narrowed down from the display information candidates on the basis of the confidence level for the property values, but the narrowing down may also not be performed. In this case, the image processor 106 may treat all of the display information candidates generated by the extractor 101 as respective pieces of display information and combine these pieces of display information to generate the second image.

Note that, in the above embodiments and respective modifications, each structural element may be configured by dedicated hardware, or realized by executing a software program suited to each structural element. Each structural element may be realized as a result of a program execution unit such as a CPU or a processor reading out and executing a software program recorded on a recording medium such as a hard disk or semiconductor memory. A software program for achieving the information providing device 100 according to the above embodiments and modifications causes a computer to execute the steps included in at least one of the flowcharts illustrated by FIGS. 16, 17, and 24.

Obviously, the present disclosure is not limited to the above embodiments and modifications. Cases like the following are also included in the present disclosure.

(1) Each device above is specifically a computer system including a microprocessor, ROM, RAM, a hard disk unit, a display unit, a keyboard, a mouse, and the like. A computer program is stored in the RAM or the hard disk unit. The microprocessor operates according to the computer program and thereby achieves the functions of each device. The computer program is a plural combination of instruction codes indicating commands to the computer in order to achieve a designated function.

(2) Some or all of the structural elements forming each device above may also be configured as a single system large-scale integration (LSI) chip. A system LSI chip is an advanced multi-function LSI chip fabricated by integrating multiple components onto a single chip, and specifically is a computer system including a microprocessor, ROM, RAM, and the like. A computer program is stored in the RAM. The microprocessor operates in accordance with the computer program and thereby achieves the functions of the system LSI chip.

(3) Some or all of the structural elements constituting each device above may also be configured as an IC card or a separate module that may be inserted into each device. The IC card or module is a computer system including a microprocessor, ROM, RAM, and the like. The IC card or module may also include the advanced multi-function LSI chip above. The microprocessor operates according to the computer program and thereby achieves the functions of the IC card or module. The IC card or module may also be tamper-resistant.

(4) The present disclosure may also be the methods indicated above. These methods may be a computer program to be achieved by a computer, or a digital signal containing the computer program.

The present disclosure may also be achieved by recording the computer program or the digital signal onto a computer-readable recording medium, such as a flexible disk, hard disk, CD-ROM, MO, DVD, DVD-ROM, DVD-RAM, Blu-ray® Disc (BD), or semiconductor memory, for example. The present disclosure may also be the digital signal recorded on these recording media.

The present disclosure may also be achieved by transmitting the computer program or digital signal over a telecommunications line, a wired or wireless communication channel, a network such as the Internet, or a data broadcast.

The present disclosure may also be a computer system provided with a microprocessor and memory, in which the memory stores the computer program described above and the microprocessor operates according to the computer program.

The present disclosure may also be carried out by another independent computer system by recording and transporting the program or digital signal on a recording medium, or by transferring the program or digital signal over a network.

(Other)

A device according to an aspect of the present disclosure may also be a device like the following.

A device including: an extractor that extracts material names, values of a first property, and values of a second property from at least one document;

an introducer that calculates distances, each of the distances being a distance between two different coordinates included among n different coordinates, where n is a natural number equal to or greater than 2, the n different coordinates being first coordinates corresponding to a first material name, and so on, to n-th coordinates corresponding to an n-th material name, the first coordinates being a pair of a first value of the first property and a first value of the second property, and so on, the n-th coordinates being a pair of an n-th value of the first property and an n-th value of the second property, the material names including the first material name, and so on, to the n-th material name, the values of the first property including the first value of the first property, and so on, to the n-th value of the first property, the values of the second property including the first value of the second property, and so on, to the n-th value of the second property; and an image processor that determines, on the basis of the calculated distances, a display mode of each of the first coordinates, and so on, to the n-th coordinates on a two-dimensional plane, and outputs the display correspondence determined for the first coordinates, and so on, to the display correspondence determined for the n-th coordinates to a display.

The first material name, and so on, to the n-th material name may be the final material names listed in the final material name column indicated in FIG. 11.

The first value of the first property, and so on, to the n-th value of the first property may be the values listed in the conductivity value column indicated in FIG. 11.

The first value of the second property, and so on, to the n-th value of the second property may be the values listed in the activation energy value column indicated in FIG. 11.

The first coordinates to the n-th coordinates may be the coordinates taking the activation energy value and the conductivity value corresponding to ID=0001 in FIG. 11 as the x-axis coordinate value and the y-axis coordinate value, respectively, and so on, to the coordinates taking the activation energy value and the conductivity value corresponding to ID=n (not illustrated) as the x-axis coordinate value and the y-axis coordinate value, respectively.

The first coordinates to the n-th coordinates may be the coordinates indicated by the X symbols in FIG. 13.

The display mode of each of the first coordinates to the n-th coordinates may be the intensity (number of dots inside the circle) illustrated inside each of the circles in FIG. 14.

The distances may be the distance between the two-dimensional data (activation energy value, conductivity value) corresponding to document ID=0001 and the two-dimensional data (activation energy value, conductivity value) corresponding to document ID=0002 in FIG. 11, and so on, to the distance between the two-dimensional data (activation energy value, conductivity value) corresponding to document ID=0001 and the two-dimensional data (activation energy value, conductivity value) corresponding to document ID=n (not illustrated), the distance between the two-dimensional data (activation energy value, conductivity value) corresponding to document ID=0002 and the two-dimensional data (activation energy value, conductivity value) corresponding to document ID=0003, and so on, to the distance between the two-dimensional data (activation energy value, conductivity value) corresponding to document ID=0002 and the two-dimensional data (activation energy value, conductivity value) corresponding to document ID=n (not illustrated), and so on, to the distance between the two-dimensional data (activation energy value, conductivity value) corresponding to document ID=(n−1) and the two-dimensional data (activation energy value, conductivity value) corresponding to document ID=n (not illustrated).

The number of distances with respect to n different coordinates is n(n−1)/2.

The information providing device according to the present disclosure can provide information pertaining to materials appropriately, and is useful in a device or system for conducting materials research, materials development, or new material synthesis.

What is claimed is:

1. An information providing device comprising:

an extractor that extracts identification information for identifying each of multiple materials and property values of each material from at least one piece of document information;

a deriver that derives a confidence level indicative of reproducibility for the property values of each material on a basis of a similarity of the property values between the material and one or more other materials; and an image processor that generates a first image in which the property values of each of the materials are (i) illustrated in a display mode according to the confidence level derived for the property values of the material and (ii) illustrated in association with the identification information of the material, and outputs the first image to a display, wherein the extractor further extracts, for each of the materials, attribute information indicating an attribute of the material from the at least one piece of document information, and the deriver derives the confidence level for the property values of each material on a basis of the similarity of the property values of the material and the attribute information extracted in relation to the material.

2. The information providing device according to claim 1, wherein the extractor extracts multiple classes of property values as the property values.

3. The information providing device according to claim 2, wherein the multiple classes of property values include a property value of a first class and a property value of a second class, and the image processor sets in the first image a property map having a first coordinate axis for representing the property value of the first class and a second coordinate axis for representing the property value of the second class and superimposes a mark corresponding to each of the materials onto a position corresponding to the property value of the first class and the property value of the second class of the material on the property map, in a display mode according to the confidence level derived for the property values of the material.

4. The information providing device according to claim 3, wherein the deriver identifies the similarity of the property values of each material on a basis of a distance between the mark corresponding to the material and the mark corresponding to each of one or more other materials.

5. The information providing device according to claim 1, wherein the image processor determines, as the display mode of the property values of each material, a color intensity that is more intense the higher the confidence level that is derived for the property values and generates the first image in which the property values are illustrated with the determined color intensity.

6. The information providing device according to claim 1, wherein the deriver derives the confidence level for the property values of each material according to a weighted sum of the similarity of the property values of the material and an attribute value based on the attribute information extracted in relation to the material.

7. The information providing device according to claim 6, wherein the attribute information indicates, as the attribute, a time of publication of a piece of document information in which the identification information and property values of the material corresponding to the attribute information are described from among the at least one piece of document information, and the deriver uses the attribute value indicating recency of the time of publication to derive the confidence level for the property values.

8. The information providing device according to claim 7, wherein the more recent is the time of publication, the larger is the value indicated by the attribute value, and the higher the similarity of the property values of the material and the larger the attribute value corresponding to the material are, the greater the value that is derived by the deriver as the confidence level for the property values of the material.

9. The information providing device according to claim 6, wherein the attribute information indicates, as the attribute, a number of times cited of a piece of document information in which the identification information and property values of the material corresponding to the attribute information are described from among the at least one piece of document information, and the deriver uses the attribute value according to the number of times cited to derive the confidence level for the property values.

10. The information providing device according to claim 9, wherein the higher is the number of times cited, the larger is the value indicated by the attribute value, and the higher the similarity of the property values of the material and the larger the attribute value corresponding to the material are, the greater the value that is derived by the deriver as the confidence level for the property values of the material.

11. The information providing device according to claim 6, wherein the attribute information indicates, as the attribute, an author of a piece of document information in which the identification information and property values of the material corresponding to the attribute information are described from among the at least one piece of document information, and the deriver derives the confidence level for the property values using the attribute value according to whether the author of the piece of document information is the same as the author of each of one or more other pieces of document information.

12. The information providing device according to claim 9, wherein the higher is the number of authors of the one or more other pieces of document information who are different from the author of the piece of document information, the larger is the value indicated by the attribute value, and the higher the similarity of the property values of the material and the larger the attribute value corresponding to the material are, the greater the value that is derived by the deriver as the confidence level for the property values of the material.

13. The information providing device according to claim 6, wherein the attribute information indicates, as the attribute, a synthesis method of the material corresponding to the attribute information, and the deriver uses the attribute value according to a degree of similarity between the synthesis method of the material and each synthesis method of one or more other materials to derive the confidence level for the property values.

14. The information providing device according to claim 13, wherein the greater is the degree of similarity between the synthesis method of the material and each synthesis method of one or more other materials, the larger is the value indicated by the attribute value, and the higher the similarity of the property values of the material and the larger the attribute value corresponding to the material are, the greater the value that is derived by the deriver as the confidence level for the property values of the material.

15. The information providing device according to claim 13, wherein the synthesis method of the material includes at least one from among a temperature condition, a time condition, and a type of device used in the synthesis of the material.

16. The information providing device according to claim 1, wherein the extractor further acquires a material condition, and for each of one or more materials satisfying the material condition, extracts information pertaining to the material from the at least one piece of document information as a display information candidate, and the image processor further acquires a weight on each of multiple types of attributes of materials, selects, from the display information candidates extracted by the extractor, one or more display information candidates corresponding to a material with property values having a derived confidence level equal to or greater than a threshold value as one or more pieces of display information, and generates a second image in which the display information corresponding to each of the multiple types of attributes from among the one or more pieces of display information is indicated in a quantity according to the weight on each of the multiple types of attributes, and outputs the second image to the display.

17. An information providing method to be executed by one or more computers, the information providing method comprising:

extracting identification information for identifying each of multiple materials and property values of each material from at least one piece of document information;

deriving a confidence level indicative of reproducibility for the property values of each material on a basis of a similarity of the property values between the material and one or more other materials; and generating a first image in which the property values of each of the materials are (i) illustrated in a display mode according to the confidence level derived for the property values of the material and (ii) illustrated in association with the identification information of the material, and outputting the first image to a display, wherein the extracting includes extracting, for each of the materials, attribute information indicating an attribute of the material from the at least one piece of document information, and in the deriving, the confidence level for the property values of each material is derived on a basis of the similarity of the property values of the material and the attribute information extracted in relation to the material.

18. A non-transitory computer-readable recording medium storing a program causing a computer to execute an information processing method, the information processing method comprising:

extracting identification information for identifying each of multiple materials and property values of each material from at least one piece of document information;

deriving a confidence level indicative of reproducibility for the property values of each material on a basis of a similarity of the property values between the material and one or more other materials; and generating a first image in which the property values of each of the materials are (i) illustrated in a display mode according to the confidence level derived for the property values of the material and (ii) illustrated in association with the identification information of the material, and outputting the first image to a display, wherein the extracting includes extracting, for each of the materials, attribute information indicating an attribute of the material from the at least one piece of document information, and in the deriving, the confidence level for the property values of each material is derived on a basis of the similarity of the property values of the material and the attribute information extracted in relation to the material.

* * * * *